(12) United States Patent
Yoshizawa

(10) Patent No.: US 10,884,348 B2
(45) Date of Patent: Jan. 5, 2021

(54) ELECTROPHOTOGRAPHIC PHOTORECEPTOR, AND ELECTROPHOTOGRAPHIC CARTRIDGE AND IMAGE FORMING APPARATUS INCLUDING SAME

(71) Applicant: Mitsubishi Chemical Corporation, Chiyoda-ku (JP)

(72) Inventor: Atsushi Yoshizawa, Tokyo (JP)

(73) Assignee: Mitsubishi Chemical Corporation, Chiyoda (JP)

( * ) Notice: Subject to any disclaimer, the term of this patent is extended or adjusted under 35 U.S.C. 154(b) by 0 days.

(21) Appl. No.: 16/359,327

(22) Filed: Mar. 20, 2019

(65) Prior Publication Data

US 2019/0219938 A1 Jul. 18, 2019

Related U.S. Application Data

(63) Continuation of application No. PCT/JP2017/033967, filed on Sep. 20, 2017.

(30) Foreign Application Priority Data

Sep. 21, 2016 (JP) .................................. 2016-184371

(51) Int. Cl.
  *G03G 5/00* (2006.01)
  *G03G 5/05* (2006.01)
  (Continued)

(52) U.S. Cl.
  CPC .......... *G03G 5/056* (2013.01); *C08G 63/183* (2013.01); *C08G 63/185* (2013.01); *C08G 63/60* (2013.01); *C08G 63/64* (2013.01); *C08G 63/672* (2013.01)

(58) Field of Classification Search
  CPC ....................................................... G03G 5/056
  (Continued)

(56) References Cited

U.S. PATENT DOCUMENTS 4,847,175 A   7/1989 Pavlisko et al.
5,789,126 A   8/1998 Sugimura
(Continued)

FOREIGN PATENT DOCUMENTS

JP   1-271426   10/1989
JP   1-280762   11/1989
(Continued)

OTHER PUBLICATIONS

International Search Report dated Dec. 19, 2017 in PCT/JP2017/033967, filed on Sep. 20, 2017 (with English Translation).
(Continued)

*Primary Examiner* — Mark A Chapman
(74) *Attorney, Agent, or Firm* — Oblon, McClelland, Maier & Neustadt, L.L.P.

(57) ABSTRACT

The present invention aims to provide an electrophotographic photoreceptor which is excellent in abrasion resistance against practical load and excellent in initial electrical properties, preferably further excellent in adhesion between layers by containing a polyester resin excellent in abrasion resistance, which is an electrophotographic photoreceptor containing a photosensitive layer and a conductive support, the electrophotographic photoreceptor containing a polyester resin having a specific structure α with a number average molecular weight of 15,000 or less and containing a divalent phenol residue and a divalent carboxylic acid residue.

6 Claims, 2 Drawing Sheets

(51) Int. Cl.
*C08G 63/183* (2006.01)
*C08G 63/185* (2006.01)
*C08G 63/64* (2006.01)
*C08G 63/60* (2006.01)
*C08G 63/672* (2006.01)

(58) Field of Classification Search
USPC .......................................................... 430/96
See application file for complete search history.

(56) References Cited

U.S. PATENT DOCUMENTS

| | | |
|---|---|---|
| 2003/0077531 A1 | 4/2003 | Suzuki et al. |
| 2005/0130050 A1 | 6/2005 | Takada et al. |
| 2005/0170272 A1 | 8/2005 | Suzuki et al. |
| 2011/0189603 A1 | 8/2011 | Takaki et al. |

FOREIGN PATENT DOCUMENTS

| | | |
|---|---|---|
| JP | 9-22126 | 1/1997 |
| JP | 10-20516 | 1/1998 |
| JP | 10-81737 | 3/1998 |
| JP | 2000-181096 | 6/2000 |
| JP | 2000-284508 | 10/2000 |
| JP | 2002-131956 | 5/2002 |
| JP | 2002-351113 | 12/2002 |
| JP | 2003-183365 | 7/2003 |
| JP | 2004-294750 | 10/2004 |
| JP | 2005-172968 | 6/2005 |
| JP | 2008-293006 | 12/2008 |
| JP | 2009-271152 | 11/2009 |
| JP | 2014-164046 | 9/2014 |

OTHER PUBLICATIONS

Written Opinion dated Dec. 19, 2017 in PCT/JP2017/033967, filed on Sep. 20, 2017.

ELECTROPHOTOGRAPHIC PHOTORECEPTOR, AND ELECTROPHOTOGRAPHIC CARTRIDGE AND IMAGE FORMING APPARATUS INCLUDING SAME

TECHNICAL FIELD

The present invention relates to an electrophotographic photoreceptor containing a polyester resin, and an electrophotographic cartridge and an image forming apparatus which include the electrophotographic photoreceptor.

BACKGROUND ART

Electrophotographic technology has been widely used and applied not only in the field of copiers but also in the field of various printers in recent years since immediacy and high quality images can be obtained. As electrophotographic photoreceptors, which are the core of the electrophotographic technology, photoreceptors using organic photoconductive materials are often used because of their advantages such as no pollution and easy production.

Since the electrophotographic photoreceptor (hereinafter sometimes simply referred to as "photoreceptor") is repeatedly used in a cycle of charging, exposure, development, transfer, cleaning, neutralization or the like in an electrophotographic process, it deteriorates under various stresses during that time. The deterioration of the photoreceptor is a major factor limiting the life span of the photoreceptor, so how deterioration can be suppressed is important. In recent years, high-speed models that print 100,000 or more sheets have been developed, and long life span photoreceptors that can be practically used even in a large amount of printing are also required.

The deterioration of the photoreceptor includes, for example, damage due to strong oxidizing ozone or NOx generated from a corona charger generally used as a charger, chemical deterioration of photosensitive layer compositions due to charge eliminating light and light from the outside, and electrical deterioration of compounds used for the photoreceptor due to flow of a carrier (current) generated by image exposure in a photosensitive layer or application of a high voltage during charging and transfer, or the like. Further, mechanical deterioration such as abrasion, scratches and film peeling of the surface of the photosensitive layer due to rubbing with a cleaning blade or a magnetic brush, contact with a developer or paper, or likes. In addition, since the photosensitive layer may be peeled from the support because of continuously receiving such a mechanical stress, adhesion of the photosensitive layer is also required for a long life span of the photoreceptor.

The load described above is likely to influence the photosensitive layer which is the surface layer of the photoreceptor. The photosensitive layer generally contains a binder resin and a photoconductive substance, and it is the binder resin that substantially determines the mechanical strength and the adhesion to the support. However, since the doping amount of the photoconductive substance is considerably large, the mechanical strength cannot be obtained sufficiently. In recent years, a polyester resin excellent in sensitivity, solubility in a coating fluid, and abrasion resistance is used as the binder resin of the photosensitive layer (Patent Literatures 1 to 3).

Various methods for producing a polyester resin are known, but an interfacial polymerization method capable of obtaining a polyester resin having a high molecular weight and less coloration and high purity is widely used.

BACKGROUND ART LITERATURE

Patent Literature

Patent Literature 1: JP-A-H9-22126
Patent Literature 2: JP-A-2008-293006
Patent Literature 3: JP-A-2009-271152

SUMMARY OF INVENTION

Problem to be Solved by Invention

However, for example, in a case where an aliphatic divalent alcohol is to be copolymerized by the interfacial polymerization method, it is difficult to form an alkoxide in water and the reactivity is poor since an acid dissociation constant of an aliphatic alcoholic hydroxyl group is equivalent to that of water. Therefore, the aliphatic divalent alcohol cannot be introduced into the polyester resin and the properties of the polyester resin copolymerized with the divalent alcohol residue are unknown.

According to the examination of the inventor of the present invention, the photoreceptors using the polyester resins described in the Patent Literatures 1 to 3 are not sufficient in mechanical strength in a high-life and high-speed model that prints 100,000 sheets or more. In addition, the adhesion to the support and the undercoat layer (the adhesion between the layers) is also insufficient.

Further, according to the technique described in Patent Literature 3, crack resistance can be improved by introducing an aliphatic divalent carboxylic acid residue, but abrasion resistance cannot be obtained sufficiently.

The present invention has been made in view of the above problems. That is, the present invention has an object to provide an electrophotographic photoreceptor which is excellent in abrasion resistance against practical load and excellent in initial electrical properties, preferably further excellent in adhesion between layers by containing a polyester resin particularly excellent in abrasion resistance.

Means for Solving Problem

The inventors of the present invention has conducted intensive studies for an electrophotographic photoreceptor which can solve the above problems, and as a result, it is found that by using a specific partial structure in a photosensitive layer and a polyester resin containing a divalent phenol residue and a divalent carboxylic acid residue, an electrophotographic photoreceptor can be obtained, which is excellent in abrasion resistance and initial electrical properties, and preferably also excellent in adhesion between layers. With this knowledge, the present invention has been completed. Namely, the gist of the present invention lies in the following [1] to [8].

[1] An electrophotographic photoreceptor including: a conductive support; and at least a photosensitive layer on the conductive support, wherein the photosensitive layer contains a polyester resin, the polyester resin contains at least one structure α selected from the group consisting of a structure represented by the following Formula (1), a structure represented by the following Formula (2), and a structure represented by the following Formula (3), the structure α having a number average molecular weight of 15,000 or less, and the polyester resin contains a divalent phenol residue and a divalent carboxylic acid residue.

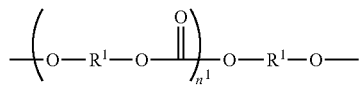
(1)

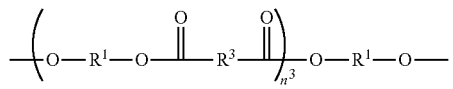
(2)

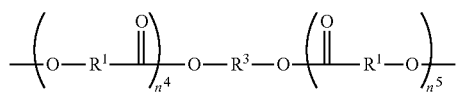
(3)

(In the Formula (1), $R^1$ represents an alkylene group which may have a substituent or a divalent group represented by the following Formula (5), and $n^1$ represents an integer of 1 to 100.

In the Formula (2), $R^1$ represents an alkylene group which may have a substituent or a divalent group represented by the following Formula (5), $R^3$ represents a divalent group, and $n^3$ represents an integer of 1 to 100.

In the Formula (3), $R^1$ represents an alkylene group which may have a substituent or a divalent group represented by the following Formula (5), $R^3$ represents a divalent group, and $n^4$ and $n^5$ each independently represents an integer of 1 to 100.)

(5)

(In the Formula (5), $R^2$ represents an alkylene group which may have a substituent, and $n^2$ represents an integer of 1 to 10.)

[2] The electrophotographic photoreceptor according to [1], wherein the polyester resin contains the structure α in a proportion of 0.01% by mass to 50% by mass.

[3] The electrophotographic photoreceptor according to [1] or [2], wherein the divalent phenol residue contains a structure represented by the following Formula (6).

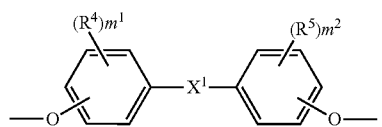
(6)

(In the Formula (6), $R^4$ and $R^5$ each independently represent a hydrogen atom, a halogen atom, a hydrocarbon group or an alkoxy group, and part or all of hydrogen atoms in the hydrocarbon group and the alkoxy group may be substituted with a halogen atom. $X^1$ represents a single bond, —$CR^6R^7$—, —O—, —CO— or —S—. $R^6$ and $R^7$ each independently represent a hydrogen atom, a halogen atom, a hydrocarbon group or an alkoxy group, and part or all of hydrogen atoms in the hydrocarbon group and the alkoxy group may be substituted with a halogen atom. $R^6$ and $R^7$ may be bonded to each other to form a ring. $m^1$ and $m^2$ each independently represent an integer of 0 to 4.)

[4] The electrophotographic photoreceptor according to any one of [1] to [3], wherein the divalent carboxylic acid residue contains a structure represented by the following Formula (7).

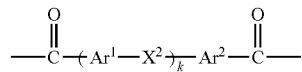
(7)

(In the Formula (7), $Ar^1$ to $Ar^2$ each independently represent an arylene group which may have a substituent. $X^2$ represents a single bond, —O—, —S—, a divalent group having a structure represented by the following Formula (8) or a divalent group having a structure represented by the following Formula (9). k represents an integer of 0 to 5.)

(8)

(9)

(10)

(In the Formula (8), $R^8$ and $R^9$ each independently represent a hydrogen atom, a halogen atom, a hydrocarbon group or an alkoxy group, and part or all of hydrogen atoms in the hydrocarbon group and the alkoxy group may be substituted with a halogen atom. $R^8$ and $R^9$ may be bonded to each other to form a ring.

In the Formula (9), $R^{10}$ represents an alkylene group, an arylene group or a group represented by the above Formula (10).

In the Formula (10), $R^{11}$ and $R^{12}$ each independently represent an alkylene group, and $Ar^3$ represents an arylene group.

[5] An electrophotographic photoreceptor comprising: a conductive support; and at least a photosensitive layer on the conductive support, wherein the photosensitive layer contains a polyester resin, the polyester resin contains a structure represented by the following Formula (4), and contains a divalent phenol residue and a divalent carboxylic acid residue, the divalent phenol residue contains a structure represented by the following Formula (6), the divalent carboxylic acid residue contains a structure represented by the following Formula (7), and at least a part of the structure represented by the Formula (6) and at least a part of the structure represented by the Formula (7) are directly bonded.

(4)

(5)

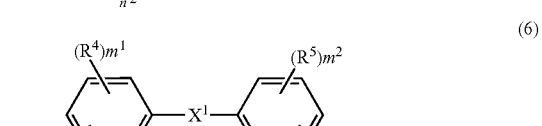
(6)

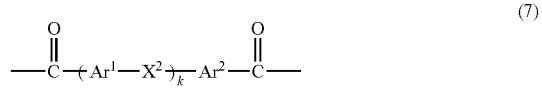
(7)

(In the Formula (4), $R^1$ represents an alkylene group which may have a substituent or a divalent group represented by the above Formula (5), and $n^6$ represents an integer of 2 to 100.

In the Formula (5), $R^2$ represents an alkylene group which may have a substituent, and $n^2$ represents an integer of 1 to 10.

In the Formula (6), $R^4$ and $R^5$ each independently represent a hydrogen atom, a halogen atom, a hydrocarbon group or an alkoxy group, and part or all of hydrogen atoms in the hydrocarbon group and the alkoxy group may be substituted with a halogen atom. $X^1$ represents a single bond, $-CR^6R^7-$, $-O-$, $-CO-$ or $-S-$. $R^6$ and $R^7$ each independently represent a hydrogen atom, a halogen atom, a hydrocarbon group or an alkoxy group, and part or all of hydrogen atoms in the hydrocarbon group and the alkoxy group may be substituted with a halogen atom. $R^6$ and $R^7$ may be bonded to each other to form a ring. $m^1$ and $m^2$ each independently represent an integer of 0 to 4.

In the Formula (7), $Ar^1$ to $Ar^2$ each independently represent an arylene group which may have a substituent. $X^2$ represents a single bond, $-O-$, $-S-$, a divalent group having a structure represented by the following Formula (8) or a divalent group having a structure represented by the following Formula (9). k represents an integer of 0 to 5.)

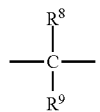
(8)

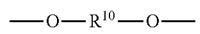
(9)

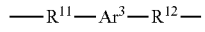
(10)

(In the Formula (8), $R^8$ and $R^9$ each independently represent a hydrogen atom, a halogen atom, a hydrocarbon group or an alkoxy group, and part or all of hydrogen atoms in the hydrocarbon group and the alkoxy group may be substituted with a halogen atom. $R^8$ and $R^9$ may be bonded to each other to form a ring.

In the Formula (9), $R^{10}$ represents an alkylene group, an arylene group or a group represented by the above Formula (10).

In the Formula (10), $R^{11}$ and $R^{12}$ each independently represent an alkylene group, and $Ar^3$ represents an arylene group.

[6] The electrophotographic photoreceptor according to [5], wherein the polyester resin contains the structure represented by the Formula (4) in a proportion of 0.01% by mass to 50% by mass.

[7] An electrophotographic cartridge including: the electrophotographic photoreceptor according to any one of [1] to [6].

[8] An image forming apparatus including: the electrophotographic photoreceptor according to any one of [1] to [6].

The polyester resin used in the present invention has high solubility in a solvent used for a coating fluid for forming a photosensitive layer and is excellent in coating fluid stability, and the photoreceptor using the polyester resin is excellent in abrasion resistance and electrical properties, and preferably also excellent in various properties such as adhesion between layers.

The reason for this improvement in abrasion resistance is not clear. However, since the structure represented by the Formula (1), the structure represented by the Formula (2), and the structure represented by the Formula (3) are relatively flexible sites in the polyester resin, it is considered that the stress energy can be relieved when the polyester resin undergoes mechanical stress, and, as a result, the abrasion resistance of the photoreceptor can be improved.

In addition, the structure represented by the Formula (1), the structure represented by the Formula (2), the structure represented by the Formula (3), and the structure represented by the Formula (4) are considered to have relatively high mobility, and it is considered that, by using a more preferred embodiment, the photosensitive layer containing the polyester resin is easily entangled with the conductive support (hereinafter sometimes simply referred to as "support") and the undercoat layer, and the adhesion between the layers is also improved.

Further, as described later, in producing the polyester resin, the polyester resin can be efficiently obtained by performing a first step of pre-reacting a divalent alcohol having a structure represented by the Formula (1), a structure represented by the Formula (2), a structure represented by the Formula (3) and/or a structure represented by the Formula (4), which have relatively low reactivity among raw material compounds, with a divalent carboxylic acid chloride, and then a second step of reacting the reaction product of the first step with a divalent phenol.

Effects of Invention

According to the present invention, an electrophotographic photoreceptor particularly excellent in abrasion resistance and initial electrical properties can be obtained. In addition, an electrophotographic photoreceptor further excellent in adhesion between layers can be obtained by using a more preferred embodiment.

DESCRIPTION OF EMBODIMENTS

Figure 1:
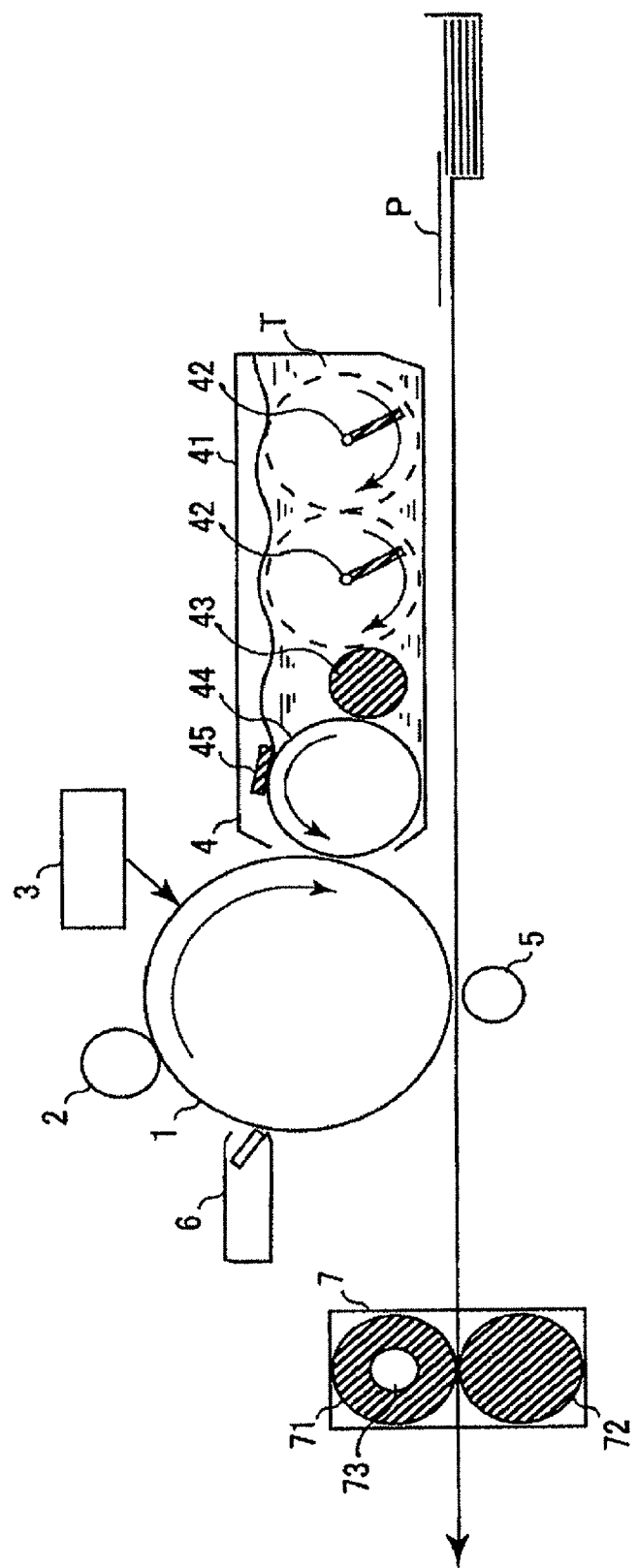
FIG. 1 is a conceptual view illustrating an example of an image forming apparatus including an electrophotographic photoreceptor of the present invention.

Hereinafter, embodiments for implementing the present invention will be described in details. The present invention is not limited to the following embodiments, and various modifications can be made within the scope of the gist thereof. In the present specification, "% by mass" and "% by weight" are synonymous, and "'part by mass", "part by weight", and simply "part" are synonymous. In addition, "ppm" indicates part per million by mass, synonymous with "weight ppm".

<<Polyester Resin>>

The electrophotographic photoreceptor according to the present invention includes a conductive support and at least a photosensitive layer on the conductive support, and the photosensitive layer contains a specific polyester resin.

The polyester resin in the present invention contains at least one structure selected from the group consisting of a structure represented by the following Formula (1), a structure represented by the following Formula (2), a structure represented by the following Formula (3), and a structure represented by the following Formula (4).

The polyester resin according to a first aspect contains at least one structure α selected from the group consisting of a structure represented by the following Formula (1), a structure represented by the following Formula (2), and a structure represented by the following Formula (3), the structure α having a number average molecular weight of 15,000 or less, and further contains a divalent phenol residue and a divalent carboxylic acid residue.

The polyester resin according to a second aspect contains a structure represented by the following Formula (4), and contains a divalent phenol residue and a divalent carboxylic acid residue. The divalent phenol residue contains the following Formula (6), the divalent carboxylic acid residue contains the following Formula (7), and at least a part of the structure represented by the Formula (6) and at least a part of the structure represented by the Formula (7) are directly bonded to each other.

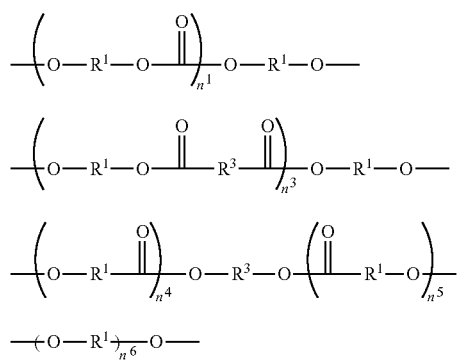

(In the Formula (1), $R^1$ represents an alkylene group which may have a substituent or a divalent group represented by the following Formula (5), and $n^1$ represents an integer of 1 to 100.

In the Formula (2), $R^1$ represents an alkylene group which may have a substituent or a divalent group represented by the following Formula (5), $R^3$ represents a divalent group, and $n^3$ represents an integer of 1 to 100.

In the Formula (3), R' represents an alkylene group which may have a substituent or a divalent group represented by the following Formula (5), $R^3$ represents a divalent group, and $n^4$ and $n^5$ each independently represents an integer of 1 to 100.

In the Formula (4), $R^1$ represents an alkylene group which may have a substituent or a divalent group represented by the following Formula (5), and $n^6$ represents an integer of 2 to 100.)

(In the Formula (5), $R^2$ represents an alkylene group which may have a substituent, and $n^2$ represents an integer of 1 to 10.)

The alkylene group which may have a substituent for $R^1$ is linear, branched and cyclic, preferably linear or branched, and more preferably linear. A linear alkylene group tends to lead to a flexible structure and good abrasion resistance.

The number of carbon atoms of the alkylene group is not particularly limited, and is generally 1 or more, and preferably 2 or more, and is generally 8 or less, preferably 6 or less, and more preferably 5 or less.

In the case of a linear alkylene group, the number of carbon atoms is generally 2 or more and is generally 8 or less, preferably 6 or less from the viewpoint of solubility, and more preferably 4 or less from the viewpoint of abrasion resistance.

In the case of a branched alkylene group, the number of carbon atoms is generally 2 or more, preferably 3 or more, and more preferably 4 or more, from the viewpoint of electrical properties, on the other hand, the number of carbon atoms is generally 8 or less, and preferably 6 or less.

In the case of a cyclic alkylene group, the number of carbon atoms is generally 5 or more, and is generally 8 or less, and more preferably 7 or less.

When the number of carbon atoms is within each of the above ranges, at least one structure selected from the group consisting of the structure represented by the Formula (1), the structure represented by the Formula (2), the structure represented by the Formula (3) and the structure represented by the Formula (4) has a good compatibility with a divalent phenol residue or a divalent carboxylic acid residue, the transparency of a charge transport layer is excellent, and good electrical properties are obtained.

Examples of the substituent of the alkylene group include a halogen atom, an alkoxy group, a hydroxyl group, an aromatic group, or the like. Specific examples of the substituent include halogen atoms such as a fluorine atom, a chlorine atom and a bromine atom; the alkoxy group such as a methoxy group, an ethoxy group, a propoxy group, a cyclohexyl group, or the like; the aromatic group such as a phenyl group, a methylphenyl group, a dimethylphenyl group, a halogenated phenyl group, a naphthyl group, a methylnaphthyl group, a halogenated naphthyl group, an anthracene group, or the like. The substituent is preferably unsubstituted from the viewpoint of abrasion resistance.

Specific examples of the linear alkylene group include an ethylene group, a trimethylene group, a tetramethylene group, a pentamethylene group, a hexamethylene group, a heptamethylene group, an octamethylene group, a nonamethylene group, a decamethylene group, or the like. Examples of the branched alkylene group include a methylethylene group, a 1-methyltrimethylene group, a 2-methyltrimethylene group, a 2,2-dimethyltrimethylene group, a 2-methyl-2-ethyl-trimethylene group, a 2-butyl-2-ethyl-trimethylene group, a 2-methyltetramethylene group, a 1-methyl-pentamethylene group, a 1,2-dimethylpentamethylene group, a 1,3-dimethylpentamethylene group, a 1-methylhexamethylene group, a 2-methylhexamethylene group, a 3-methylhexamethylene group, or the like. Examples of the cyclic alkylene group include a 1,2-cyclopentylene group, a 1,3-cyclopentylene group, a 1,4-cyclohexylene group, a 1,4-cyclohexanedimethylene group, or the like.

$R^2$ is an alkylene group which may have a substituent and the preferable one thereof is the same as the case where $R^1$ is an alkylene group which may have a substituent.

$R^3$ is not particularly limited as long as it is a divalent group, and is preferably a group same as $R^1$ or an arylene group which may have a substituent from the viewpoint of electrical properties.

Specific examples of the arylene group which may have a substituent include a phenylene group, a naphthylene group, an anthrylene group, a phenanthrylene group, a pyrenylene group, a biphenylene group, or the like. A phenylene group, a naphthylene group, and a biphenylene group are preferred from the viewpoint of electrical properties, and a phenylene group is preferred from the viewpoint of solubility.

Examples of the substituent include an alkyl group, an alkoxy group, a halogenated alkyl group, a halogen atom, a benzyl group, or the like. Among these substituents, the number of carbon atoms of the alkyl group, the alkoxy group and the halogenated alkyl group is generally 1 or more, and is generally 10 or less, preferably 8 or less, more preferably 6 or less, and still more preferably 4 or less.

Specific examples of the alkyl group include a methyl group, an ethyl group, a propyl group, an isopropyl group, a butyl group, a tert-butyl group, an isobutyl group, a cyclohexyl group, or the like. Specific examples of the alkoxy group include a methoxy group, an ethoxy group, a propoxy group, a cyclohexoxy group, or the like. Examples of the halogenated alkyl group include a chloroalkyl group, a fluoroalkyl group, or the like. Examples of the halogen atom include a fluorine atom, a chlorine atom, a bromine atom, or the like. A methyl group and an ethyl group are more preferred.

$R^3$ is more preferably an arylene group having no substituent from the viewpoint of abrasion resistance.

$n^1$ represents the number of repeating units and is an integer of 1 to 100. $n^1$ is preferably 2 or more, more preferably 3 or more, still more preferably 5 or more; on the other hand, it is preferably 50 or less, more preferably 30 or less, and still more preferably 20 or less. When $n^1$ is within the above range, moderate flexibility can be imparted to the polyester resin, and the abrasion resistance of the polyester resin is improved.

$n^2$ represents the number of repeating units and is an integer of 1 to 10. $n^2$ is preferably 5 or less, more preferably 4 or less, still more preferably 3 or less, even more preferably 2 or less, and particularly preferably 1, from the viewpoints of abrasion resistance and electrical properties.

$n^3$ represents the number of repeating units and is an integer of 1 to 100. $n^3$ is preferably 2 or more, more preferably 3 or more, still more preferably 5 or more; on the other hand, it is preferably 50 or less, more preferably 30 or less, and still more preferably 20 or less. In a case of being within the above ranges, moderate flexibility can be imparted to the polyester resin, and the abrasion resistance of the polyester resin is improved.

$n^4$ and $n^5$ each represent the number of repeating units, each independently an integer of 1 to 100. $n^4$ or $n^5$ is preferably 2 or more, more preferably 3 or more, still more preferably 5 or more; on the other hand, it is preferably 30 or less, more preferably 20 or less, and still more preferably 15 or less. When $n^4$ and $n^5$ are within the above ranges, moderate flexibility can be imparted to the polyester resin, and the abrasion resistance of the polyester resin is improved.

$n^6$ represents the number of repeating units and is an integer of 2 to 100. $n^6$ is preferably 3 or more, and more preferably 5 or more; on the other hand, it is preferably 80 or less, more preferably 50 or less, and still more preferably 30 or less. When $n^6$ is within the above range, moderate flexibility can be imparted to the polyester resin, and the abrasion resistance of the polyester resin is improved.

Specific examples of a divalent polycarbonate diol which derives a structure represented by Formula (1) include: poly(1,2-ethanediol carbonate), poly(1,3-propanediol carbonate), poly(1,4-butanediol carbonate), poly(1,5-pentanediol carbonate), poly(1,6-hexanediol carbonate), poly(1,8-octanediol carbonate), poly(1,10-decanediol carbonate), poly(2-methyl-1,3-propanediol carbonate), poly(2,2-dimethyl-1,3-propanediol carbonate), poly(2-methyl-1,5-pentanediol carbonate), poly(3-methyl-1,5-pentanediol carbonate), poly(1,4-cyclohexanedimethanol carbonate), poly(1,4-cyclohexanediol carbonate), poly[di(ethylene glycol) carbonate], or the like.

Among these, poly(1,2-ethanediol carbonate), poly(1,3-propanediol carbonate), poly(1,4-butanediol carbonate), poly(1,5-pentanediol carbonate), poly(1,6-hexanediol carbonate), poly(2-methyl-1,3-propanediol carbonate), poly(2,2-dimethyl-1,3-propanediol carbonate), and poly(3-methyl-1,5-pentanediol carbonate) are preferred from the viewpoint of adhesion.

Poly(1,2-ethanediol carbonate), poly(1,3-propanediol carbonate), and poly(1,4-butanediol carbonate) are particularly preferred from the viewpoint of abrasion resistance.

The above polycarbonate diols may be used alone, or a plurality of polycarbonate diols may be used in combination, or a copolymer obtained by polymerizing a plurality of polycarbonate diols may be used.

Specific examples of a divalent polyester diol which derives a structure represented by the Formula (2) include: poly(1,2-ethanediol malonate), poly(1,3-propanediol malonate), poly(1,4-butanediol malonate), poly(1,5-pentanediol malonate), poly(1,6-hexanediol malonate), poly(1,8-octanediol malonate), poly(1,10-octanediol malonate), poly(2-methyl-1,3-propanediol malonate), poly(2,2-dimethyl-1,3-propanediol malonate), poly(2-methyl-1,5-pentanediol malonate), poly(3-methyl-1,5-pentanediol malonate), poly(1,4-cyclohexanedimethanol malonate), poly(1,4-cyclohexanediol malonate), poly[di(ethylene glycol) malonate], poly(1,2-ethanediol succinate), poly(1,3-propanediol succinate), poly(1,4-butanediol succinate), poly(1,5-pentanediol succinate), poly(1,6-hexanediol succinate), poly(1,8-octanediol succinate), poly(1,10-octanediol succinate), poly(2-methyl-1,3-propanediol succinate), poly(2,2-dimethyl-1,3-propanediol succinate), poly(2-methyl-1,5-pentanediol succinate), poly(3-methyl-1,5-pentanediol succinate), poly(1,4-cyclohexanedimethanol succinate), poly(1,4-cyclohexanediol succinate), poly[di(ethylene glycol) succinate], poly(1,2-ethanediol glutarate), poly(1,3-propanediol glutarate), poly(1,4-butanediol glutarate), poly(1,5-pentanediol glutarate), poly(1,6-hexanediol glutarate), poly(1,8-octanediol glutarate), poly(1,10-octanediol glutarate), poly(2-methyl-1,3-propanediol glutarate), poly(2,2-dimethyl-1,3-propanediol glutarate), poly(2-methyl-1,5-pentanediol glutarate), poly(3-methyl-1,5-pentanediol glutarate), poly(1,4-cyclohexanedimethanol glutarate), poly(1,4-cyclohexanediol glutarate), poly[di(ethylene glycol) glutarate], poly(1,2-ethanediol adipate), poly(1,3-propanediol adipate), poly(1,4-butanediol adipate), poly(1,5-pentanediol adipate), poly(1,6-hexanediol adipate), poly(1,8-octanediol adipate), poly(1,10-octanediol adipate), poly(2-methyl-1,3-propanediol adipate), poly(2,2-dimethyl-1,3-propanediol adipate), poly(2-methyl-1,5-pentanediol adipate), poly(3-methyl-1,5-pentanediol adipate), poly(1,4-cyclohexanedimethanol adipate), poly(1,4-cyclohexanediol adipate), poly[di(ethylene glycol) adipate], poly(1,2-ethanediol pimelate), poly(1,3-propanediol pimelate), poly(1,4-butanediol pimelate), poly(1,5-pentanediol pimelate), poly(1,6-hexanediol pimelate), poly(1,8-octanediol pimelate), poly(1,10-octanediol pimelate), poly(2-methyl-1,3-propanediol pimelate), poly(2,2-dimethyl-1,3-propanediol pimelate), poly(2-methyl-1,5-pentanediol pimelate), poly(3-methyl-1,5-pentanediol pimelate), poly(1,4- cyclohexanedimethanol pimelate), poly(1,4-cyclohexanediol pimelate), poly[di(ethylene glycol) pimelate], poly(1,2-ethanediol suberate), poly(1,3-propanediol suberate), poly(1,4-butanediol suberate), poly(1,5-pentanediol suberate), poly(1,6-hexanediol suberate), poly(1,8-octanediol suberate), poly(1,10-octanediol suberate), poly(2-methyl-1,3-propanediol suberate), poly(2,2-dimethyl-1,3-propanediol suberate), poly(2-methyl-1,5-pentanediol suberate), poly(3-methyl-1,5-pentanediol suberate), poly(1,4-cyclohexanedimethanol suberate), poly(1,4-cyclohexanediol suberate), poly[di(ethylene glycol) suberate], poly(1,2-ethanediol terephthalate), poly(1,3-propanediol terephthalate), poly(1,4-butanediol terephthalate), poly(1,5-pentanediol terephthalate), poly(1,6-hexanediol terephthalate), poly(1,8-octanediol terephthalate), poly(1,10-octanediol terephthalate), poly(2-methyl-1,3-propanediol terephthalate), poly(2,2-dimethyl-1,3-propanediol terephthalate), poly(2-methyl-1,5-pentanediol terephthalate), poly(3-methyl-1,5-pentanediol terephthalate), poly(1,4-cyclohexanedimethanol terephthalate), poly(1,4-cyclohexanediol terephthalate), poly[di(ethylene glycol) terephthalate], poly(1,2-ethanediol isophthalate), poly(1,3-propanediol isophthalate), poly(1,4-butanediol isophthalate), poly(1,5-pentanediol isophthalate), poly(1,6-hexanediol isophthalate), poly(1,8-octanediol isophthalate), poly(1,10-octanediol isophthalate), poly(2-methyl-1,3-propanediol isophthalate), poly(2,2-dimethyl-1,3-propanediol isophthalate), poly(2-methyl-1,5-pentanediol isoplithalate), poly(3-methyl-1,5-pentanediol isophthalate), poly(1,4-cyclohexanedimethanol isophthalate), poly(1,4-cyclohexanediol isophthalate), poly[di(ethylene glycol) isophthalate], poly(1,2-ethanediol phthalate), poly(1,3-propanediol phthalate), poly(1,4-butanediol phthalate), poly(1,5-pentanediol phthalate), poly(1,6-hexanediol phthalate), poly(1,8-octanediol phthalate), poly(1,10-octanediol phthalate), poly(2-methyl-1,3-propanediol phthalate), poly(2,2-dimethyl-1,3-propanediol phthalate), poly(2-methyl-1,5-pentanediol phthalate), poly(3-methyl-1,5-pentanediol phthalate), poly(1,4-cyclohexanedimethanol phthalate), poly(1,4-cyclohexanediol phthalate), poly[di(ethylene glycol) phthalate], or the like.

Among these, from the viewpoint of solubility, preferred are poly(1,2-ethanediol malonate), poly(1,3-propanediol malonate), poly(1,4-butanediol malonate), poly(1,5-pentanediol malonate), poly(1,6-hexanediol malonate), poly(2-methyl-1,3-propanediol malonate), poly(2,2-dimethyl-1,3-propanediol malonate), poly(2-methyl-1,5-pentanediol malonate), poly(3-methyl-1,5-pentanediol malonate), poly[di(ethylene glycol) malonate], poly(1,2-ethanediol succinate), poly(1,3-propanediol succinate), poly(1,4-butanediol succinate), poly(1,5-pentanediol succinate), poly(1,6-hexanediol succinate), poly(2-methyl-1,3-propanediol succinate), poly(2,2-dimethyl-1,3-propanediol succinate), poly(2-methyl-1,5-pentanediol succinate), poly(3-methyl-1,5-pentanediol succinate), poly[di(ethylene glycol) succinate], poly(1,2-ethanediol glutarate), poly(1,3-propanediol glutarate), poly(1,4-butanediol glutarate), poly(1,5-pentanediol glutarate), poly(1,6-hexanediol glutarate), poly(2-methyl-1,3-propanediol glutarate), poly(2,2-dimethyl-1,3-propanediol glutarate), poly(2-methyl-1,5-pentanediol glutarate), poly(3-methyl-1,5-pentanediol glutarate), poly[di(ethylene glycol) glutarate], poly(1,2-ethanediol adipate), poly(1,3-propanediol adipate), poly(1,4-butanediol adipate), poly(1,5-pentanediol adipate), poly(1,6-hexanediol adipate), poly(2-methyl-1,3-propanediol adipate), poly(2,2-dimethyl-1,3-propanediol adipate), poly(2-methyl-1,5-pentanediol adipate), poly(3-methyl-1,5-pentanediol adipatc), poly[di(ethylene glycol) adipate], poly(1,2-ethanediol terephtha late), poly(1,3-propanediol terephthalate), poly(1,4-butanediol terephthalate), poly(1,5-pentanediol terephthalate), poly(1,6-hexanediol terephthalate), poly(2-methyl-1,3-propanediol terephthalate), poly(2,2-dimethyl-1,3-propanediol terephthalate), poly(2-methyl-1,5-pentanediol terephthalate), poly(3-methyl-1,5-pentanediol terephthalate), poly[di(ethylene glycol) terephthalate], poly(1,3-propanediol isophthalate), poly(1,4-butanediol isophthalate), poly(1,5-pentanediol isophthalate), poly(1,6-hexanediol isophthalate), poly(2-methyl-1,3-propanediol isophthalate), poly(2-methyl-1,5-pentanediol isophthalate), poly(3-methyl-1,5-pentanediol isophthalate), poly(1,2-ethanediol phthalate), poly(1,3-propanediol phthalate), poly(1,4-butanediol phthalate), poly(1,5-pentanediol phthalate), poly(1,6-hexanediol phthalate), poly(2-methyl-1,5-pentanediol phthalate), and poly(3-methyl-1,5-pentanediol phthalate).

From the viewpoint of adhesion, more preferred arc poly(1,2-ethanediol adipate), poly(1,3-propanediol adipate), poly(1,4-butanediol adipate), poly(1,5-pentanediol adipate), poly(1,6-hexanediol adipate), poly(2-methyl-1,3-propanediol adipate), poly(2,2-dimethyl-1,3-propanediol adipate), poly(2-methyl-1,5-pentanediol adipate), poly(3-methyl-1,5-pentanediol adipate), poly[di(ethylene glycol) adipate], poly(1,4-butanediol terephthalate), poly(1,5-pentanediol terephthalate), poly(1,6-hexanediol terephthalate), poly(2-methyl-1,3-propanediol terephthalate), poly(2-methyl-1,5-pentanediol terephthalate), poly(3-methyl-1,5-pentanediol terephthalate), poly(1,4-butanediol isophthalate), poly(1,5-pentanediol isophthalate), poly(1,6-hexanediol isophthalate), poly(2-methyl-1,3-propanediol isophthalate), poly(2-methyl-1,5-pentanediol isophthalate), poly(3-methyl-1,5-pentanediol isophthalate), poly(1,4-butanediol phthalate), poly(1,5-pentanediol phthalate), poly(1,6-hexanediol phthalate), poly(2-methyl-1,5-pentanediol phthalate), and poly(3-methyl-1,5-pentanediol phthalate).

From the viewpoint of abrasion resistance, particularly preferred are poly(1,2-ethanediol adipate), poly(1,3-propanediol adipate), poly(1,4-butanediol adipate), poly(1,4-butanediol terephthalate), poly(1,5-pentanediol terephthalate), poly(1,6-hexanediol terephthalate), poly(2-methyl-1,3-propanediol terephthalate), poly(2-methyl-1,5-pentanediol terephthalate), poly(3-methyl-1,5-pentanediol terephthalate), poly(1,4-butanediol isophthalate), poly(1,5-pentanediol isophthalate), poly(1,6-hexanediol isophthalate), poly(3-methyl-1,5-pentanediol isophthalate), poly(1,4-butanediol phthalate), poly(1,5-pentanediol phthalate), poly(1,6-hexanediol phthalate), and poly(3-methyl-1,5-pentanediol phthalate).

From the viewpoint of electrical properties, still more preferred are poly(1,4-butanediol terephthalate), poly(1,5-pentanediol terephthalate), poly(1,6-hexanediol terephthalate), poly(2-methyl-1,3-propanediol terephthalate), poly(2-methyl-1,5-pentanediol terephthalate), poly(3-methyl-1,5-pentanediol terephthalate), poly(1,4-butanediol isophthalate), poly(1,5-pentanediol isophthalate), poly(1,6-hexanediol isophthalate), poly(3-methyl-1,5-pentanediol isophthalate), poly(1,4-butanediol phthalate), poly(1,5-pentanediol phthalate), poly(1,6-hexanediol phthalate), and poly(3-methyl-1,5-pentanediol phthalate).

The above polyester diols may be used alone, or a plurality of polyester diols may be used in combination, or a copolymer obtained by polymerizing a plurality of polyester diols may be used.

Specific examples of the structure represented by Formula (3) are shown below.

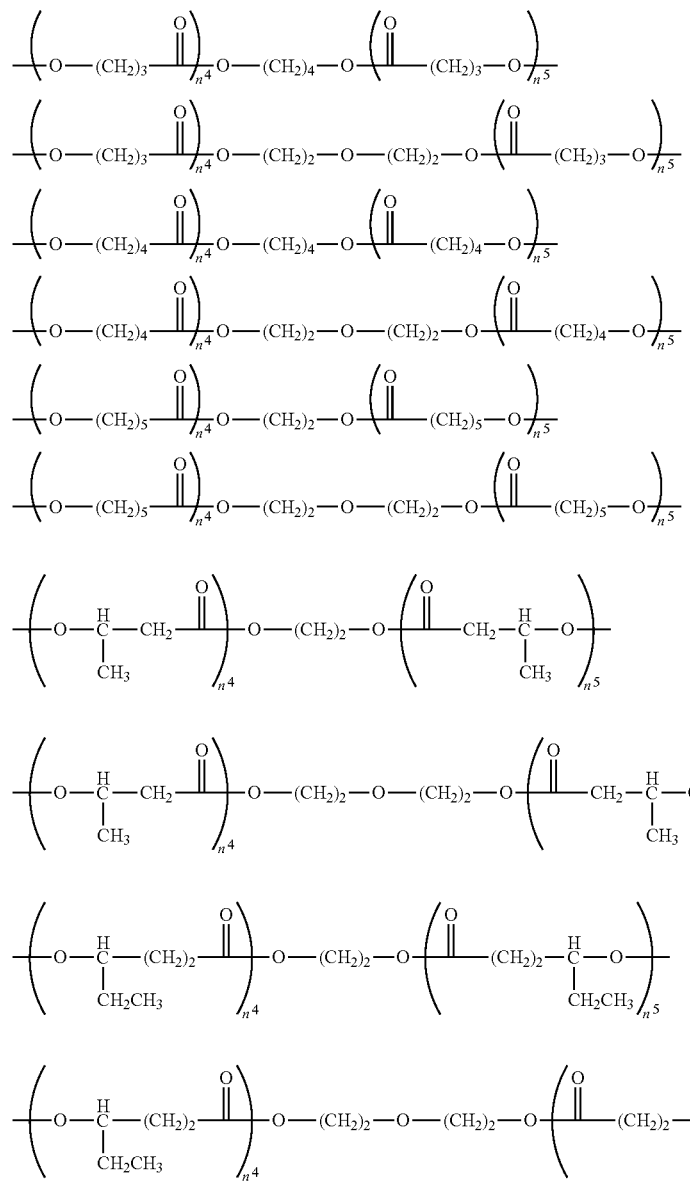

From the viewpoints of electrical properties and abrasion resistance, polycaprolactone diol residues as shown in the following specific examples are particularly preferred.

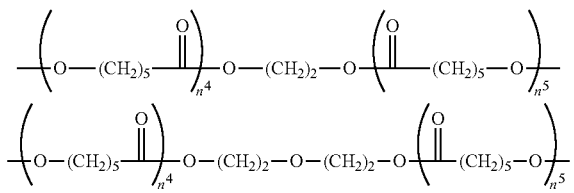

Specific examples of a divalent poly(alkylene glycol) which derives a structure represented by the Formula (4) include: poly(ethylene glycol), poly(1,2-propylene glycol), poly(1,3-propylene glycol), polytetramethylene ether glycol (PTMG), poly(1,5-pentylene glycol), or the like. From the viewpoints of electrical properties and abrasion resistance, polytetramethylene ether glycol is particularly preferred.

The above poly(alkylene glycol) may be used alone, or a plurality of poly(alkylene glycol) may be used in combination, or a copolymer obtained by polymerizing a plurality of poly(alkylene glycol) may be used.

Examples of a group linking at least one structure selected from the group consisting of a structure represented by the Formula (1), a structure represented by the Formula (2), a structure represented by the Formula (3) and a structure represented by the Formula (4) with a divalent carboxylic acid residue are shown below, but the group is not limited thereto, and any group can be used as long as the effect of the present invention is not significantly impaired. Among these, it is preferable to have a group represented by at least one formula selected from the group consisting of the following Formulas (1-1), (2-1), (3-1) and (4-1) in consideration of easiness of producing raw materials.

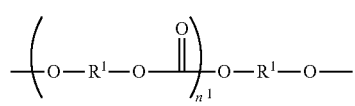
(1-1)
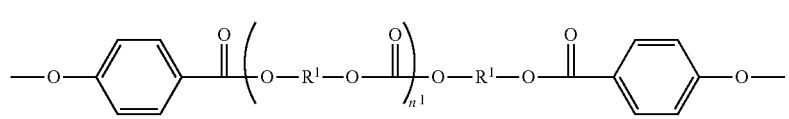
(1-2)
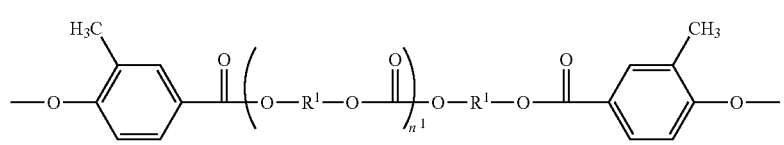
(1-3)
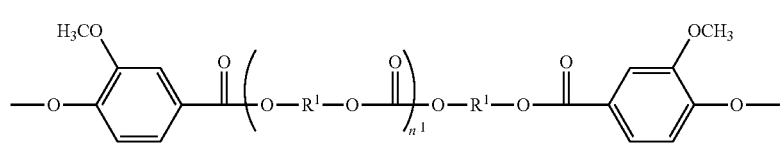
(1-4)
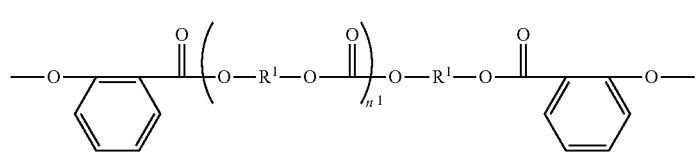
(1-5)
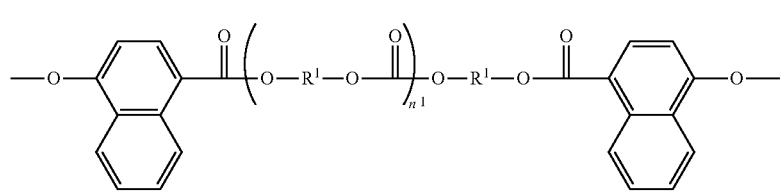
(1-6)
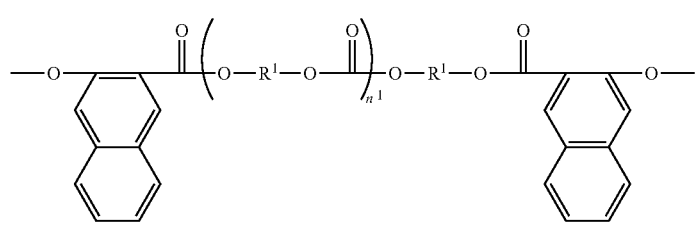
(1-7)
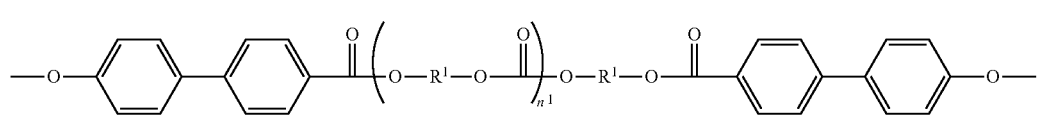
(1-8)
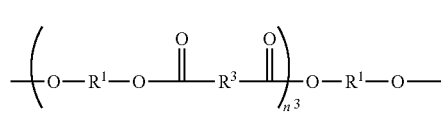
(2-1)
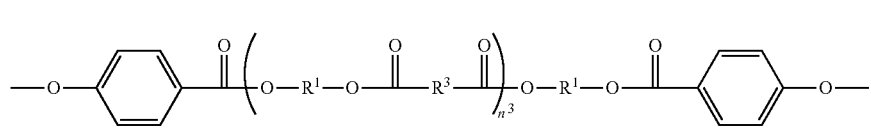
(2-2)
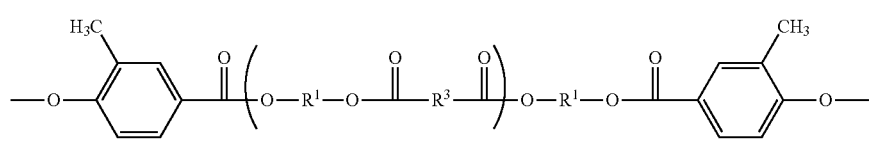
(2-3)

-continued
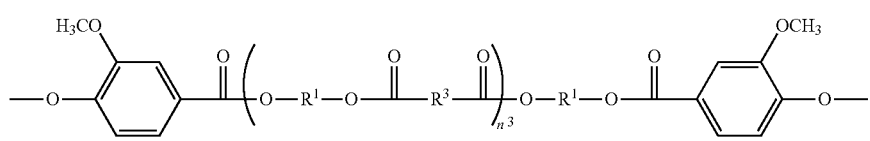
(2-4)
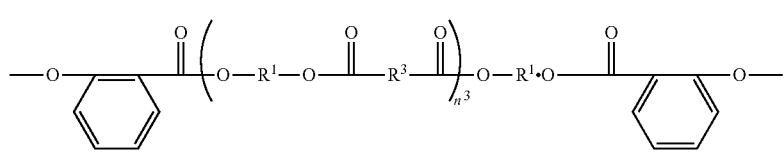
(2-5)
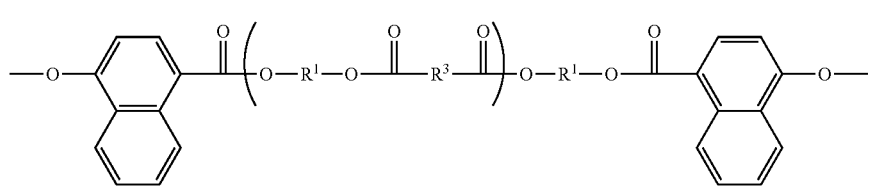
(2-6)
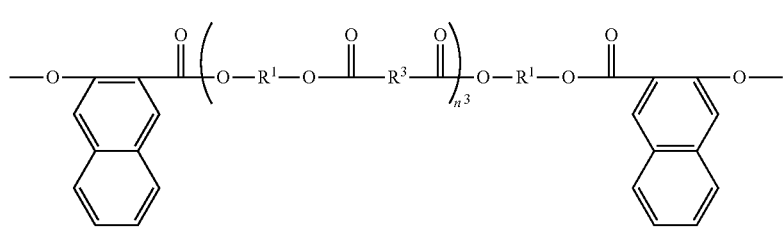
(2-7)
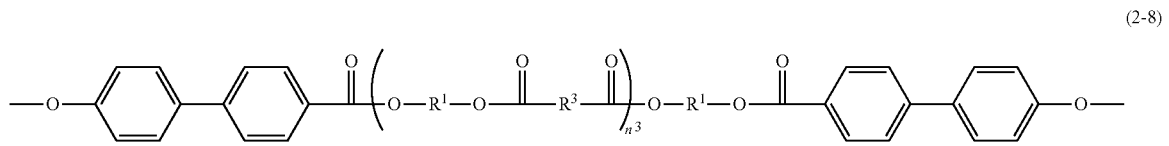
(2-8)
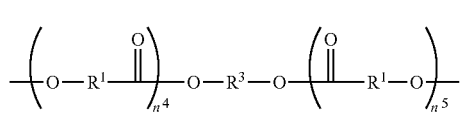
(3-1)
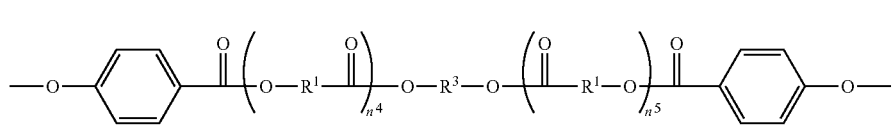
(3-2)
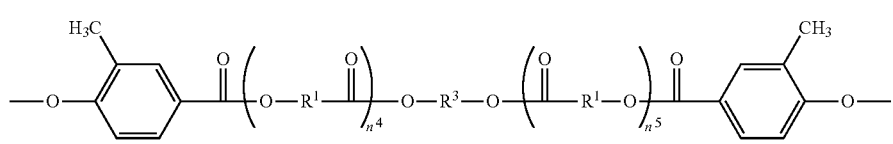
(3-3)
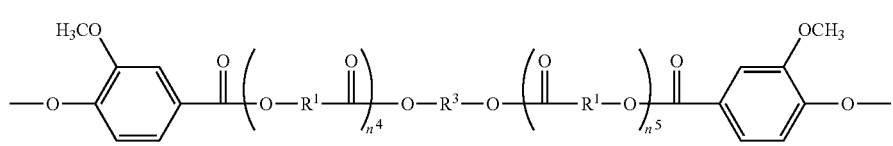
(3-4)
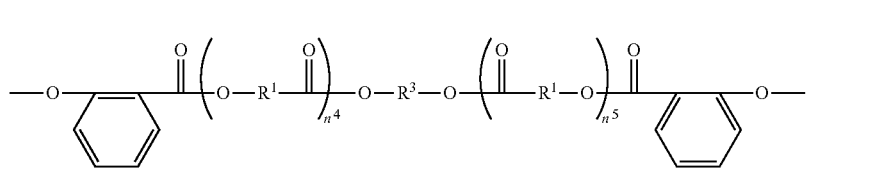
(3-5)

-continued

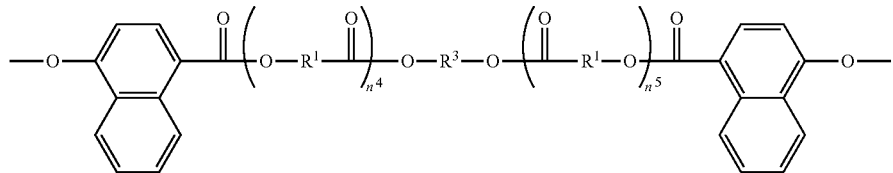
(3-6)

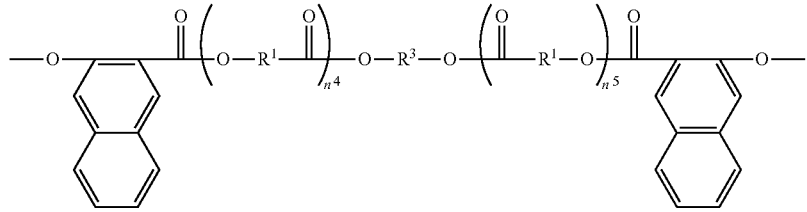
(3-7)

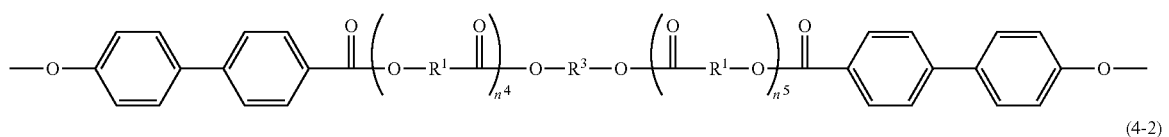
(3-8)

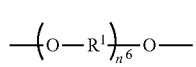
(4-1)

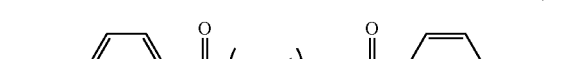
(4-2)

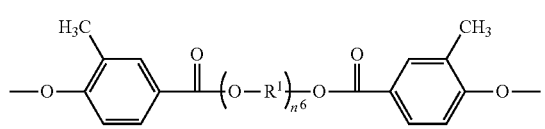
(4-3)

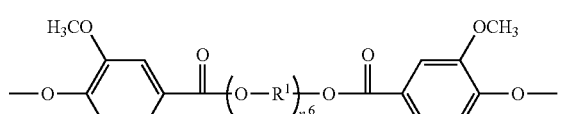
(4-4)

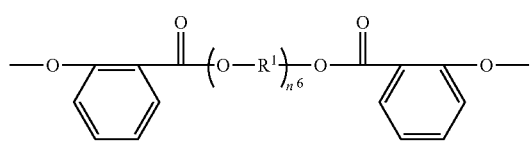
(4-5)

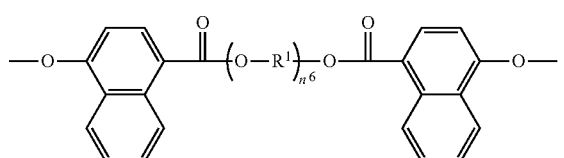
(4-6)

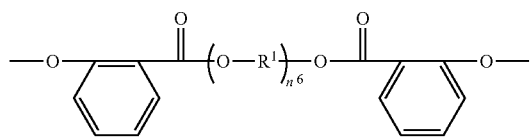
(4-7)

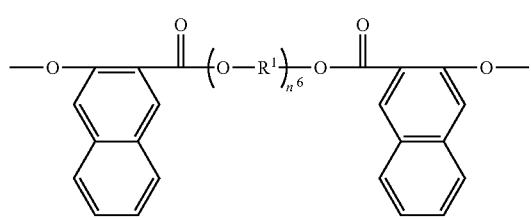
(4-8)

The polyester resin in the present invention may contain at least one structure selected from the group consisting of a structure represented by the Formula (1), a structure represented by the Formula (2), a structure represented by the Formula (3) and a structure represented by the Formula (4), and preferably contains at least one structure α selected from the group consisting of a structure represented by Formula (1), a structure represented by Formula (2) and a structure represented by Formula (3). It is also possible to use a plurality of the structures in combination as required. In a case where a plurality of the structures are used in combination, $R^1$ and $R^2$ in different structures may be the same or different from each other.

In addition, the polyester resin in the present invention preferably contains a structure represented by Formula (4). In this case, it is preferable that the divalent phenol residue contains a structure represented by the Formula (6), the divalent carboxylic acid residue contains a structure represented by the Formula (7), and at least a part of the structure represented by the Formula (6) and at least a part of the structure represented by the Formula (7) are directly bonded.

The content of the structure α or the at least one structure selected from the group consisting of a structure represented by the Formula (1), a structure represented by the Formula (2), a structure represented by the Formula (3) and a structure represented by the Formula (4) is not particularly limited, and it is preferably 0.01% by mass or more, more preferably 0.1% by mass or more, still more preferably 0.5% by mass or more, and even more preferably 1% by mass or more in the polyester resin. On the other hand, the content is preferably 50% by mass or less, more preferably 40% by mass or less, still more preferably 35% by mass or less, and even more preferably 20% by mass or less. When the content is within the above range, moderate flexibility can be imparted to the polyester resin, the abrasion resistance of the polyester resin can be improved, and good electrical properties can be obtained since it is excellent in compatibility with charge transport substances.

The polyester resin in the present invention can contain any nonaromatic divalent alcohol residue in addition to the structure represented by the Formula (1), the structure represented by the Formula (2), the structure represented by the Formula (3) and the structure represented by the Formula (4). Specific examples of the divalent alcohol as the base of the nonaromatic divalent alcohol residue include: linear alkylene diols such as ethylene glycol, 1,3-propanediol, 1,4-butanediol, 1,6-hexanediol and 1,8-octanediol; branched alkylene diols such as 1,2-propanediol, 2-methyl-1,3-propanediol, 2,2-dimethyl 1,3-propanediol, 2-methyl-1,5-pentanediol, 3-methyl-1,5-pentanediol; cyclic alkylene diols such as 1,2-cyclopentanediol, 1,3-cyclopentanediol, 1,2-cyclohexanediol, 1,3-cyclohexanediol, 1,4-cyclohexanediol, 1,4-cyclohexanedimethanol; 1,4-dihydroxy-2-butene; perfluoroalkyl-containing diols; polysiloxane-containing diols; or the like.

The at least one structure selected from the group consisting of a structure represented by the Formula (1), a structure represented by the Formula (2), a structure represented by the Formula (3) and a structure represented by the Formula (4) generally has a number average molecular weight of 16,000 or less, preferably 15,000 or less, more preferably 14,000 or less, further preferably 12,000 or less, still more preferably 10,000 or less, even more preferably 8,000 or less, particularly preferably 6,000 or less, and most preferably 4,000 or less. When the number average molecular weight is within the above range, occurrence of phase separation is suppressed when formed into a coating film, a local structure interfering with the transport of charges hardly occurs, and good electrical properties are easily obtained.

On the other hand, the lower limit is not particularly limited, and is generally 300 or more, preferably 500 or more, more preferably 800 or more, and still more preferably 1,000 or more. When the number average molecular weight is within the above range, the stress relaxation ability of the polyester resin can be enhanced and good abrasion resistance can be easily obtained.

In the present invention, the number average molecular weight of the structure represented by the Formula (1), the structure represented by the Formula (2), the structure represented by the Formula (3) and/or the structure represented by the Formula (4) cannot be directly measured, but the number average molecular weight of the raw material (prepolymer) which derives the partial structure can be calculated based on a hydroxyl value measured in accordance with JIS K 1557-1:2007.

Specifically, the hydroxyl value is measured, and the number average molecular weight is calculated by a terminal group determination method with {(56.1×1000×valence)/hydroxyl value} [mgKOH/g]. In the above equation, the valence is the number of hydroxyl groups in one molecule.

In this specification, the number average molecular weight is synonymous with molecular weight in terms of hydroxyl group (molecular weight in terms of OH group). The number average molecular weight of the structure represented by the Formula (1), the structure represented by the Formula (2), the structure represented by the Formula (3) and/or the structure represented by the Formula (4) is generally a value obtained by subtracting 2 (atomic weight of hydrogen atom at both terminals) from the number average molecular weight of these prepolymers.

The polyester resin in the present invention contains a divalent phenol residue. The structure of the divalent phenol residue is not particularly limited, and examples thereof include a structure represented by the following Formula (6). Examples of the divalent phenol residue other than the structure represented by the Formula (6) include hydroquinone, methylhydroquinone, resorcinol, catechol, 1,6-dihydroxynaphthalene, 1,7-dihydroxynaphthalene, 1,4-dihydroxynaphthalene, 2,6-dihydroxynaphthalene, 2,7-dihydroxynaphthalene, 4-hydroxyphenyl 4-hydroxybenzoate, 1,4-bis(4-hydroxybenzoic acid) phenyl, 4,4'-bis(4-hydroxybenzoic acid) biphenyl, 4,4'-bis(4-hydroxybenzoic acid)-3,3',5,5'-tetramethyl-biphenyl, or the like, when exemplifying a divalent phenol as the base of the divalent phenol residue.

Among these, the divalent phenol residue preferably contains a structure represented by the following Formula (6) from the viewpoints of electrical properties, abrasion resistance and solubility.

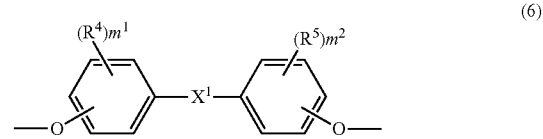

(6)

In the Formula (6), $R^4$ and $R^5$ each independently represent a hydrogen atom, a halogen atom, a hydrocarbon group or an alkoxy group, and part or all of hydrogen atoms in the hydrocarbon group and the alkoxy group may be substituted with a halogen atom. $X^1$ represents a single bond, —$CR^6R^7$—, —O—, —CO— or —S—. $R^6$ and $R^7$ each independently represent a hydrogen atom, a halogen atom, a hydrocarbon group or an alkoxy group, and part or all of hydrogen atoms in the hydrocarbon group and the alkoxy group may be substituted with a halogen atom. In addition, $R^6$ and $R^7$ may be bonded to each other to form a ring. $m^1$ and $m^2$ each independently represent an integer of 0 to 4.

Examples of the halogen atom of $R^4$ and $R^5$ include a fluorine atom, a chlorine atom and a bromine atom, and a fluorine atom is preferred from the viewpoints of easiness of production and abrasion resistance.

The hydrocarbon group of $R^4$ and $R^5$ is not particularly limited, and specific examples thereof include an alkyl group, an alkenyl group, an alkynyl group, an aryl group, or the like. An alkyl group or an aryl group is preferred.

The number of carbon atoms in the hydrocarbon group is not particularly limited, and is generally 1 or more, and is generally 20 or less, preferably 16 or less, more preferably 12 or less, still more preferably 10 or less, even more preferably 8 or less, and particularly preferably 6 or less.

In the case of an alkyl group, the number of carbon atoms thereof is not particularly limited, and is generally 1 or more, and is generally 20 or less, preferably 16 or less, more preferably 12 or less, still more preferably 10 or less, even more preferably 8 or less, still more preferably 6 or less, particularly preferably 4 or less, and most preferably 1. In the case of an alkenyl group, the number of carbon atoms thereof is not particularly limited, and is generally 1 or more, and is generally 20 or less, preferably 16 or less, more preferably 12 or less, still more preferably 10 or less, even more preferably 8 or less, further more preferably 6 or less, particularly preferably 4 or less, and most preferably 2. In the case of an alkynyl group, the number of carbon atoms thereof is not particularly limited, and is generally 1 or more, and is generally 20 or less, preferably 16 or less, more preferably 12 or less, still more preferably 10 or less, even more preferably 8 or less, further more preferably 6 or less, particularly preferably 4 or less, and most preferably 2. In the case of an aryl group, the number of carbon atoms thereof is not particularly limited, and is generally 6 or more, and is generally 20 or less, preferably 16 or less, more preferably 14 or less, still more preferably 12 or less, even more preferably 10 or less, particularly preferably 8 or less, and most preferably 6.

The above range is preferred from the viewpoints of easiness of production and abrasion resistance.

Specific examples of the alkyl group of $R^4$ and $R^5$ include a methyl group, an ethyl group, a propyl group, an isopropyl group, a butyl group, a tert-butyl group, a cyclohexyl group, or the like. A methyl group and an ethyl group are preferred, and a methyl group is more preferred.

Examples of an alkyl group in which a part or all of hydrogen atoms are substituted with a halogen atom include a fluoromethyl group, a difluoromethyl group, a trifluoromethyl group, a fluoroethyl group, a difluoroethyl group, a trifluoroethyl group, a tetrafluoroethyl group, a pentafluoroethyl group, or the like. A fluoromethyl group, a difluoromethyl group, a trifluoromethyl group, and a pentafluoroethyl group are preferred, and a trifluoromethyl group is more preferred.

Examples of the aryl group include a phenyl group, a methylphenyl group, a dimethylphenyl group, a naphthyl group, or the like. Examples of the aryl group in which a part or all of the hydrogen atoms are substituted with a halogen atom include a halogenated phenyl group. A fluorophenyl group is preferred.

Specific examples of the alkoxy group include a methoxy group, an ethoxy group, a propoxy group, a cyclohexoxy group, or the like.

The substituents as mentioned above are preferred from the viewpoints of easiness of production and abrasion resistance.

In a case where $R^6$ and $R^7$ are each independently a hydrogen atom, a halogen atom, a hydrocarbon group or an alkoxy group, $R^6$ and $R^7$ have the same meaning as $R^4$ or $R^5$.

In a case where $R^6$ and $R^7$ are bonded to each other to form a ring, the number of carbon atoms thereof is not particularly limited, and is generally 5 or more, preferably 6 or more, and is generally 20 or less, preferably 16 or less, more preferably 12 or less, still more preferably 10 or less, even more preferably 8 or less. Specific examples of the case where $R^6$ and $R^7$ are bonded to each other to form a ring include a cycloalkylidene group, or the like. A cyclopentylidene group, a cyclohexylidene group, and a cycloheptylidene group are preferred. It is also preferable that the hydrocarbon groups are further substituted in these substituents. As a specific example thereof, a 2,2,4-trimethylpentylidene group is preferred.

$m^1$ and $m^2$ are preferably 0 to 2, and more preferably 0 or 1, from the viewpoint of abrasion resistance.

In a case where $m^1$ and $m^2$ are an integer of 0 to 3, the unsubstituted moiety represents a hydrogen atom. For example, a case where $m^1=4$ and all of $R^4$(s) are a hydrogen atom has the same meaning as a case where $m^1=0$. Similarly, a case where $m^2=4$ and all of $R^5$(s) are a hydrogen atom has the same meaning as a case where $m^2=0$.

From the viewpoint of abrasion resistance, the structure represented by the Formula (6) is preferably a structure represented by the following Formula (6-1).

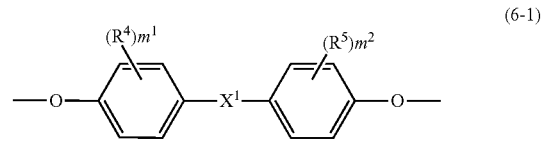

(6-1)

Specific examples of the divalent phenol as the base of the divalent phenol residue represented by the Formula (6) include bis-(4-hydroxyphenyl) methane, bis-(4-hydroxy-3-methylphenyl) methane, bis-(3,5-dimethyl-4-hydroxyphenyl) methane, 1,1-bis-(4-hydroxyphenyl) ethane, 1,1-bis-(4-hydroxy-3-methylphenyl) ethane, 1,1-bis-(3,5-dimethyl-4-hydroxyphenyl) ethane, 1,1-bis-(4-hydroxyphenyl) propane, 1,1-bis-(4-hydroxy-3-methylphenyl) propane, 1,1-bis-(3,5-dimethyl-4-hydroxyphenyl) propane, 2,2-bis-(4-hydroxyphenyl) propane, 2,2-bis-(4-hydroxy-3-methylphenyl) propane, 2,2-bis-(3,5-dimethyl-4-hydroxyphenyl) propane, 1,1-bis-(4-hydroxyphenyl) cyclohexane, 1,1-bis-(4-hydroxy-3-methylphenyl) cyclohexane, 1,1-bis-(3,5-dimethyl-4-hydroxyphenyl) cyclohexane, 1,1-bis-(4-hydroxyphenyl)-1-phenyl ethane, 4,4'-biphenol, 3,3'-dimethyl-4,4'-biphenol, 3,3',5,5' tetramethyl-4,4'-biphenol, 4,4'-dihydroxydiphenyl ether, 3,3'-dimethyl-4,4'-dihydroxydiphenyl ether, bis(4-hydroxyphenyl) sulfide, 4,4'-dihydroxybenzophenone, 2,2-bis(4-hydroxyphenyl) hexafluoropropane, or the like.

Among these, in consideration of easiness of producing the divalent phenol component, solubility, and electrical properties, preferred are bis-(4-hydroxyphenyl) methane, bis-(4-hydroxy-3-methylphenyl) methane, bis-(3,5-dimethyl-4-hydroxyphenyl) methane, 1,1-bis-(4-hydroxyphenyl) ethane, 1,1-bis-(4-hydroxy-3-methylphenyl) ethane, 2,2-bis-(4-hydroxyphenyl) propane, 2,2-bis-(4-hydroxy-3-methylphenyl) propane, 2,2-bis-(3,5-dimethyl-4-hydroxyphenyl) propane, 1,1-bis-(4-hydroxyphenyl) cyclohexane, 4,4'-biphenol, 3,3'-dimethyl-4,4'-biphenol, 3,3',5,5'-tetramethyl-4,4'-biphenol, and 4,4'-dihydroxydiphenyl ether.

Further, in consideration of mechanical properties, more preferred are bis-(4-hydroxyphenyl) methane, bis-(4-hydroxy-3-methylphenyl) methane, 1,1-bis-(4-hydroxyphenyl) ethane, 1,1-bis-(4-hydroxy-3-methylphenyl) ethane, 2,2-bis-(4-hydroxy-3-methylphenyl) propane, 4,4'-biphenol, and 1,1-bis-(4-hydroxyphenyl) cyclohexane.

The content of the divalent phenol residue represented by the Formula (6) is preferably 50% by mol or more, and more preferably 70% by mol or more based on the total amount of the total divalent phenol residue, from the viewpoint of solubility.

The polyester resin in the present invention contains a divalent carboxylic acid residue. The structure of the divalent carboxylic acid residue is not particularly limited, and examples thereof include a divalent aromatic carboxylic acid residue containing a structure represented by the following Formula (7). In addition, examples of the divalent carboxylic acid residue other than the structure represented by the Formula (7) include divalent aliphatic carboxylic acids such as adipic acid, suberic acid and sebacic acid; pyridine-2,3-dicarboxylic acids; pyridine-2,4-dicarboxylic acids; pyridine-2,5-dicarboxylic acids; pyridine-2,6-dicarboxylic acids; pyridine-3,4-dicarboxylic acids; pyridine-3,5-dicarboxylic acids; or the like, when exemplifying a divalent carboxylic acid as the base of divalent carboxylic acid residue.

The divalent carboxylic acid residue preferably contains a structure represented by the following Formula (7) from the viewpoints of electrical properties and abrasion resistance.

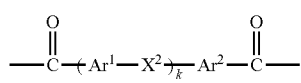

(7)

In the Formula (7), $Ar^1$ to $Ar^2$ each independently represent an arylene group which may have a substituent. $X^2$ represents a single bond, an oxygen atom (—O—), a sulfur atom (—S—), a divalent group having a structure represented by the following Formula (8) or a divalent group having a structure represented by the following Formula (9). k represents an integer of 0 to 5.

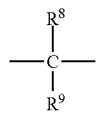

(8)

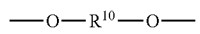

(9)

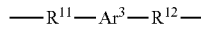

(10)

In the Formula (8), $R^8$ and $R^9$ each independently represent a hydrogen atom, a halogen atom, a hydrocarbon group or an alkoxy group, and part or all of hydrogen atoms in the hydrocarbon group and the alkoxy group may be substituted with a halogen atom. In addition, $R^8$ and $R^9$ may be bonded to each other to form a ring.

In the Formula (9), $R^{10}$ represents an alkylene group, an arylene group or a group represented by the above Formula (10).

In the Formula (10), $R^{11}$ and $R^{12}$ each independently represent an alkylene group, and AP represents an arylene group.

In the Formula (7), $Ar^1$ and $Ar^2$ are preferably an arylene group having 6 to 20 carbon atoms, and examples thereof include a phenylene group, a naphthylene group, an anthrylene group, a phenanthrylene group, a pyrenylene group, or the like. Among these, a phenylene group, a naphthylene group, or a biphenylene group is more preferred from the viewpoint of compatibility between solubility and mechanical properties.

Examples of the substituent which the arylene group may have include a hydrogen atom, an alkyl group, an alkoxy group, an aryl group, a condensed polycyclic group, and a halogen atom.

In consideration of the mechanical properties as the binder resin for the photosensitive layer, and the solubility in the coating fluid for forming a photosensitive layer, the number of carbon atoms in the alkyl group is generally 1 or more, and is generally 10 or less, preferably 8 or less, more preferably 6 or less, still more preferably 4 or less, and even more preferably 2 or less. A methyl group is particularly preferred. The alkoxy group is preferably a methoxy group, an ethoxy group, and a butoxy group. Specific examples of the aryl group include a phenyl group, a methylphenyl group, a dimethylphenyl group, a naphthyl group, or the like. A phenyl group and a naphthyl group are preferred. Examples of the halogen atom include a fluorine atom, a chlorine atom and a bromine atom, and a fluorine atom is preferred from the viewpoints of easiness of production and abrasion resistance.

The number of substituents in $Ar^1$ and $Ar^2$ is not particularly limited, and is preferably 3 or less, more preferably 2 or less, and particularly preferably 1 or less.

$Ar^1$ and $Ar^2$ are preferably the same arylene group having the same substituent from the viewpoints of electrical properties and solubility, and more preferably an unsubstituted phenylene group from the viewpoint of abrasion resistance.

In the Formula (7), $X^2$ represents a single bond, an oxygen atom, a sulfur atom, a divalent group containing a structure represented by the Formula (8) or a divalent group containing a structure represented by the Formula (9). $X^2$ is preferably an oxygen atom from the viewpoint of abrasion resistance.

In the Formula (8), $R^8$ and $R^9$ each independently represent a hydrogen atom, a halogen atom, a hydrocarbon group or an alkoxy group, and part or all of hydrogen atoms in the hydrocarbon group and the alkoxy group may be substituted with a halogen atom. $R^8$ and $R^9$ may be bonded to each other to form a ring. $R^8$ and $R^9$ have the same meaning as $R^6$ and $R^7$ in $X^1$ in the Formula (6), and the preferred embodiments thereof are also the same.

In the Formula (9), $R^{10}$ is an alkylene group, an arylene group or a group represented by the Formula (10); in the Formula (10), $R^{11}$ and $R^{12}$ each independently represent an alkylene group, and $Ar^3$ represents an arylene group. Examples of the alkylene group of $R^{10}$ include a methylene group, an ethylene group, a trimethylene group, or the like, and examples of the arylene group of $R^{10}$ include a phenylene group, a terphenylene group, or the like. Specific examples of the group represented by the Formula (10) include a group represented by the following Formula (11), or the like.

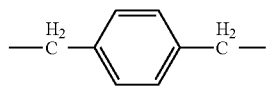

(11)

In the Formula (7), k is an integer of 0 to 5, preferably 3 or less, more preferably 2 or less, still more preferably 1 or less, and particularly preferably 1. The above range is preferred from the viewpoint of abrasion resistance.

In a case where k is 0, specific examples of a divalent carboxylic acid compound which derives the divalent carboxylic acid residue include terephthalic acid, isophthalic acid, phthalic acid, naphthalenedicarboxylic acid, 2,5-dimethylterephthalic acid, bromoterephthalic acid, tetrafluoroterephthalic acid, 5-methylisophthalic acid, 5-tert-butylisophthalic acid, or the like. Terephthalic acid and isophthalic acid are preferred from the viewpoints of solubility and abrasion resistance. In a case where k is 1, the structure represented by the Formula (7) is particularly preferably a structure represented by the following General Formula (12).

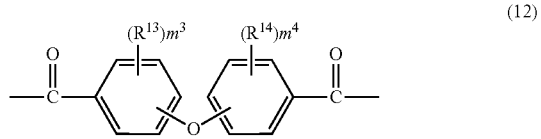

(12)

In the Formula (12), $R^{13}$ and $R^{14}$ each independently represent a hydrogen atom, a halogen atom, a hydrocarbon group or an alkoxy group, and part or all of hydrogen atoms in the hydrocarbon group and the alkoxy group may be substituted with a halogen atom. $m^3$ and $m^4$ are each independently an integer of 0 to 4.

In the Formula (12), $R^{13}$ and $R^{14}$ have the same meaning as $R^4$ and $R^5$ in the Formula (6), and the preferred embodiments thereof are also the same. In consideration of easiness of producing a divalent carboxylic acid compound which derives the divalent carboxylic acid residue having a structure represented by the Formula (12), $R^{13}$ and $R^{14}$ are more preferably a hydrogen atom or a methyl group.

$m^3$ and $m^4$ are each independently an integer of 0 to 4, and particularly preferably $m^3=m^4=0$.

Specific examples of the divalent carboxylic acid compound which derives the divalent carboxylic acid residue having the structure represented by the Formula (12) include diphenyl ether-2,2'-dicarboxylic acid, diphenyl ether-2,4'-dicarboxylic acid, diphenyl ether-4,4'-dicarboxylic acid, or the like. Among these, diphenyl ether-4,4'-dicarboxylic acid is particularly preferred in consideration of mechanical properties.

As the divalent carboxylic acid residue in the polyester resin, a plurality of compounds can also be used in combination as required. In the case of combination, the divalent carboxylic acid residue is not particularly limited, and the divalent carboxylic acid as the base of the divalent carboxylic acid residue is preferably a combination of any two or more selected from diphenyl ether-4,4'-dicarboxylic acid, terephthalic acid, isophthalic acid and biphenyl-4,4'-dicarboxylic acid from the viewpoints of solubility, electrical properties and abrasion resistance.

The total content in the polyester resin of the divalent carboxylic acid residues containing a structure represented by the Formula (7) is not particularly limited, and is preferably 70% by mol or more based on the whole divalent carboxylic acid component. 90% by mol or more is preferred, and 100% by mol is particularly preferred from the viewpoint of abrasion resistance.

The polyester resin preferably has both a divalent phenol residue containing a structure represented by the Formula (6) and a divalent carboxylic acid residue containing a structure represented by the Formula (7), and more preferably at least a part of the structure represented by the Formula (6) and at least a part of the structure represented by the Formula (7) are directly bonded.

From the viewpoint of electrical properties and abrasion resistance, it is preferable to have a portion in which the structure represented by the Formula (6) and the structure represented by the Formula (7) are directly bonded.

The polyester resin contains at least one structure selected from the group consisting of a structure represented by the Formula (1), a structure represented by the Formula (2), a structure represented by the Formula (3) and a structure represented by the Formula (4), and the total amount of the divalent phenol residue and the divalent carboxylic acid residue in the polyester resin is preferably 80% by mass or more, and more preferably 90% by mass or more. Due to the above total amount, a polyester resin having good productivity, and excellent electrical properties, solubility and mechanical properties can be obtained.

The viscosity-average molecular weight (Mv) of the polyester resin is not particularly limited, and is generally 10,000 or more, preferably 25,000 or more, and more preferably 35,000 or more from the viewpoint of mechanical strength. In addition, the viscosity-average molecular weight is generally 200,000 or less, and preferably 150,000 or less from the viewpoint of applicability.

The amount of the carboxylic acid chloride group present at the terminal of the polyester resin is not particularly limited, and is generally 0.1 μeq/g or less, and preferably 0.05 μeq or less. On the other hand, it is preferably 0.001 μeq/g or more, and more preferably 0.003 μeq/g or more. When the amount of the carboxylic acid chloride group at the terminal is within the above range, the storage stability is good when the polyester resin is used in a coating fluid for an electrophotographic photoreceptor.

The carboxylic acid value of the polyester resin is not particularly limited, and is preferably 300 μeq/g or less, more preferably 150 μeq/g or less, and particularly preferably 100 μeq/g or less. On the other hand, it is preferably 0.1 μeq/g or more, and more preferably 0.5 μeq/g or more. When the carboxylic acid value is within the above range, an electrophotographic photoreceptor obtained by using the polyester resin has good electrical properties such as sensitivity, and the polyester resin leads to good storage stability when used in a coating fluid for an electrophotographic photoreceptor.

The amount of the OH group present at the terminal of the polyester resin is generally 100 μeq/g or less, preferably 50 μeq/g or less, and more preferably 30 μeq/g or less. On the other hand, it is preferably 0.1 μeq/g or more, and more preferably 0.5 μeq/g or more. When the amount of the OH group at the terminal is within the above range, good electrical properties can be obtained.

The total nitrogen content (T-N amount) contained in the polyester resin is preferably 500 ppm or less, more preferably 300 ppm or less, and particularly preferably 200 ppm or less. On the other hand, it is preferably 0.1 ppm or more, and more preferably 0.5 ppm or more. When the total nitrogen content is within the above range, good electrical properties can be obtained.

The amount of the free divalent carboxylic acid contained in the polyester resin is not particularly limited, and is preferably 50 ppm or less, and more preferably 10 ppm or less, from the viewpoints of electrical properties and image properties of the photoreceptor. It is preferably 0.01 ppm or more, and more preferably 0.1 ppm or more from the viewpoint of stability of the polyester resin.

The amount of the free divalent phenol contained in the polyester resin is not particularly limited, and is preferably 100 ppm or less, and more preferably 50 ppm or less, from the viewpoints of electrical properties and transparency of the photoreceptor. It is preferably 0.01 ppm or more, and more preferably 0.1 ppm or more from the viewpoint of stability of the polyester resin.

The amount of the free divalent alcohol contained in the polyester resin is not particularly limited, and is preferably 100 ppm or less, and more preferably 50 ppm or less, from the viewpoints of electrical properties and transparency of the photoreceptor. It is preferably 0.01 ppm or more, and more preferably 0.1 ppm or more from the viewpoint of stability of the polyester resin.

The photosensitive layer in the electrophotographic photoreceptor according to the present invention may contain the polyester resin, and can also contain a mixture of the polyester resin and the other resin. Examples of a resin having the other structure to be mixed here include: vinyl polymers such as polymethyl methacrylate, polystyrene and polyvinyl chloride and a copolymer thereof and thermoplastic resins and various thermosetting resins such as a polycarbonate resin, a polyester resin, a polyester polycarbonate resin, a polysulfone resin, a phenoxy resin, an epoxy resin and a silicone resin and a copolymer thereof. Among these resins, a polycarbonate resin, a polyester resin, a copolymer of a polycarbonate resin and a silicone resin, and a copolymer of a polyester resin and a silicone resin are preferred.

In addition, a mixing proportion of the other resin to be mixed is not particularly limited. In a case where at least one structure selected from the group consisting of the structure represented by the Formula (1), the structure represented by the Formula (2), the structure represented by the Formula (3) and the structure represented by the Formula (4) is contained in the polyester resin of the present invention in a proportion of 0.01% by mass to 10% by mass, the other resin is preferably used in combination within a range not exceeding the proportion of the polyester resin. Specifically, the content of the resin other than the polyester resin is generally 50 parts by mass or less, and is preferably 30 parts by mass or less from the viewpoint of abrasion resistance, based on the 100 parts by mass of the total binder resin contained in the photosensitive layer.

On the other hand, in a case where at least one structure selected from the group consisting of the structure represented by the Formula (1), the structure represented by the Formula (2), the structure represented by the Formula (3) and the structure represented by the Formula (4) is contained in the polyester resin of the present invention in a proportion of more than 10% by mass and 50% by mass or less, the content of the other resin based on the polyester resin is, based on 100 parts by mass of the total binder resin, preferably 50 parts by mass or more, and is preferably 60 parts by mass or more, and more preferably 70 parts by mass or more from the viewpoint of electrical properties. On the other hand, it is generally 99.9 parts by mass or less, preferably 99 parts by mass or less, more preferably 95 parts by mass or less, even more preferably 90 parts by mass or less, and still more preferably 85 parts by mass or less. When the other resin is within the above range, good electrical properties and abrasion resistance can be obtained.

The other resin is preferably a polycarbonate resin containing a repeating structure represented by the following Formula (14) or a polyester resin containing a repeating structure represented by the following Formula (15).

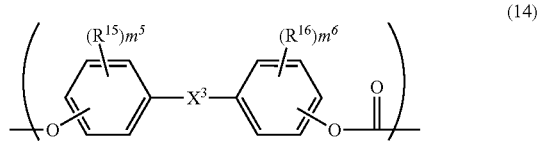

(14)

In the Formula (14), $R^{15}$ and $R^{16}$ each independently represent a hydrogen atom, a halogen atom, a hydrocarbon group or an alkoxy group, and part or all of hydrogen atoms in the hydrocarbon group and the alkoxy group may be substituted with a halogen atom. $X^3$ represents a single bond, $-CR^{17}R^{18}-$, $-O-$, $-CO-$ or $-S-$. $R^{17}$ and $R^{18}$ each independently represent a hydrogen atom, a halogen atom, a hydrocarbon group or an alkoxy group, and part or all of hydrogen atoms in the hydrocarbon group and the alkoxy group may be substituted with a halogen atom. $R^{17}$ and $R^{18}$ may be bonded to each other to form a ring. $m^5$ and $m^6$ each independently represent an integer of 0 to 4.

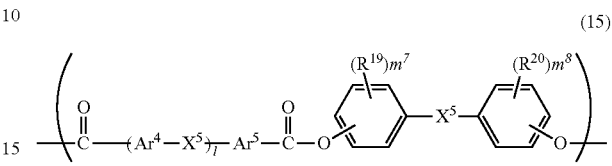

(15)

In the Formula (15), $Ar^4$ to $Ar^5$ each independently represent an arylene group which may have a substituent. $X^4$ represents a single bond, an oxygen atom, a sulfur atom, a divalent group having a structure represented by the following Formula (16) or a divalent group having a structure represented by the following Formula (17). l represents an integer of 0 to 5. $R^{19}$ and $R^{20}$ each independently represent a hydrogen atom, a halogen atom, a hydrocarbon group or an alkoxy group, and part or all of hydrogen atoms in the hydrocarbon group and the alkoxy group may be substituted with a halogen atom. $X^5$ represents a single bond, $-CR^{26}R^{27}-$, $-O-$, $-CO-$ or $-S-$. $R^{26}$ and $R^{27}$ each independently represent a hydrogen atom, a halogen atom, a hydrocarbon group or an alkoxy group, and part or all of hydrogen atoms in the hydrocarbon group and the alkoxy group may be substituted with a halogen atom. $R^{26}$ and $R^{27}$ may be bonded to each other to form a ring. $m^7$ and $m^8$ each independently represent an integer of 0 to 4.

(16)

(17)

(18)

In the Formula (16), $R^{21}$ and $R^{22}$ each independently represent a hydrogen atom, a halogen atom, a hydrocarbon group or an alkoxy group, and part or all of hydrogen atoms in the hydrocarbon group and the alkoxy group may be substituted with a halogen atom. In addition, $R^{21}$ and $R^{22}$ may be bonded to each other to form a ring.

In the Formula (17), $R^{23}$ is an alkylene group, an arylene group or a group represented by the Formula (18); in the Formula (18), $R^{24}$ and $R^{25}$ each independently represent an alkylene group, and $Ar^6$ represents an arylene group.

$R^{15}$, $R^{16}$, $R^{19}$ and $R^{20}$ in the Formula (14) or Formula (15) are preferably each independently selected from the same groups as $R^4$ and $R^5$ in the above Formula (6).

$m^5$, $m^6$, $m^7$ and $m^8$ in the Formula (14) or Formula (15) are preferably each independently selected from the same groups as $m^1$ and $m^2$ in the above Formula (6).

$Ar^4$ and $Ar^5$ in the Formula (15) are preferably each independently selected from the same groups as $Ar^1$ and $Ar^2$ in the above Formula (7).

$X^4$ in the Formula (15) is preferably selected from the same group as $X^2$ in Formula (7). 1 in the Formula (15) is preferably the same range as k in the Formula (7).

Specific examples of preferred structures of the other resin which may be contained as a binder resin in the photosensitive layer in the present invention other than the polyester resin are shown below. These specific examples are shown for the sake of illustration, and any binder resin may be mixed and used as long as it does not contradict the gist of the present invention.

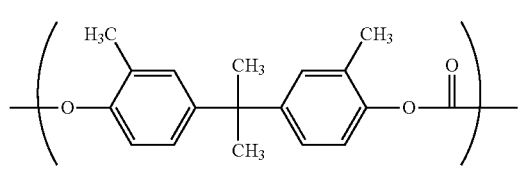

resin 1

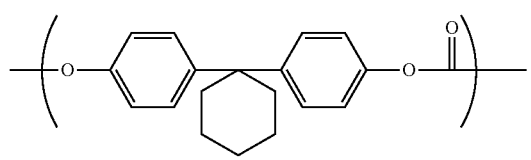

resin 2

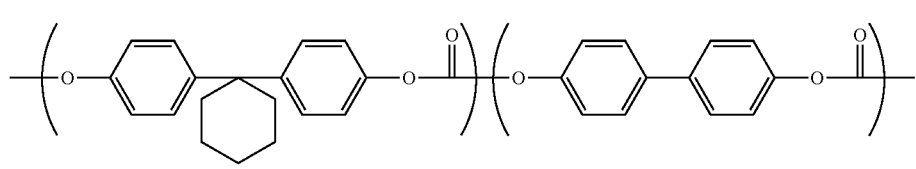

resin 3

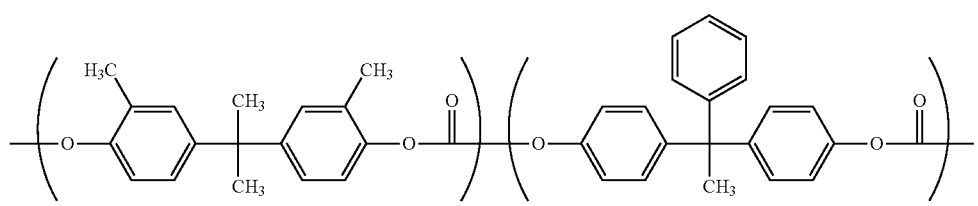

resin 4

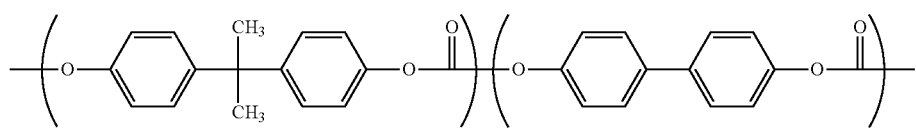

resin 5

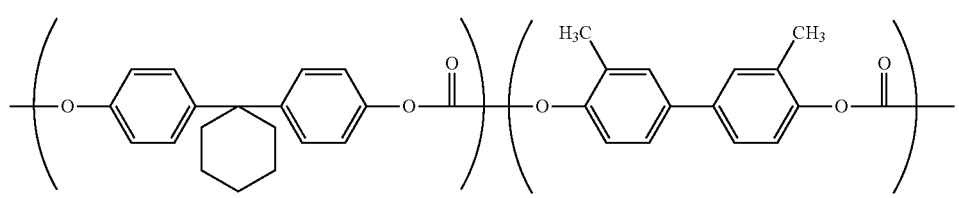

resin 6

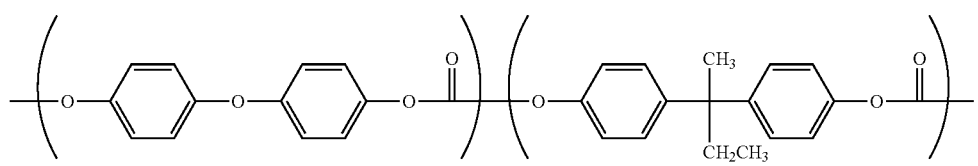

resin 7

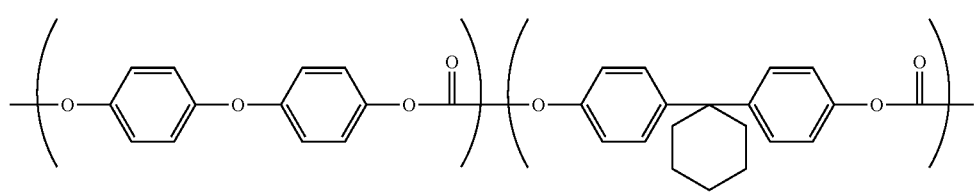

resin 8

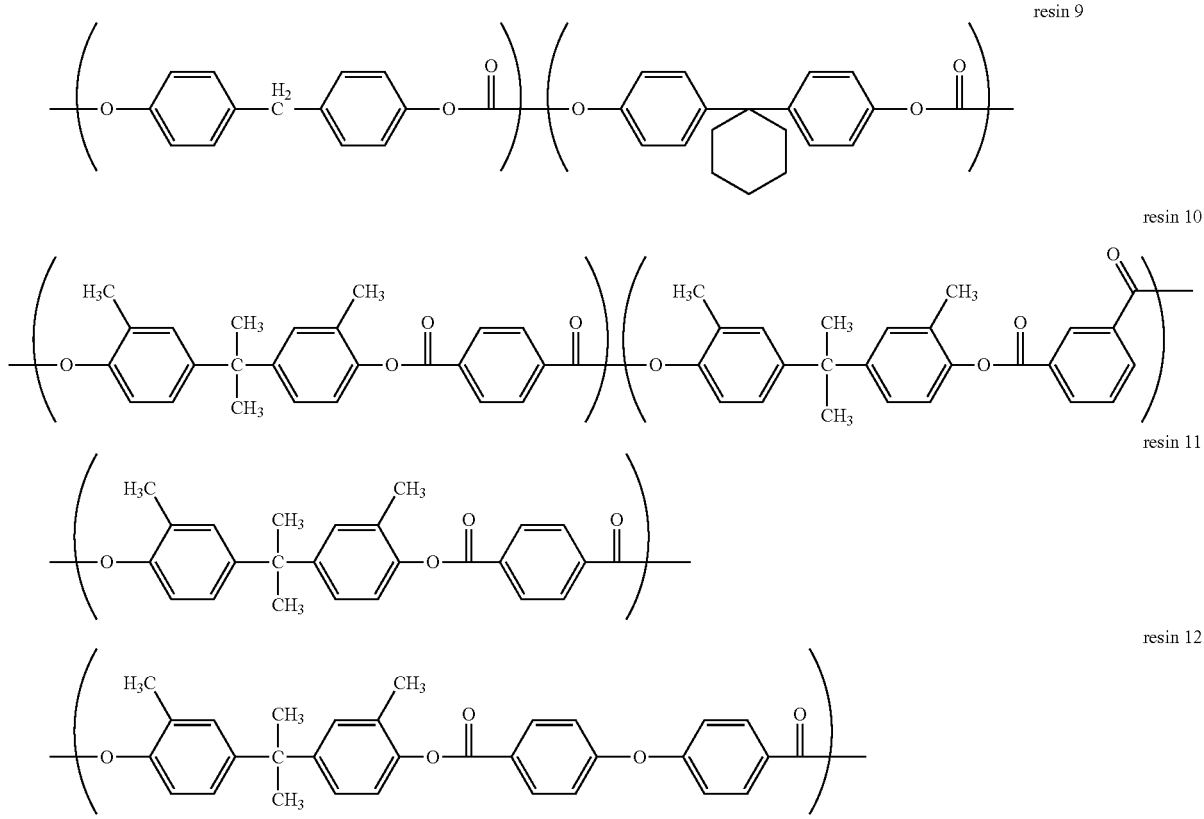

Among these, the resin 1, resin 2, resin 3, resin 6, resin 8, resin 9, and resin 12 are more preferred.

<<Method for Producing Polyester Resin>>

Next, a method for producing the polyester resin (hereinafter sometimes referred to as "polyester resin for electrophotographic photoreceptor") contained in the photosensitive layer of the electrophotographic photoreceptor according to the present invention will be described.

The polyester resin for electrophotographic photoreceptor is generally produced by an interfacial polymerization method with a low content of impurities. However, in the case of producing the polyester resin in the present invention using a divalent alcohol as a raw material (prepolymer) for deriving a structure represented by any one of the above Formulas (1) to (4), since the reactivity of the divalent alcohol is inferior to that of the divalent phenol, the esterification reaction with the divalent acid chloride does not sufficiently proceed in the interfacial polymerization method. Therefore, it is preferable to use a solution polymerization method in which the esterification reaction easily proceeds even with the divalent alcohol, or a polymerization method combining a solution polymerization method and an interfacial polymerization method.

In addition, the polyester resin in the present invention is produced by using a divalent alcohol having at least one structure selected from the group consisting of a structure represented by the Formula (1), a structure represented by the Formula (2), a structure represented by the Formula (3), and a structure represented by the Formula (4), and a divalent phenol as raw materials. The reactivity of the divalent alcohol and the reactivity of the divalent phenol are largely different. In a case where the reaction of the divalent alcohol having a structure represented by the Formula (1), a structure represented by the Formula (2), a structure represented by the Formula (3) and/or a structure represented by the Formula (4) and the reaction of the divalent phenol are performed at the same time, only the highly reactive divalent phenol preferentially proceeds the reaction, the divalent alcohol having a structure represented by the Formula (1), a structure represented by the Formula (2), a structure represented by the Formula (3) and/or a structure represented by the Formula (4) is hardly introduced into the polyester resin, and the objective product cannot be obtained. Therefore, after a first step of reacting, in advance, the divalent alcohol having a structure represented by the Formula (1), a structure represented by the Formula (2), a structure represented by the Formula (3) and/or a structure represented by the Formula (4) having inferior pre-reactivity, with a divalent acid chloride such as a divalent carboxylic acid chloride, a second step of reacting a divalent phenol having high reactivity with the reaction product of the first step, so that an objective copolymer polyester resin can be obtained. An example of a method for producing a polyester resin by a solution polymerization method will be described below.

<Production Method by Solution Polymerization Method>

In the case of the production by the solution polymerization method, the polyester resin can be produced by: for example, a first step of esterification of the divalent alcohol, having a structure represented by the Formula (1), a structure represented by the Formula (2), a structure represented by the Formula (3) and/or a structure represented by the Formula (4) (hereinafter, sometimes simply referred to as "divalent alcohol"), by dissolving the divalent alcohol and a divalent carboxylic acid chloride as a divalent acid chloride in a solvent and adding a base such as triethylamine; and after the first step, a second step of reacting the product with a divalent phenol. It is preferable from the viewpoint of productivity that the polymerization temperature is in the range of −10° C. to 40° C. and the polymerization time is in the range of 0.5 hour to 10 hours. After the polymerization, the polyester resin dissolved in the organic phase is washed and recovered, and thereby the objective polyester resin is obtained.

Examples of the base used in the solution polymerization method include tertiary amines such as triethylamine, tripropylamine, tributylamine, N,N-diisopropyl ethylamine, N,N-dipropyl ethylamine, N,N-diethyl methylamine, N,N-dimethyl ethylamine, N,N-dimethyl butylamine, N,N-dimethyl isopropylamine, N,N-diethyl isopropylamine, N,N,N',N'-tetramethyl diethylamine, and 1,4-diazabicyclo [2,2,2] octane, pyridines such as pyridine, 4-methyl pyridine, and an organic base such as 1,8-diazabicyclo [5.4.0]-7-undecene. Also, there is no particular limitation as long as it is a base which is used for the esterification reaction, or the like such as a phosphazene base and an inorganic base. Among these bases, triethylamine, N,N-dipropyl ethylamine, N,N-diethyl methylamine, and pyridine are preferred from the viewpoint of reactivity of the esterification reaction, and triethylamine is particularly preferred from the viewpoint of suppression of decomposition of acid chloride and ease of removal in washing.

It is preferable that the amount of the base to be used is in the range of 1 equivalent to 3 equivalents of the divalent alcohol in the first step of reacting with the divalent alcohol, and is in the range of 1.01 equivalents to 2 equivalents of the carboxylic acid chloride group contained in the reaction system in the second step.

Examples of the solvent include a halogenated hydrocarbon compound such as dichloromethane, chloroform, 1,2-dichloroethane, trichloroethane, tetrachloroethane, chlorobenzene, and dichlorobenzene, an aromatic hydrocarbon compound such as toluene, anisole, and xylene, a hydrocarbon compound such as cyclohexane and methyl cyclohexane, an ether compound such as tetrahydrofuran, tetrahydropyran, 1,4-dioxane, and 1,3-dioxolane, an ester compound such as ethyl acetate, methyl benzoate, and benzyl acetate, and an amide compound such as N,N-dimethyl formamide and N,N-dimethyl acetamide. In addition, pyridine may be used as a base and as a solvent. Among these, from the viewpoint of solubility of the monomer and the oligomer to be produced and the reactivity of the esterification reaction, dichloromethane, chloroform, 1,2-dichloroethane, tetrahydrofuran, N,N-dimethyl formamide, and pyridine are preferred. From the viewpoints of washing efficiency and electrical properties, dichloromethane is particularly preferred.

The purity of the divalent acid chloride to be used is preferably 98.0% or more, more preferably 99.0% or more, and particularly preferably 99.5% or more. When the purity is low, a monovalent acid chloride in which the divalent acid chloride is hydrolyzed to form one carboxylic acid, and a divalent carboxylic acid in which both carboxylic acids are formed are contained, the impurities may act as terminators. Therefore, when the purity is set within the above range, a fully elongated polyester resin can be obtained.

The purity of the divalent phenol to be used is preferably 98.0% or more, more preferably 98.5% or more, and particularly preferably 99.0% or more. When the purity is 98.0% or more, the molecular weight of the polyester resin can be sufficiently extended and good electrical properties can be obtained.

The purity of the divalent alcohol to be used is preferably 95.0% or more, and more preferably 98.0% or more. When the purity is 95.0% or more, good electrical properties are easily obtained.

In the case of the producing the polyester resin in the solution polymerization method, the ratio of the divalent alcohol and the divalent phenol to the divalent carboxylic acid chloride is not particularly limited, and the molar ratio of the total amount of the divalent alcohol and the divalent phenol to the divalent carboxylic acid chloride is preferably 1:0.95 to 1:1.05, more preferably 1:0.99 to 1:1.01, and particularly preferably 1:0.992 to 1:1.008, from the viewpoints of producing a high molecular weight polyester resin and controlling terminal groups.

At the time of producing the polyester resin, a molecular weight regulator can be used. Examples of the molecular weight regulator include alkyl phenols such as phenol, o-, m-, p-cresols, o-, m-, p-ethyl phenols, o-, p-propyl phenols, o-, m-, p-(tert-butyl) phenols, pentyl phenol, hexyl phenol, octyl phenol, nonyl phenol, a 2,6-dimethyl phenol derivative, and a 2-methyl phenol derivative; monofunctional phenols such as o-, m-, p-phenyl phenols; monofunctional acid halides such as acetic acid chloride, butyric acid chloride, octyl acid chloride, benzoyl chloride, benzenesulfonyl chloride, benzenesulfinyl chloride, sulfinyl chloride, benzenephosphonyl chloride and the substitution products thereof; or the like.

In addition, examples thereof include: a monofunctional aliphatic alcohol such as methanol, ethanol, and propanol; a monofunctional alcohol having acrylics such as 2-hydroxyethyl acrylate, 4-hydroxybutyl acrylate, and 2-hydroxymethacrylates; a monofunctional alcohol having perfluoroalkyl such as 1H,1H,2H,2H-tridecafluoro-1-n-octanol, and 1H,1H,2H,2H-heptadecafluoro-1-decanol; a monofunctional alcohol having siloxane; or the like.

Among these molecular weight regulators, o-, m-, p-(tert-butyl) phenols, a 2,6-dimethyl phenol derivative, and a 2-methyl phenol derivative are preferred from the viewpoint of high molecular weight controllability and solution stability. p-(tert-butyl) phenol, 2,3,6-trimethyl phenol, and 2,3,5-trimethyl phenol are particularly preferred.

In addition, in order not to oxidize the divalent phenol, an antioxidant can be added during the polymerization reaction or in the washing solution. Examples of the antioxidant include sodium sulfite, hydrosulfite (sodium hyposulfite), sulfur dioxide, potassium sulfite, sodium hydrogen sulfite, or the like. Among these, hydrosulfite is particularly preferred also from the viewpoint of the effects of oxidation prevention and the reduction of environmental burden.

The amount of the antioxidant to be used is not particularly limited and is generally 0.01% by mass or more, preferably 0.1% by mass or more, and is generally 10.0% by mass or less, preferably 5% by mass or less, based on the whole divalent phenol.

An arbitrary method can be used as a washing method of the polyester resin after the polymerization as long as the effect of the present invention is not significantly impaired. Examples of the washing method include: a method of washing a solution of a polyester resin with an aqueous solution of alkaline such as sodium hydroxide or potassium hydroxide; an aqueous solution of acid such as hydrochloric acid, nitric acid, or phosphoric acid; and water and then liquid-separating by settled separation, centrifugation, or the like.

The polyester resin solution after washing may be subjected to a precipitation in water, alcohol or other organic solvent in which the polyester resin is insoluble, or may be subjected to distilling off a solvent in hot water or in a dispersion medium in which the polyester resin is insoluble, or distilling off the solvent by heating, vacuum, or the like. In a case of extracting in a slurry state, a solid can also extracted by a centrifugal separator, a filter or the like.

Drying of the polyester resin is generally performed at a temperature equal to or lower than the decomposition temperature of the polyester resin, and the drying can be preferably performed at a temperature that is 20° C. or higher and is equal to or lower than the melting temperature of the polyester resin. At this time, drying under reduced pressure is preferred.

The drying time is preferably not shorter than a time until the purity of impurities such as a residual solvent is lower than a certain level, and specifically, the drying is performed for not shorter than a time until the residual solvent is generally 1,000 ppm or less, preferably 300 ppm or less, and more preferably 100 ppm or less and longer than this time.

<<Electrophotographic Photoreceptor>>

The electrophotographic photoreceptor according to the present invention at least includes a conductive support and a photosensitive layer provided on the photosensitive layer, and the photosensitive layer contains the polyester resin.

An embodiment of the polyester resin contains at least one structure α selected from the group consisting of a structure represented by the above Formula (1), a structure represented by the above Formula (2), and a structure represented by the above Formula (3), the structure α has a number average molecular weight of 15,000 or less, and the polyester resin contains a divalent phenol residue and a divalent carboxylic acid residue.

In addition, another embodiment of the polyester resin contains a structure represented by the above Formula (4), and contains a divalent phenol residue and a divalent carboxylic acid residue. The divalent phenol residue contains a structure represented by the above Formula (6), the divalent carboxylic acid residue contains a structure represented by the above Formula (7), and at least a part of the structure represented by the above Formula (6) and at least a part of the structure represented by the above Formula (7) are directly bonded to each other.

A preferred embodiment of the polyester resin in the photosensitive layer of the electrophotographic photoreceptor according to the present invention is the same as the preferred embodiment described in the above <<Polyester Resin>>.

Specific configurations of the photosensitive layer include: a lamination-type photoreceptor obtained by laminating a charge generation layer containing a charge generation substance as a main component, and a charge transport layer containing a charge transport substance and a binder resin as main components on the conductive support; and a dispersion type (single-layer type) photoreceptor having a photosensitive layer in which the charge generation substance is dispersed in a layer including a charge transport substance and a binder resin, on the conductive support; or the like.

The polyester resin is generally used in a layer containing a charge transport substance as a binder resin, and is preferably used in a charge transport layer of a lamination-type photoreceptor.

<Conductive Support>

Although the conductive support is not particularly limited, mainly used as the conductive support is, for example, a metallic material such as aluminum, an aluminum alloy, stainless steel, copper, or nickel, a resinous material to which electrical conductivity has been imparted by adding a conductive powder, e.g., a metal, carbon, or tin oxide powder, or a resin, glass, paper, or the like, having a surface on which a conductive material, e.g., aluminum, nickel, or ITO (indium oxide/tin oxide) has been vapor deposited or coated. One selected from these may be used alone, or two or more selected from these may be used in any combination and in any proportion.

Examples of the shape of the conductive support include a drum-shape, sheet-shape, belt-shape, or the like. Use may be made of a metallic conductive support having a surface coated with a conductive material having a suitable resistance in order to control the conductivity and surface properties thereof, and to coat defects.

In a case where a metallic material such as an aluminum alloy is used as a conductive support, this material may be used after an anodized coating film is formed thereon. In the case where an anodized coating film has been formed, the material is preferably subjected to a pore-sealing treatment by a known method.

The surface of the conductive support may be smooth, or may have been roughened by using a special machining method or by performing a grinding treatment. Alternatively, use may be made of a conductive support having a roughened surface obtained by incorporating particles with an appropriate particle diameter into the material for constituting the conductive support. A drawn pipe can be used as such without subjecting to machining treatment, for the purpose of cost reduction.

<Undercoat Layer>

An undercoat layer may be provided between the conductive support and the photosensitive layer to be described later, in order to improve adhesion and blocking properties. As the undercoat layer, use may be made of a resin or a resin in which particles of a metal oxide or the like is dispersed. In addition, the undercoat layer may be a single layer, or may be a plurality of layers. The undercoat layer may contain a known antioxidant, pigment particles, resin particles or the like.

The thickness of the undercoat layer is generally 0.01 μm or more, and preferably 0.1 μm or more, and is generally 30 μm or less, and preferably 20 μm or less, from the viewpoints of improving the electrical properties, the strong exposure property, image properties and repetition property of the electrophotographic photoreceptor, and of improving the applicability during production.

Examples of the particles of metal oxide used for the undercoat layer include particles of a metal oxide containing one metallic element, such as titanium oxide, aluminum oxide, silicon oxide, zirconium oxide, zinc oxide, and iron oxide, and particles of a metal oxide containing a plurality of metallic elements, such as calcium titanate, strontium titanate, and barium titanate. One kind of those particles may be used alone, or two or more kinds of those particles may be mixed together and used. Preferred of these particles of metal oxide are particles of titanium oxide and/or aluminum oxide. Particularly preferred are particles of titanium oxide.

The particles of titanium oxide may have a surface which has been treated with an inorganic material such as tin oxide, aluminum oxide, antimony oxide, zirconium oxide, and silicon oxide, or with an organic material such as stearic acid, a polyol and a silicone. The crystal form of the particles of titanium oxide may be any of rutile, anatase, brookite, and amorphous. The particles of titanium oxide may include particles in a plurality of crystal states.

Although particles of metal oxide having various particle diameters can be utilized, from the standpoints of properties thereof and fluid stability, preferably used of those particles are particles of metal oxide having an average primary-particle diameter of 10 nm to 100 nm, and particularly preferably 10 nm to 50 nm. The average primary-particle diameter can be obtained from a TEM photograph or likes.

The undercoat layer is preferably formed in a state that metal oxide particles are dispersed in a binder resin. Examples of the binder resin to be used in the undercoat layer include known binder resins such as: an epoxy resin, a polyethylene resin, a polypropylene resin, an acrylic resin, a methacrylic resin, a polyamide resin, a vinyl chloride resin, a vinyl acetate resin, a phenol resin, a polycarbonate resin, a polyurethane resin, a polyimide resin, a vinylidene chloride resin, a polyvinyl acetal resin, a vinyl chloride-vinyl acetate copolymer, a polyvinyl alcohol resin, a polyurethane resin, a polyacrylic resin, a polyacrylamide resin, a polyvinylpyrrolidone resin, a polyvinylpyridine resin, a water-soluble polyester resin, a cellulose ester resin such as nitrocellulose, a cellulose ether resin, a casein, a gelatin, a polyglutamic acid, starch, starch acetate, amino starch, organic zirconium compounds such as zirconium chelate compounds and zirconium alkoxide compounds, organic titanyl compounds such as titanyl chelate compounds and titanium alkoxide compounds, a silane coupling agent or the like. One selected from these may be used alone, or two or more selected from these may be used in any combination and in any proportion. In addition, these resins may be used together with a hardener to come into a hardened state. Among these, alcohol-soluble copolymerized polyamide, modified polyamide, and the like are preferred because of the excellent dispersibility and applicability they exhibit.

Although the ratio of inorganic particles to be used in the undercoat layer with respect to the binder resin can be selected at will, the ratio is preferably in a range of 10% by mass to 500% by mass with respect to the binder resin, from the viewpoints of dispersion stability and applicability.

<Photosensitive Layer>

Types of the photosensitive layer include: a single-layer type in which a charge generation substance and a charge transport substance are present on the same layer, and are dispersed in a binder resin; and a function separation type (lamination-type) formed of two layers of a charge generation layer in which the charge generation substance is dispersed in the binder resin and a charge transport layer in which the charge transport substance is dispersed in the binder resin, and any of two types of the photosensitive layers may be used.

Examples of the lamination-type photosensitive layer include a normal lamination-type photosensitive layer in which the charge generation layer and the charge transport layer are laminated and disposed in this order from the conductive support side, and a reverse lamination-type photosensitive layer in which the charge transport layer and the charge generation layer are laminated and disposed in this order from the conductive support side. Although either type can be employed, the normal lamination-type photosensitive layer is preferred because this type can exhibit an especially well balanced photoconductivity.

[Charge Generation Layer-Lamination Type]

In a case of the lamination-type photoreceptor (function separation type photoreceptor), the charge generation layer is formed by binding the charge generation substance with the binder resin. The thickness thereof is generally in a range of 0.1 µm or more, preferably 0.15 µm or more, and is generally 10 µm or less, and preferably 0.6 µm or less.

Examples of the charge generation substance include inorganic photoconductive materials, such as selenium, and alloys thereof, and cadmium sulfide, and organic photoconductive materials such as organic pigments. Preferred of these are organic photoconductive materials, and particularly preferred are organic pigments. Examples of the organic pigments include phthalocyanine pigments, azo pigments, dithioketopyrrolopyrrole pigments, squalene (squarylium) pigments, quinacridone pigments, indigo pigments, perylene pigments, polycyclic quinone pigments, anthanthrone pigments, and benzimidazole pigments. Particularly preferred of those organic pigments are phthalocyanine pigments and azo pigments. In the case of using any of these organic pigments as the charge generation substance, the organic pigment is used generally in the form of a dispersion layer in which fine particles of the organic pigment have been bound with any of various binder resins.

In a case where a metal-free phthalocyanine compound or a metal-containing phthalocyanine compound is used as the charge generation substance, a photoreceptor can be obtained, which has a high sensitivity with respect to a laser beam having a relatively long wavelength, for example, a laser beam having a wavelength in the vicinity of 780 nm. In addition, in a case of using an azo pigment such as monoazo, diazo or trisazo, a photoreceptor can be obtained, which has sufficient sensitivity with respect to white light, a laser beam having a wavelength in the vicinity of 660 nm, or a laser beam having a relatively short wavelength, for example, a laser beam having a wavelength in the vicinity of 450 nm or 400 nm).

In a case of using an organic pigment as the charge generation substance, a phthalocyanine pigment or an azo pigment is particularly preferred. The phthalocyanine pigment is excellent from the viewpoint of obtaining a photoreceptor highly sensitive to laser light having a relatively long wavelength, and the azo pigment is excellent from the viewpoint of having sufficient sensitivity to white light and laser light having a relatively short wavelength.

In the case of using the phthalocyanine pigment as the charge generation substance, use may be made specifically of metal-free phthalocyanines, phthalocyanines to which a metal, e.g., copper, indium, gallium, tin, titanium, zinc, vanadium, silicon, germanium, or aluminum, or an oxide, halide, hydroxide or alkoxide thereof has coordinated, these phthalocyanines having respective crystal forms, and phthalocyanine dimers in which oxygen atoms or other atoms are used as crosslinking atoms. Particularly preferred are X-form and τ-form metal-free phthalocyanines, A-form (also called β-form), B-form (also called α-form), D-form (also called Y-form), or the likes of titanyl phthalocyanines (other name: oxytitanium phthalocyanines), vanadyl phthalocyanines, chloroindium phthalocyanines, hydroxyindium phthalocyanines, II-form or the likes of chlorogallium phthalocyanines, V-form or the likes of hydroxygallium phthalocyanines, G-form, I-form, or the likes of µ-oxo-gallium phthalocyanine dimers, and II-form or the likes of µ-oxo-aluminum phthalocyanine dimers, which are crystal forms having high sensitivity.

Particularly preferred of these phthalocyanines are A-form (also called β-form) and B-form (also called α-form) titanyl phthalocyanines, D-form (Y-form) titanyl phthalocyanine characterized by showing a distinct peak at a diffraction angle 2θ(±0.2°) of 27.1° or 27.3° in X-ray powder diffractometry, II-form chlorogallium phthalocyanine, V-form hydroxygallium phthalocyanine, the hydroxygallium phthalocyanine characterized by having a most intense peak at 28.1° or characterized by having no peak at 26.2°, having a distinct peak at 28.1°, and having a half-value width W at 25.9° of 0.1°<W<0.4°, and a G-form μ-oxo-gallium phthalocyanine dimer. Among these, D-form (Y-form) titanyl phthalocyanine is preferred because of good sensitivity thereof.

A single phthalocyanine compound may be used alone, or a mixture of several phthalocyanine compounds or a phthalocyanine compound in a mixed-crystal state may be used. The state in which phthalocyanine compounds are mixed or the mixed-crystal state may be one obtained by mixing the constituent elements later, or may be one formed in steps for phthalocyanine compound production and treatments, such as synthesis, pigment formation, crystallization, etc. Known as such treatments are an acid pasting treatment, grinding treatment, solvent treatment, or the like. Examples of methods for producing a mixed-crystal state include a method in which two kinds of crystals are mixed together and the resultant mixture is mechanically ground and made amorphous and is then subjected to a solvent treatment to thereby convert into a specific crystalline state, as described in JP-A-H10-48859.

The binder resin used for the charge generation layer is not particularly limited. Examples thereof include insulating resins such as a polyvinyl acetal resin, for example, a polyvinyl butyral resin, a polyvinyl formal resin, and a partly acetalized polyvinyl butyral resin in which the butyral moieties have been partly modified with formal, acetal, or the like, a polyarylate resin, a polycarbonate resin, a polyester resin, a modified ether-type polyester resin, a phenoxy resin, a polyvinyl chloride resin, a polyvinylidene chloride resins, a polyvinyl acetate resin, a polystyrene resin, an acrylic resin, a methacrylic resin, a polyacrylamide resin, a polyamide resin, a polyvinylpyridine resin, a cellulosic resin, a polyurethane resin, an epoxy resin, a silicon resin, a polyvinyl alcohol resin, a polyvinylpyrrolidone resin, casein, copolymers based on vinyl chloride and vinyl acetate, for example, vinyl chloride/vinyl acetate copolymers, hydroxy-modified vinyl chloride/vinyl acetate copolymers, carboxyl-modified vinyl chloride/vinyl acetate copolymers; and vinyl chloride/vinyl acetate/maleic anhydride copolymers, styrene/butadiene copolymers, vinylidene chloride/acrylonitrile copolymers, styrene-alkyd resins, silicon-alkyd resins, and phenol-formaldehyde resins; and organic photoconductive polymers such as poly-N-vinylcarbazole, polyvinylanthracene, and polyvinylperylene. Any one of these binder resins may be used alone, or any combination of two or more thereof may be used as a mixture thereof.

In the charge generation layer, regarding the mixing ratio (the mass ratio) of the charge generation substance to the binder resin, the charge generation substance is generally 10 parts by mass or more, and preferably 30 parts by mass or more, and is generally 1,000 parts by mass or less, and preferably 500 parts by mass or less, based on 100 parts by mass of the binder resin.

[Charge Transport Layer-Lamination Type]

The charge transport layer of the lamination-type photoreceptor contains a charge transport substance and generally contains a binder resin and other components which are used as necessary. The charge transport layer may be formed of a single layer or may be formed by laminating a plurality of layers having different constituent components and composition ratios. The thickness thereof is generally 5 μm to 50 μm, and preferably 10 μm to 45 μm.

The charge transport substance is not particularly limited, and any substances can be used. Examples of the charge transport substance include an electron withdrawing substance such as an aromatic nitro compound such as 2,4,7-trinitrofluorenone, a cyano compound such as tetracyanoquinodimethane, and a quinone compound such as diphenoquinone, an electron-donating substance such as a heterocyclic compound such as a carbazole derivative, an indole derivative, an imidazole derivative, an oxazole derivative, a pyrazole derivative, a thiadiazole derivative, and a benzofuran derivative, an aniline derivative, a hydrazone derivative, an aromatic amine derivative, a stilbene derivative, a butadiene derivative, an enamine derivative, a substance where plural types of these compounds bind, and a polymer having a group composed of these compounds in a main chain or a side chain. Among these, a carbazole derivative, an aromatic amine derivative, a stilbene derivative, a butadiene derivative, an enamine derivative, and a substance where plural kinds of these compounds bind, are preferred. These charge transport substances may be used alone or several substances may be used in combination. Specific examples of the preferred structure of the charge transport substance are as follows.

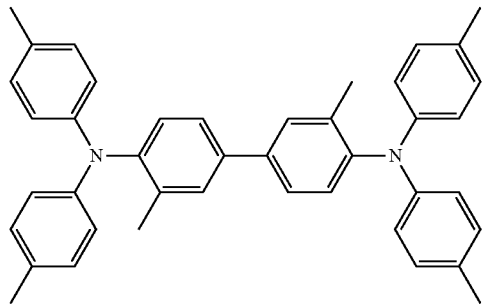

HTM1

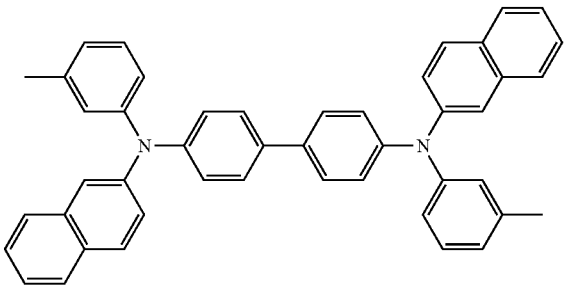

HTM2

-continued
HTM3
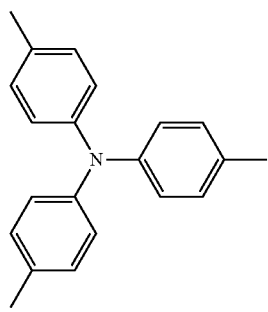
HTM4
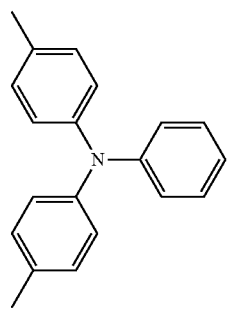
HTM5
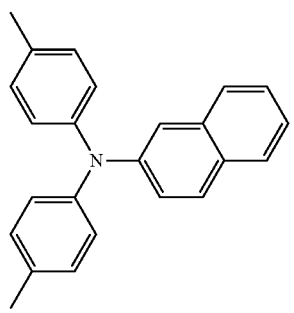
HTM6
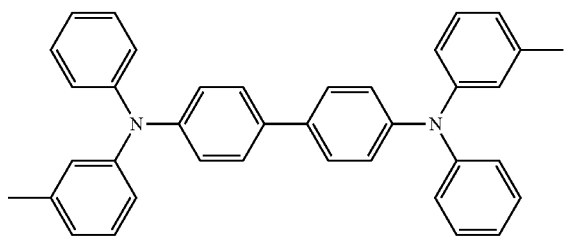
HTM7
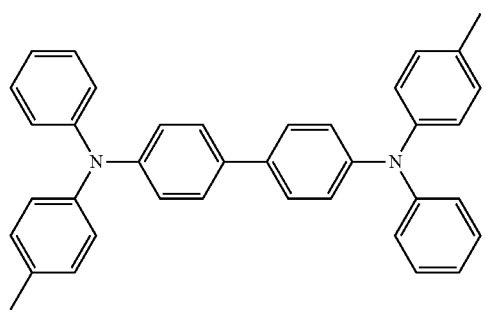
HTM8
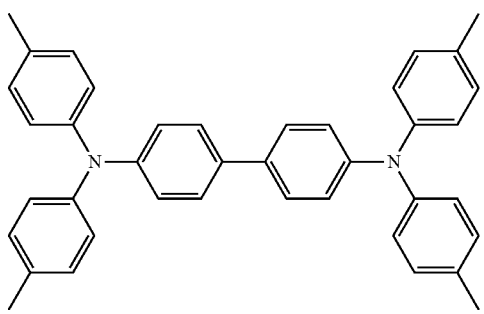
HTM9
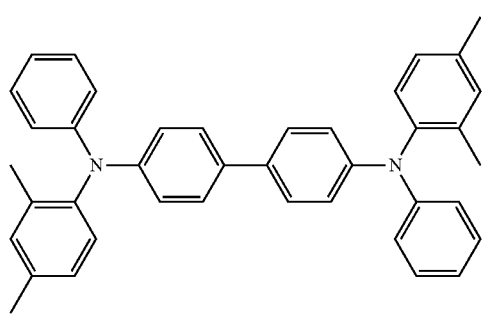
HTM10
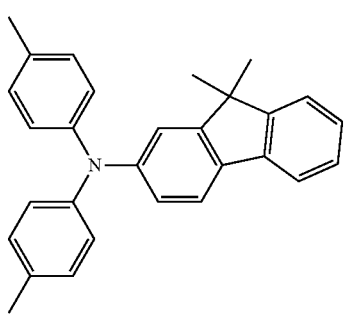
HTM11
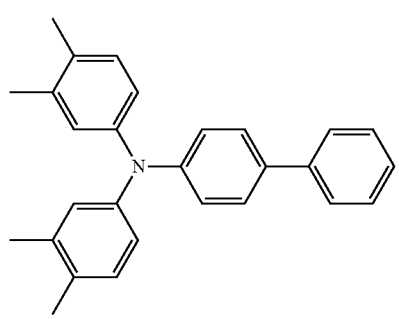
HTM12
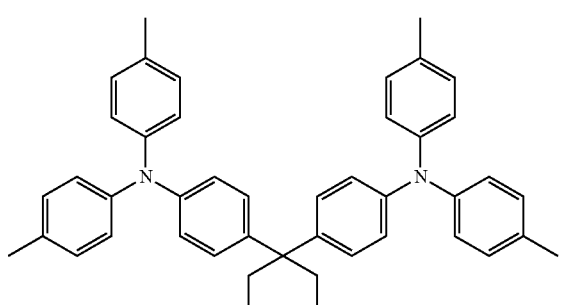

-continued
HTM13
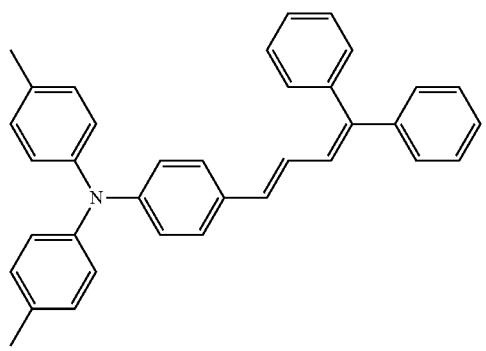
HTM14
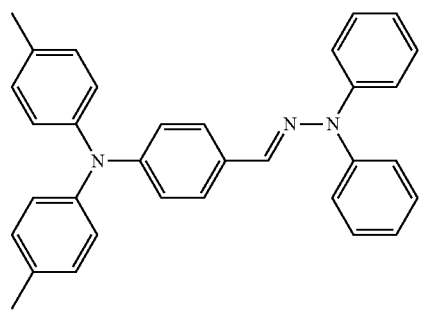
HTM15
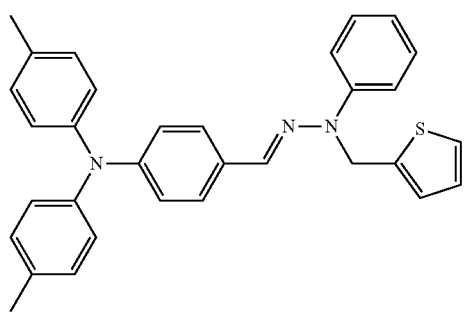
HTM16
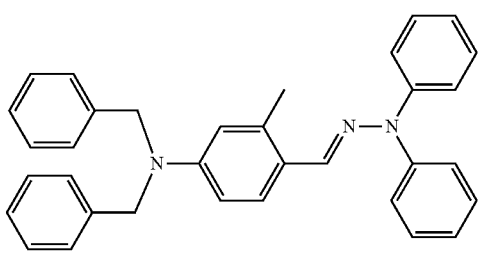
HTM17
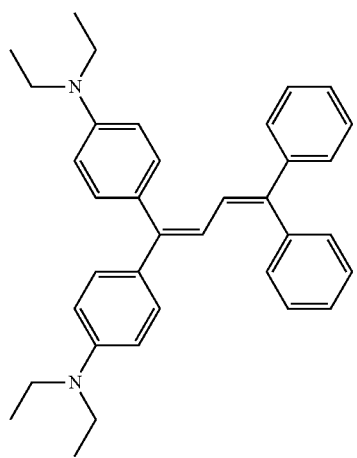
HTM18
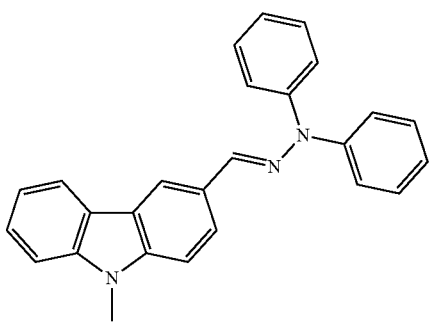
HTM19
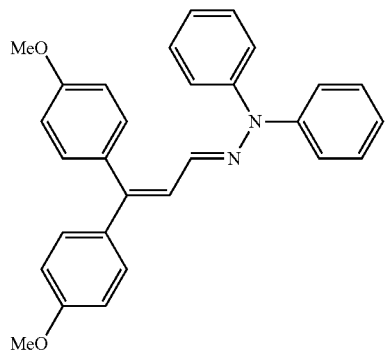
HTM20
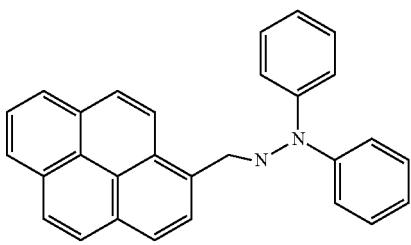

-continued
HTM21
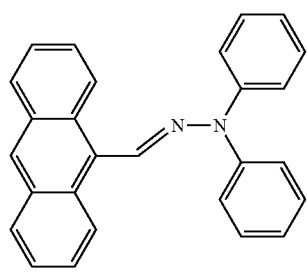
HTM22                   HTM23
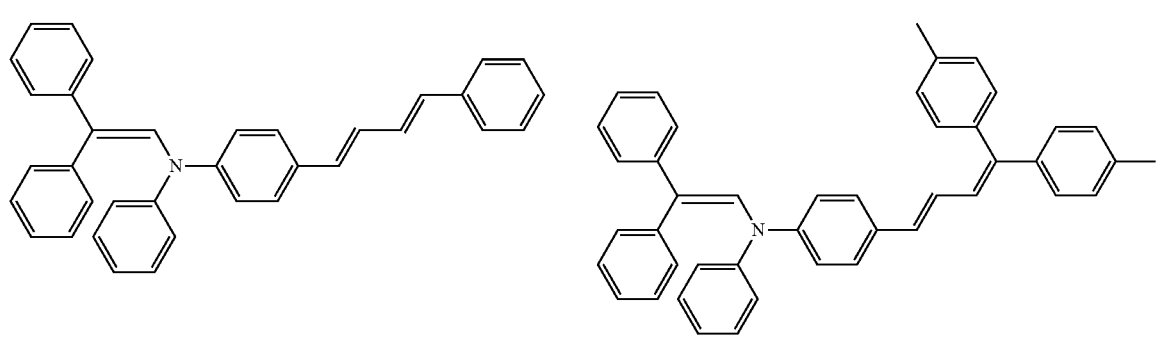
HTM24                   HTM25
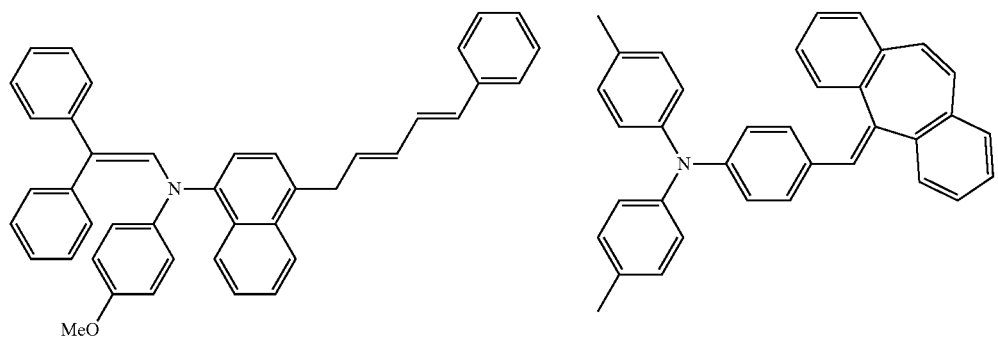
HTM26                   HTM27
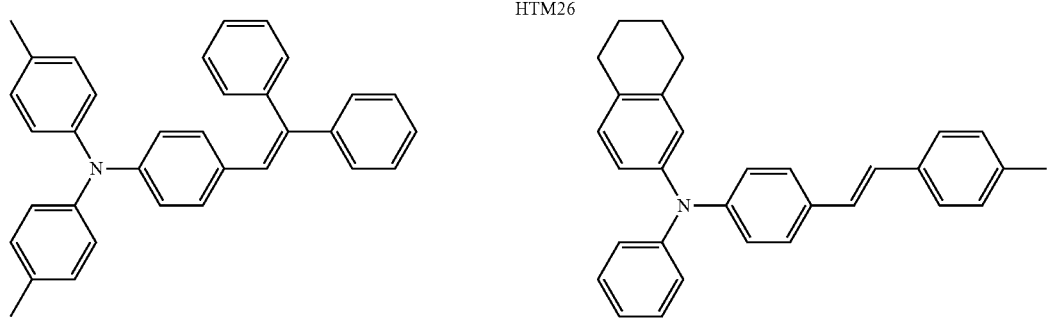

HTM28
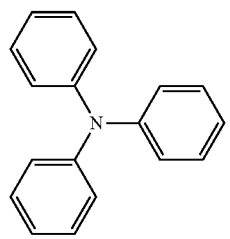
HTM29
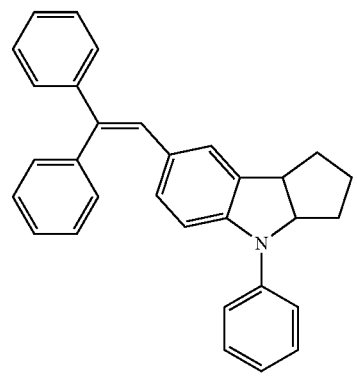
HTM30
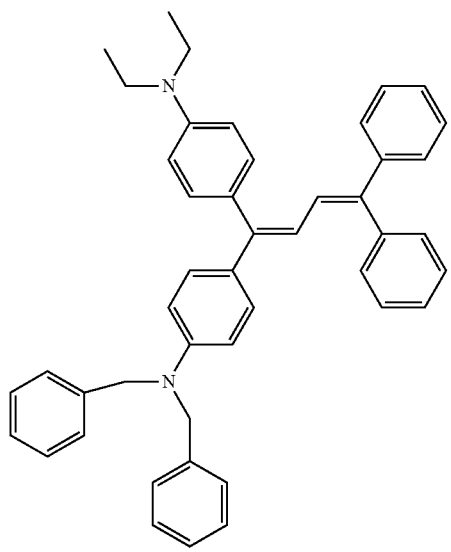
HTM31
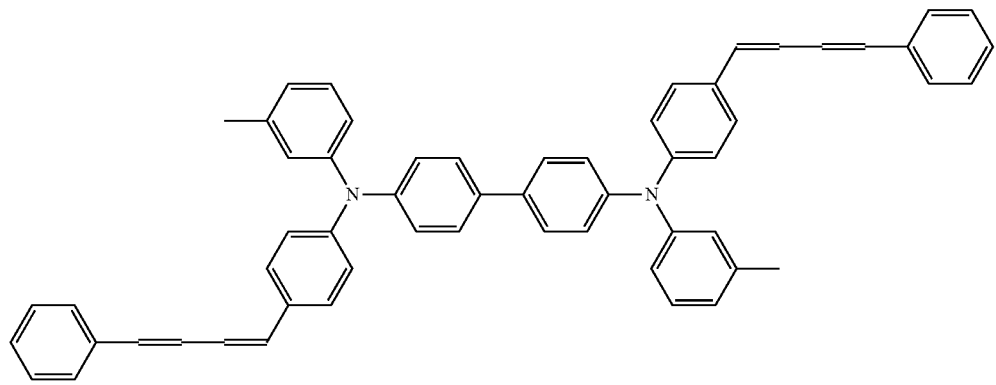

-continued
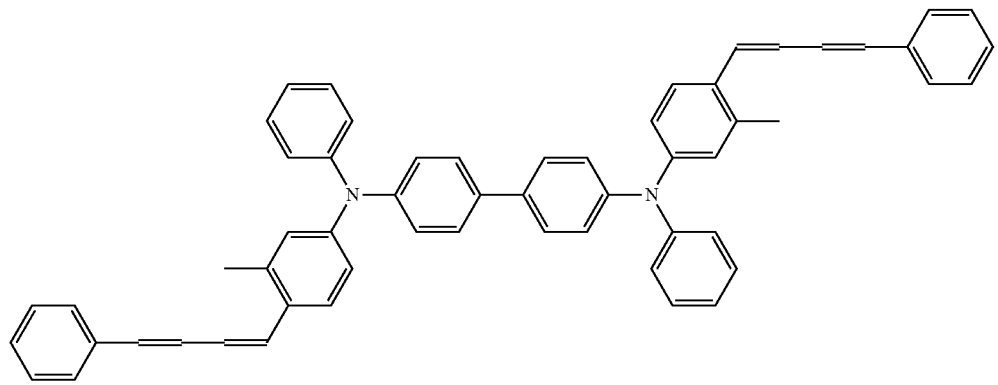
HTM32
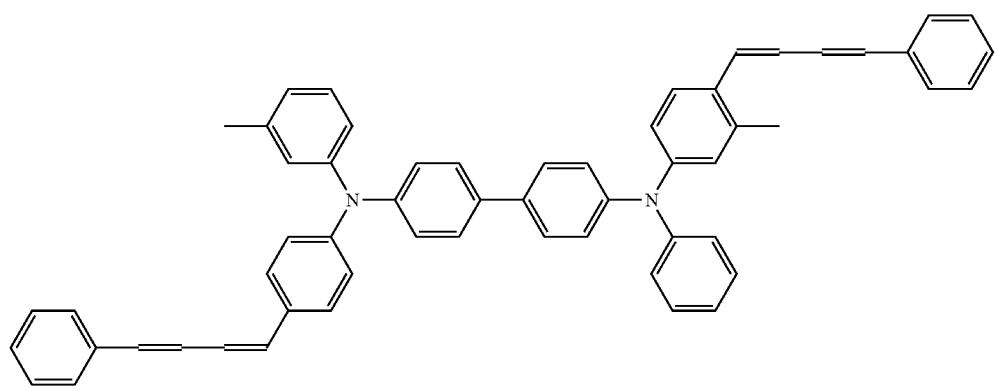
HTM33
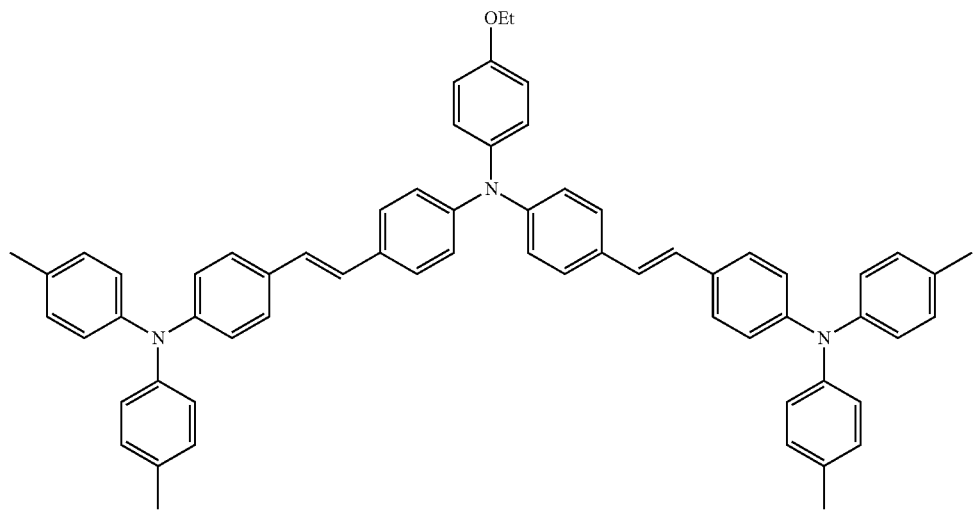
HTM34

-continued
HTM35
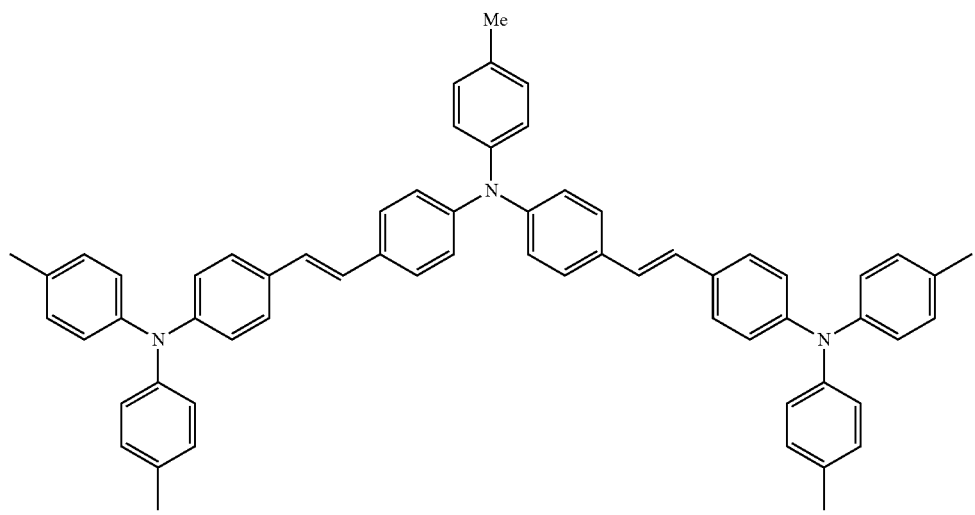
HTM36
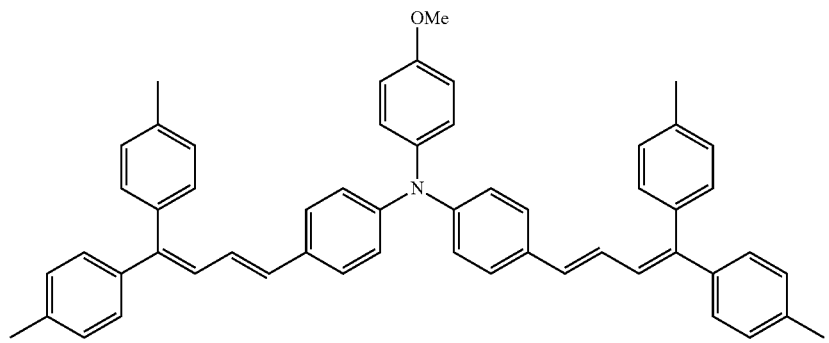
HTM37
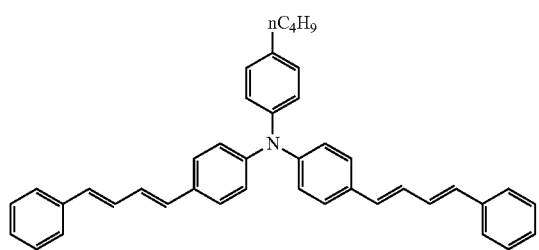
HTM38
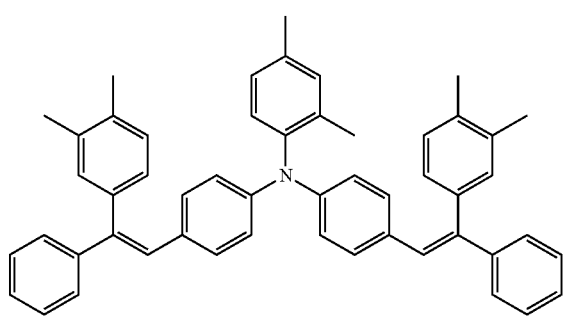
HTM39
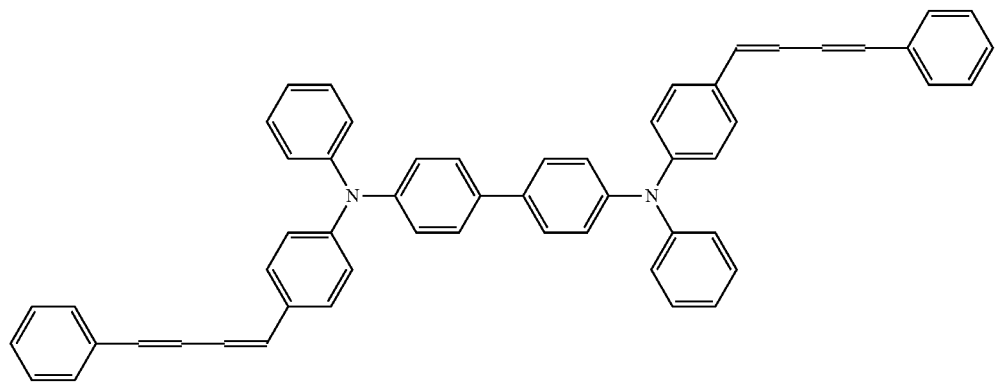

-continued

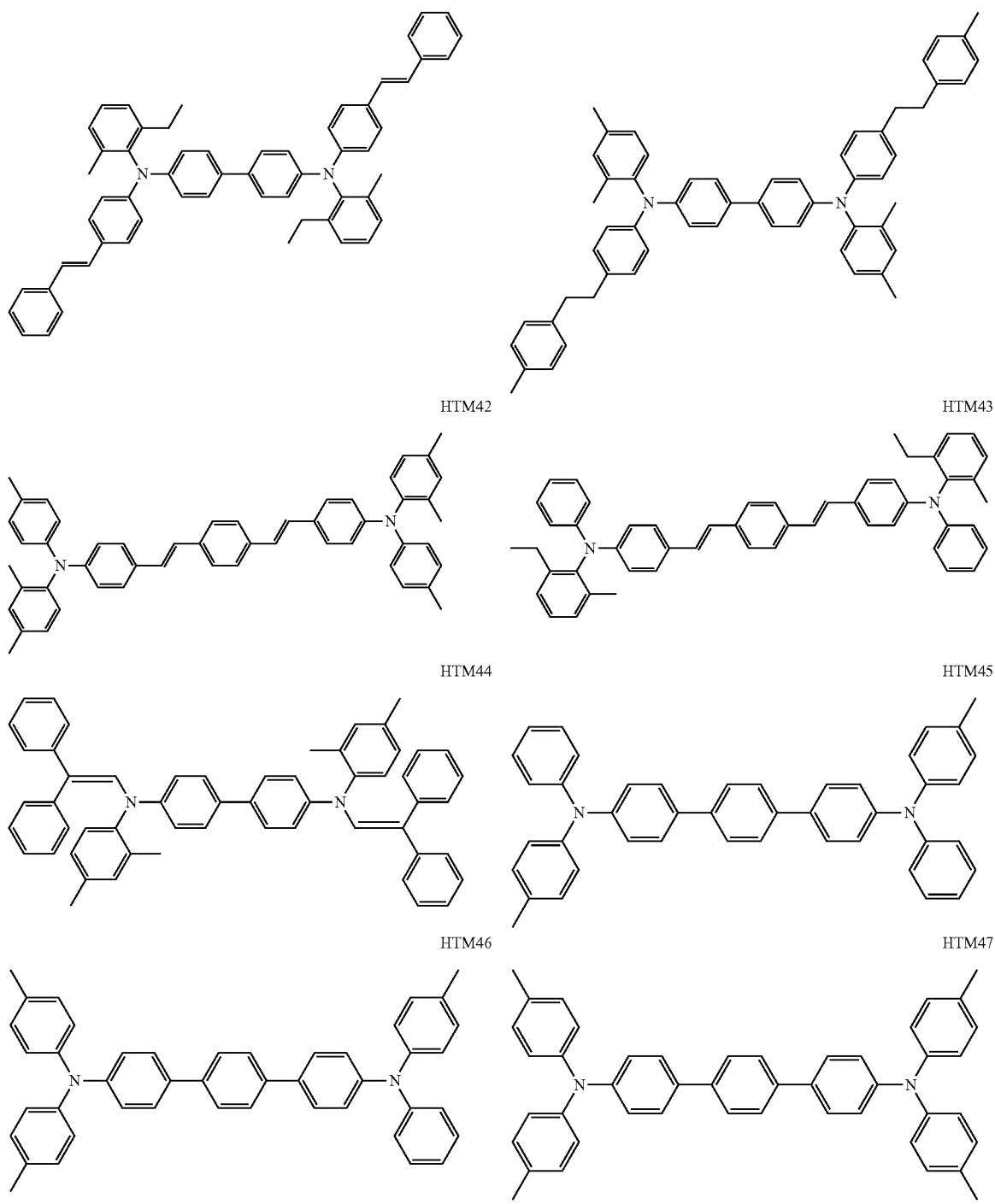

Among the above charge transport substances, preferred is at least one selected from the group consisting of HTM6, HTM10, HTM25, HTM26, HTM29, HTM31, HTM32, HTM33, HTM34, HTM35, HTM37, HTM39, HTM40, HTM41, HTM42, HTM43 and HTM44, and more preferred is at least one selected from the group consisting of HTM6, HTM26, HTM29, HTM34, HTM39, HTM40, HTM41, HTM42, HTM43 and HTM44. The above charge transport substances are preferred since good electrical properties can be obtained even when the polyester resin of the present invention is used.

The polyester resin is preferably used as a binder resin of the charge transport layer. The binder resin may be a mixture of the polyester resin and a resin having the other structure, and examples of the other resin include those described as the other resin mixed in the photosensitive layer.

In the whole binder resin, the content of the at least one structure selected from the group consisting of a structure represented by the Formula (1), a structure represented by the Formula (2), a structure represented by the Formula (3) and a structure represented by the Formula (4) is not particularly limited, and it is generally 0.01% by mass or more, preferably 0.5% by mass or more, more preferably 1% by mass or more, and is generally 50% by mass or less, preferably 30% by mass or less, more preferably 20% by mass or less and still more preferably 15% by mass or less. When the content is within the above range, not only good electrical properties and abrasion resistance can be obtained but also good filming resistance can be obtained.

The ratio of the whole binder resin to the charge transport substance is generally 10 parts by mass or more based on 100 parts by mass of the binder resin in the same layer. Among these, 20 parts by mass or more is preferred from the viewpoint of reducing residual potential, and 30 parts by mass or more is more preferred from the viewpoint of stability and charge mobility when repeatedly used. On the other hand, the charge transport substance is generally used in an amount of 150 parts by mass or less, and preferably 120 parts by mass or less from the viewpoint of thermal stability of the photosensitive layer. Among these, more preferred is 100 parts by mass or less from the viewpoint of compatibility between the charge transporting substance and the binder resin, and still more preferred is 80 parts by mass or less from the viewpoint of abrasion resistance.

The charge transport layer may contain additives such as a plasticizer, an antioxidant, an ultraviolet absorber, an electron-withdrawing compound, a dye, a pigment, and a leveling agent which are well known, so as to improve the film forming property, flexibility, applicability, stain resistance, gas resistance, and light resistance.

Examples of the plasticizer include a hydrocarbon compound, an ester compound, an ether compound, a thioether compound, or the like. From the viewpoint of electrical properties, a hydrocarbon compound, an ester compounds, an ether compounds are preferred, and a hydrocarbon compound and an ether compounds are more preferred. From the viewpoint of compatibility with the binder resin, the plasticizer preferably has an aromatic group.

The molecular weight of the plasticizer is preferably 150 or more, more preferably 170 or more, still more preferably 200 or more, and it is preferably 400 or less, more preferably 380 or less, and still more preferably 350 or less. When the molecular weight is within the above range, crack resistance and gas resistance can be improved due to the compatibility with the binder resin while sublimation during film formation/drying can be suppressed.

These plasticizers may be used alone or in combination. Specific examples of the preferred structure of the plasticizer are shown below.

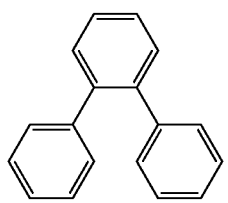

AD-1

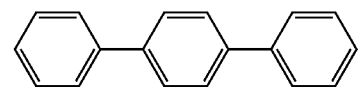

AD-2

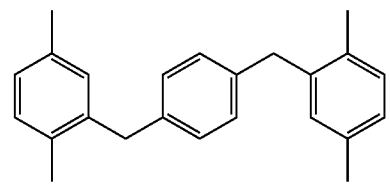

AD-3

AD-4

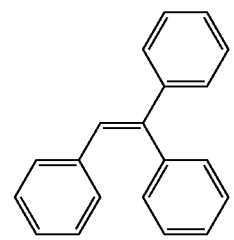

AD-5

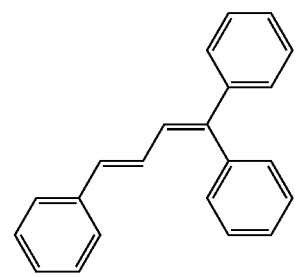

AD-6

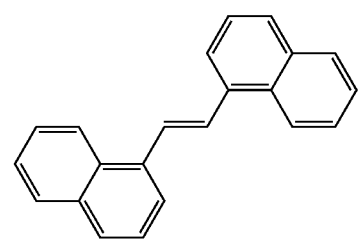

AD-7

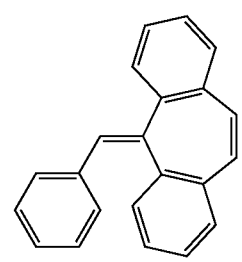

AD-8

-continued

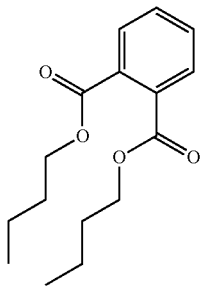
AD-9

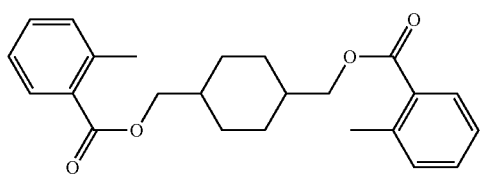
AD-10

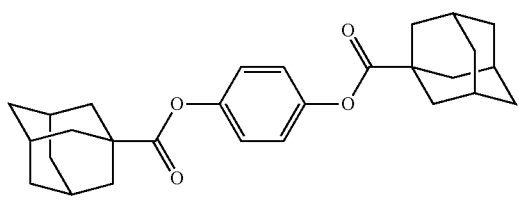
AD-11

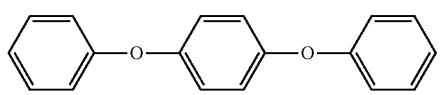
AD-12

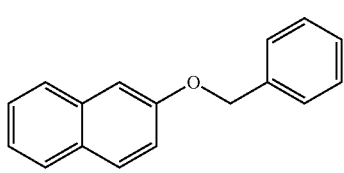
AD-13

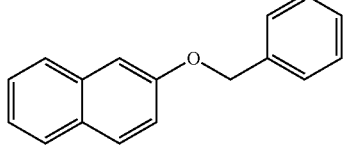
AD-14

Among these plasticizers, preferred are AD-2, AD-4, AD-5, AD-6, AD-8, AD-10, AD-11, and AD-13, and more preferred are AD-2, AD-6, AD-8, AD-10, AD-11, and AD-13. With the above plasticizers, gas resistance and crack resistance can be improved without deteriorating electrical properties.

Examples of the antioxidant include a hindered phenol compound, a hindered amine compound, trialkyl amines, dialkyl aryl amines or the like. Examples of the dye and pigment include various coloring matter compounds, azo compounds or the like.

The charge transport layer may contain inorganic particles such as alumina and silica, and organic particles such as fluororesin particles, silicone particles, polyethylene particles, crosslinked polystyrene particles, and crosslinked (meth)acrylate particles, for the purpose of reducing the frictional resistance and abrasion of the surface of the photoreceptor and increasing the transfer efficiency of the toner from the photoreceptor to the transfer belt or paper.

<Single-Layer Type Photosensitive Layer>

In addition to the charge generation substance and the charge transport substance, the single-layer type photosensitive layer is formed by using a binder resin in order to ensure the film strength similar to the charge transport layer of the lamination-type photoreceptor. Specifically, the single-layer type photosensitive layer can be obtained by dissolving or dispersing the charge generation substance, the charge transport substance and various binder resins in a solvent to prepare a coating fluid, and coating the coating fluid onto a conductive support (onto an undercoat layer in a case where the undercoat layer is disposed), to dry.

The types of the charge transport substance and the binder resin and the use ratio thereof are the same as those described for the charge transport layer of the lamination-type photoreceptor. A charge generation substance is further dispersed in a charge transport medium containing the charge transport substance and the binder resin.

As the charge generation substance, the same ones as those described for the charge generation layer of the lamination-type photoreceptor can be used. However, in the case of the photosensitive layer of the single-layer type photoreceptor, it is necessary to sufficiently reduce the particle diameter of the charge generation substance. Specifically, the particle diameter is generally in a range of 1 μm or less, and preferably 0.5 μm or less.

When the amount of the charge generation substance dispersed in the single-layer type photosensitive layer is excessively small, sufficient sensitivity cannot be obtained; on the other hand, when it is excessively large, there are adverse effects such as deterioration of the charging property and a decrease in sensitivity, and thereby the amount is generally used in an amount of 0.5% by mass or more, and preferably 1% by mass or more, and is generally 50% by mass or less, and preferably 20% by mass or less, based on the entire single layer type photosensitive layer.

Regarding the ratio of the charge generation substance to the binder resin to be used in the single-layer type photosensitive layer, the charge generation substance is generally 0.1 part by mass or more, and preferably 1 part by mass or more, and is generally 30 parts by mass or less, and preferably 10 parts by mass or less, based on 100 parts by mass of the binder resin.

The thickness of the single-layer type photosensitive layer is generally in a range of 5 μm or more, preferably 10 μm or more, and is generally 100 μm or less, and preferably 50 μm or less. Also in this case, known plasticizers for improving film forming property, flexibility, mechanical strength, or the like, additives for suppressing residual potential, dispersion aids for improving dispersion stability, leveling agents for improving applicability, antioxidants for improving storage stability, surfactants, silicone oil and a fluorine-based oil, and other additives may be added. In addition, inorganic particles such as alumina and silica, and organic particles such as fluororesin particles, silicone particles, polyethylene particles, crosslinked polystyrene particles, and crosslinked (meth)acrylate particles, may be contained.

<Other Functional Layers>

For the purpose of improving abrasion resistance, a protective layer may be provided on the outermost surface. The polyester resin of the present invention may be contained as a binder resin of the protective layer.

Further, if necessary, as the other layers, an intermediate layer such as a barrier layer, an adhesive layer, a blocking layer, layers for improving electrical properties and mechanical properties, such as a transparent insulating layer, or the like may be provided.

<Methods for Forming Each Layer>

Each layer that constitutes the above-described photoreceptor may be formed by repeatedly and successively performing application and drying steps, in which a coating fluid obtained by dissolving or dispersing, in a solvent, substances to be contained is applied to a conductive support by a known method, such as dip coating, spray coating, nozzle coating, bar coating, roll coating, or blade coating, and dried to form each layer.

Although solvents or dispersion medium to be used in preparation of the coating fluid is not limited to particular solvents or dispersion media, specific examples thereof include alcohols such as methanol, ethanol, propanol, and 2-methoxyethanol, ethers such as tetrahydrofuran, 1,4-dioxane, and dimethoxyethane, esters such as methyl formate, ethyl acetate, ketones such as acetone, methyl ethyl ketone, and cyclohexanone, aromatic hydrocarbons such as benzene, toluene, and xylene, chlorinated hydrocarbons such as dichloromethane, chloroform, 1,2-dichloroethane, 1,1,2-trichloroethane, 1,1,1-trichloroethane, tetrachloroethane, 1,2-dichloropropane, and trichloroethylene, nitrogen-containing compounds such as n-butylamine, isopropanolamine, diethylamine, triethanolamine, ethylenediamine, and triethylenediamine, and aprotic polar solvents such as acetonitrile, N-methylpyrrolidone, N,N-dimethylformamide, and dimethyl sulfoxide. Among these solvents, non-halogen solvents are preferred from the viewpoint of environmental consideration, and toluene, xylene, anisole, dimethoxyethane, tetrahydrofuran and 1,4-dioxane are particularly preferred from the viewpoint of solubility. One selected from these may be used alone, or two or more selected from these may be used.

Although the amount of the solvent or dispersion medium to be used is not particularly limited, the amount thereof is preferably adjusted, as appropriate, in accordance with the intended purpose of each layer and nature of the selected solvent and dispersion media so as to set properties such as the solid content concentration or viscosity of the coating fluid, to be in desired ranges.

For example, in a case of a charge transport layer of a single-layer type photoreceptor and a function separation type photoreceptor, the solid content concentration of the coating fluid is generally in a range of 5% by mass or more, preferably 10% by mass or more, and is generally in a range of 40% by mass or less, preferably 35% by mass or less. In addition, the viscosity of the coating fluid is generally 10 cps or more, preferably 50 cps or more, and is generally 500 cps or less, preferably 400 cps or less.

In addition, in a case of a charge generation layer of a limitation-type photoreceptor, the solid content concentration of the coating fluid is generally in a range of 0.1% by mass or more, preferably 1% by mass or more, and is generally in a range of 15% by mass or less, preferably 10% by mass or less. In addition, the viscosity of the coating fluid is generally 0.01 cps or more, preferably 0.1 cps or more, and is generally 20 cps or less, preferably 10 cps or less.

Examples of a method for applying the coating fluid include a dip coating method, a spray coating method, a spinner coating method, a bead coating, a wire bar coating method, a blade coating method, a roller coating method, an air-knife coating method, a curtain coating method, or the like, and other known coating methods can also be used.

Regarding the drying of the coating fluid, it is preferable that after a touch drying at room-temperature, the coating fluid is dried with heating in a temperature range of, generally, 30° C. to 200° C. for 1 minute to 2 hours either in a stationary atmosphere or with air blowing. The heating temperature may be constant, or the heating for drying may be performed while changing the heating temperature.

<Image Forming Apparatus>

An embodiment of an image forming apparatus (an image forming apparatus according to the present invention) including the electrophotographic photoreceptor according to the present invention will be described with reference to FIG. 1. However, embodiments of the present invention are not limited to the following description, and the embodiments can be freely modified without departing from the spirit and scope of the present invention.

As shown in FIG. 1, the image forming apparatus includes an electrophotographic photoreceptor 1, a charging device 2, an exposure device 3, and a developing device 4, and may further include, as necessary, a transfer device 5, a cleaning device 6, and a fixing device 7.

The electrophotographic photoreceptor 1 is not particularly limited as long as it is an electrophotographic photoreceptor according to the present invention. FIG. 1 shows, as an example thereof, a drum-shaped photoreceptor in which the above-described photosensitive layer is formed on a surface of a cylindrical conductive support. The charging device 2, the exposure device 3, the developing device 4, the transfer device 5 and the cleaning device 6 are respectively disposed along an outer peripheral surface of the electrophotographic photoreceptor 1.

In the present invention, one or two or more of the charging device 2, the exposure device 3, the developing device 4, the transfer device 5, the cleaning device 6, and the fixing device 7 may be combined with the electrophotographic photoreceptor 1 to configure an integrated cartridge (hereinafter, referred as "electrophotographic photoreceptor cartridge" as appropriate) so that this electrophotographic photoreceptor cartridge can be mounted on and demounted from the main body of an electrophotographic apparatus such as a copier or a laser-beam printer. That is, the present invention also relates to an electrophotographic cartridge including the electrophotographic photoreceptor.

In this case, for example, when the electrophotographic photoreceptor 1 and other members are deteriorated, maintenance and management of the image forming apparatus is easier by detaching the electrophotographic photoreceptor cartridge from the main body of the image forming apparatus and attaching another new electrophotographic photoreceptor cartridge to the main body of the image forming apparatus.

EXAMPLES

The specific embodiment of the present invention will be described in more detail with reference to examples, but the present invention is by no means restricted to the following Examples so long as it does not exceed the gist thereof.

[Production of Polyester Resin]

<Synthesis Example 1> (Preparation of Polyester Resin (1))

To a 500 mL four-neck reactor in which nitrogen substitution was performed, poly(1,4-butanediol carbonate) (molecular weight: 2,000 in terms of OH group) (2.00 g) and diphenyl ether-4,4'-dicarboxylic acid chloride (11.64 g) were weighted and dissolved in dichloromethane (50 mL). Subsequently, a mixed solution of triethylamine (0.41 g) and dichloromethane (10 mL) was added dropwise to the reactor cooled to 5° C. to 15° C. over 5 minutes; and then stirring was continued for 2 hours while maintaining the internal temperature at 18° C. to 23° C.

Then, to the above reactor, 1,1-bis(4-hydroxy-3-methylphenyl) ethane (9.24 g) was added. Thereafter, a mixed solution of triethylamine (7.95 g) and dichloromethane (20 mL) was added dropwise to the reactor cooled to 5° C. to 15° C. over 20 minutes. Stirring was continued for 4 hours while maintaining the reaction internal temperature at 18° C. to 23° C. Thereafter, washing was performed with demineralized water (190 mL), the mixture was allowed to stand for 30 minutes, and then the organic layer was separated. This organic layer was washed three times with 0.2 N hydrochloric acid (190 mL) and further washed twice with demineralized water (190 mL).

The washed organic layer was diluted with dichloromethane (300 ml), and poured into methanol (2000 ml), and the obtained precipitate was filtrated by filtration and dried to obtain the target polyester resin (1). The obtained polyester resin had a viscosity-average molecular weight (Mv) of 38,000. In addition, the residual amount of the poly(1,4-butanediol carbonate) contained in the polyester resin (1) is 10% by mass. The structural formula of the polyester resin (1) is shown below.

lecular weight: 2,000 in terms of OH group) (1.00 g) and diphenyl ether-4,4'-dicarboxylic acid chloride (12.17 g) were weighted and dissolved in dichloromethane (50 mL). Subsequently, a mixed solution of triethylamine (0.12 g) and dichloromethane (10 mL) was added dropwise to the reactor cooled to 5° C. to 15° C. over 5 minutes, and then stirring was continued for 2 hours while maintaining the internal temperature at 18° C. to 23° C.

Then, to the above reactor, 1,1-bis(4-hydroxy-3-methylphenyl) ethane (9.82 g) was added. Thereafter, a mixed solution of triethylamine (8.77 g) and dichloromethane (20 mL) was added dropwise to the reactor cooled to 5° C. to 15° C. over 20 minutes. Stirring was continued for 4 hours while maintaining the reaction internal temperature at 18° C. to 23° C. Thereafter, washing was performed with demineralized water (190 mL), the mixture was allowed to stand for 30 minutes, and then the organic layer was separated. This

POLYESTER RESIN (1)

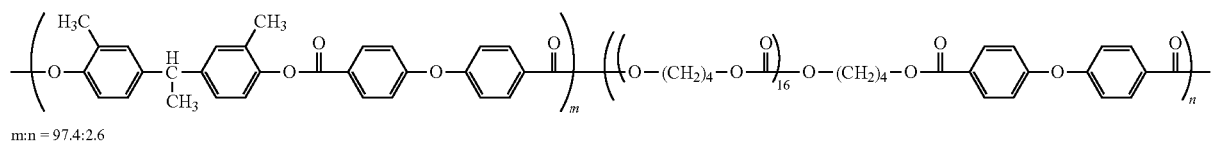

m:n = 97.4:2.6

[Measurement of Viscosity-Average Molecular Weight (Mv)]

A polyester resin was dissolved in dichloromethane to prepare a solution having a concentration C of 6.00 g/L. Using an Ubbelohde capillary viscometer having a solvent (dichloromethane) flow time to of 136.16 seconds, the flow time t of the sample solution was measured in a constant temperature water bath set at 20.0° C. The viscosity-average molecular weight (Mv) was calculated according to the following formulae.

$a = 0.438 \times \eta_{sp} + 1$ $\eta_{sp} = t/t_0 - 1$ organic layer was washed three times with 0.2 N hydrochloric acid (190 mL) and further washed twice with demineralized water (190 mL).

The washed organic layer was diluted with dichloromethane (300 ml), and poured into methanol (2000 ml), and the obtained precipitate was filtrated by filtration and dried to obtain the target polyester resin (2). The obtained polyester resin had a viscosity-average molecular weight (Mv) of 48,000. In addition, the residual amount of the poly(1,4-butanediol carbonate) contained in the polyester resin (2) is 5% by mass. The structural formula of the polyester resin (2) is shown below.

POLYESTER RESIN (2)

m:n = 98.6:1.2

$b = 100 \times \eta_{sp}/C$ $C = 6.00$ (g/L)

$\eta = b/a$ $Mv = 3207 \times \eta^{1.205}$

<Synthesis Example 2> (Preparation of Polyester Resin (2))

To a 500 mL four-neck reactor in which nitrogen substitution was performed, poly(1,4-butanediol carbonate) (mo- <Synthesis Example 3> (Preparation of Polyester Resin (3))

To a 500 mL four-neck reactor in which nitrogen substitution was performed, poly(2,2-dimethyl 1,3-propanediol carbonate) (molecular weight: 1,000 in terms of OH group) (1.00 g) and diphenyl ether-4,4'-dicarboxylic acid chloride (12.23 g) were weighted and dissolved in dichloromethane (50 mL). Subsequently, a mixed solution of triethylamine (0.26 g) and dichloromethane (10 mL) was added dropwise to the reactor cooled to 5° C. to 15° C. over 5 minutes, and then stirring was continued for 2 hours while maintaining the internal temperature at 18° C. to 23° C.

Then, to the above reactor, 1,1-bis(4-hydroxy-3-methylphenyl) ethane (9.76 g) was added. Thereafter, a mixed solution of triethylamine (8.74 g) and dichloromethane (20 mL) was added dropwise to the reactor cooled to 5° C. to 15° C. over 20 minutes. Stirring was continued for 4 hours while maintaining the reaction internal temperature at 18° C. to 23° C. Thereafter, washing was performed with demineralized water (190 mL), the mixture was allowed to stand for 30 minutes, and then the organic layer was separated. This organic layer was washed three limes with 0.2 N hydrochloric acid (190 mL) and further washed twice with demineralized water (190 mL).

The washed organic layer was diluted with dichloromethane (300 ml), and poured into methanol (2000 ml), and the obtained precipitate was filtrated by filtration and dried to obtain the target polyester resin (3). The obtained polyester resin had a viscosity-average molecular weight (Mv) of 47,000. In addition, the residual amount of the poly(2,2-dimethyl 1,3-propanediol carbonate) contained in the polyester resin (3) is 5% by mass. The structural formula of the polyester resin (3) is shown below.

POLYESTER RESIN (3)

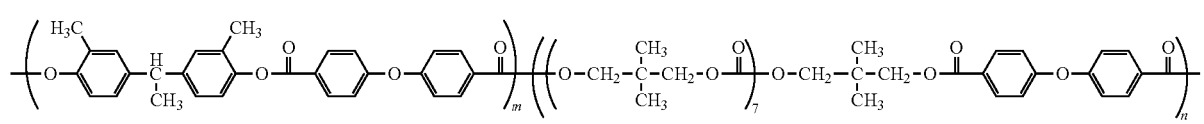

m:n = 97.6:2.4

<Synthesis Example 4> (Preparation of Polyester Resin (4))

A polyester resin (4) was obtained in the same manner as in Synthesis Example 1 except that the poly(1,4-butanediol carbonate) (molecular weight: 2,000 in terms of OH group) of Synthesis Example 1 was changed to poly(2,2-dimethyl 1,3-propanediol carbonate) (molecular weight: 2,000 in terms of OH group). The obtained polyester resin had a viscosity-average molecular weight (Mv) of 37,000. In addition, the residual amount of the poly(2,2-dimethyl 1,3-propanediol carbonate) contained in the polyester resin (4) is 10% by mass. The structural formula of the polyester resin (4) is shown below.

POLYESTER RESIN (4)

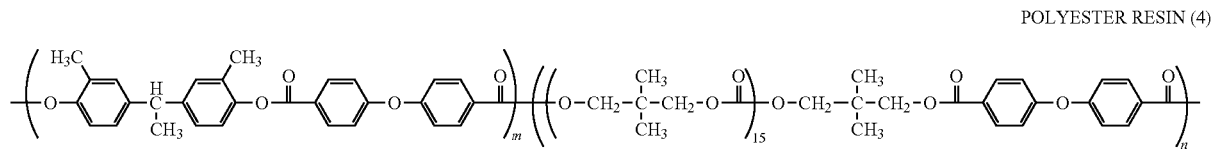

m:n = 97.4:2.6

<Synthesis Example 5> (Preparation of Polyester Resin (5))

A polyester resin (5) was obtained in the same manner as in Synthesis Example 1 except that the poly(1,4-butanediol carbonate) (molecular weight: 2,000 in terms of OH group) of Synthesis Example 1 was changed to poly(1,10-decanediol carbonate) (molecular weight: 2,000 in terms of OH group). The obtained polyester resin had a viscosity-average molecular weight (Mv) of 45,000. In addition, the residual amount of the poly(1,10-decanediol carbonate) contained in the polyester resin (5) is 10% by mass. The structural formula of the polyester resin (5) is shown below.

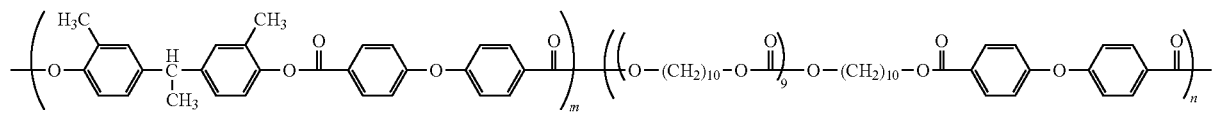

POLYESTER RESIN (5)

m:n = 97.4:2.6

<Synthesis Example 6> (Preparation of Polyester Resin (6))

A polyester resin (6) was obtained in the same manner as in Synthesis Example 1 except that the poly(1,4-butanediol carbonate) (molecular weight: 2,000 in terms of OH group) of Synthesis Example 1 was changed to poly[di(ethylene glycol) adipate] (molecular weight: 2,500 in terms of OH group). The obtained polyester resin had a viscosity-average molecular weight (Mv) of 41,000. In addition, the residual amount of the poly[di(ethylene glycol) adipate] contained in the polyester resin (6) is 10% by mass. The structural formula of the polyester resin (6) is shown below.

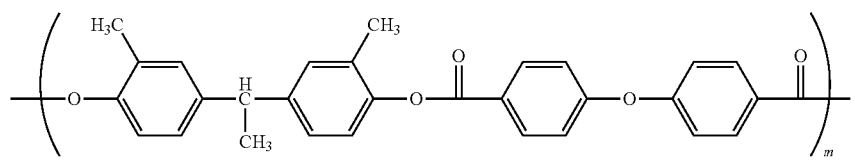

POLYESTER RESIN (6)

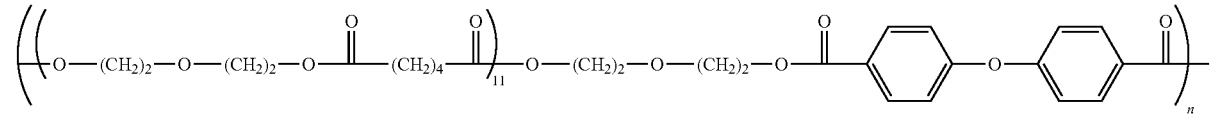

m:n = 98:2

<Synthesis Example 7> (Preparation of Polyester Resin (7))

A polyester resin (7) was obtained in the same manner as in Synthesis Example 1 except that the poly(1,4-butanediol carbonate) (molecular weight: 2,000 in terms of OH group) of Synthesis Example 1 was changed to polycaprolactone diol (molecular weight: 2,000 in terms of OH group). The obtained polyester resin had a viscosity-average molecular weight (Mv) of 44,000. In addition, the residual amount of the polycaprolactone diol contained in the polyester resin (7) is 10% by mass. The structural formula of the polyester resin (7) is shown below.

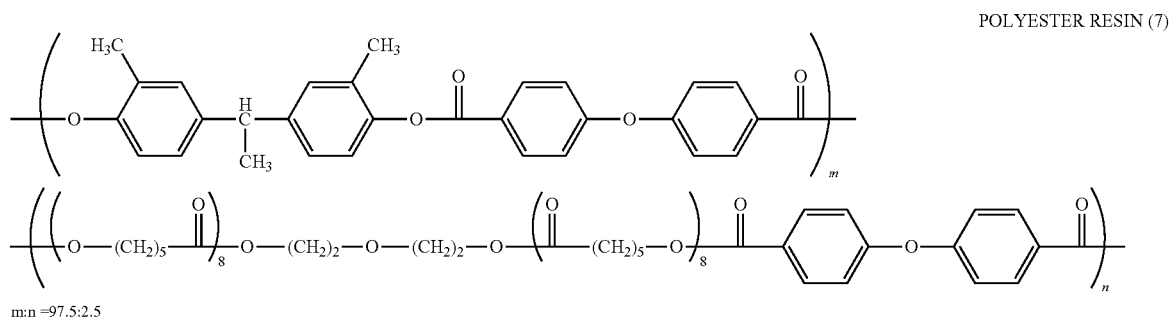

POLYESTER RESIN (7)

m:n =97.5:2.5

<Synthesis Example 8> (Preparation of Polyester Resin (8))

A polyester resin (8) was obtained in the same manner as in Synthesis Example 1 except that the poly(1,4-butanediol carbonate) (molecular weight: 2,000 in terms of OH group) of Synthesis Example 1 was changed to polytetramethylene ether glycol (molecular weight: 2,000 in terms of OH group). The obtained polyester resin had a viscosity-average molecular weight (Mv) of 35,000. In addition, the residual amount of the polytetramethylene ether glycol contained in the polyester resin (8) is 10% by mass. The structural formula of the polyester resin (8) is shown below.

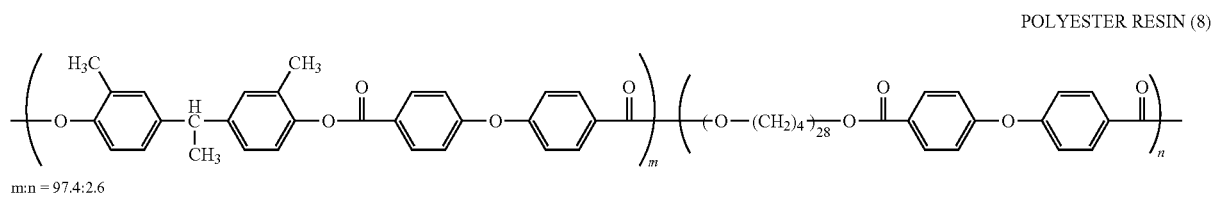

POLYESTER RESIN (8)

m:n = 97.4:2.6

<Synthesis Example 9> (Preparation of Polyester Resin (9))

A polyester resin (9) was obtained in the same manner as in Synthesis Example 2 except that the poly(1,4-butanediol carbonate) (molecular weight: 2,000 in terms of OH group) of Synthesis Example 2 was changed to polytetramethylene ether glycol (molecular weight: 2,000 in terms of OH group). The obtained polyester resin had a viscosity-average molecular weight (Mv) of 50,000. In addition, the residual amount of the polytetramethylene ether glycol contained in the polyester resin (9) is 5% by mass. The structural formula of the polyester resin (9) is shown below.

POLYESTER RESIN (9)

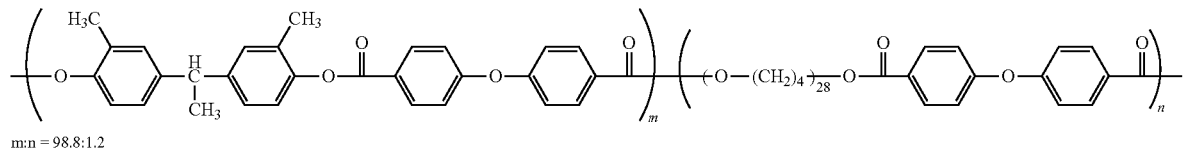

m:n = 98.8:1.2

<Synthesis Example 10> (Preparation of Polyester Resin (10))

A polyester resin (10) was obtained in the same manner as in Synthesis Example 1 except that the poly(1,4-butanediol carbonate) (molecular weight: 2,000 in terms of OH group) of Synthesis Example 1 was changed to polytetramethylene ether glycol (molecular weight: 3,000 in terms of OH group). The obtained polyester resin had a viscosity-average molecular weight (Mv) of 52,000. In addition, the residual amount of the polytetramethylene ether glycol contained in the polyester resin (10) is 10% by mass. The structural formula of the polyester resin (10) is shown below.

POLYESTER RESIN (10)

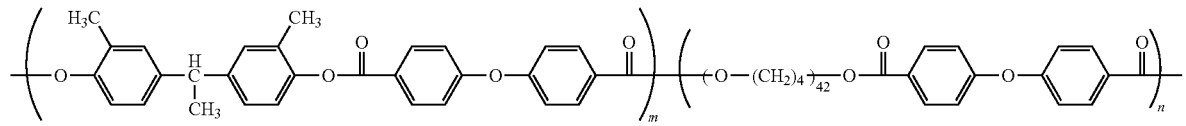

m:n = 98.2:1.8

<Synthesis Example 11> (Preparation of Polyester Resin (11))

A polyester resin (11) was obtained in the same manner as in Synthesis Example 3 except that the poly(1,4-butanediol carbonate) (molecular weight: 1,000 in terms of OH group) of Synthesis Example 3 was changed to polytetramethylene ether glycol (molecular weight: 650 in terms of OH group). The obtained polyester resin had a viscosity-average molecular weight (Mv) of 37,000. In addition, the residual amount of the polytetramethylene ether glycol contained in the polyester resin (11) is 5% by mass. The structural formula of the polyester resin (11) is shown below.

POLYESTER RESIN (11)

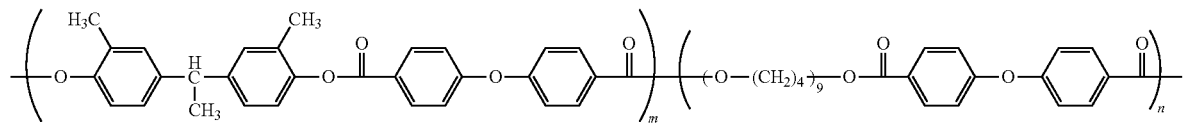

m:n = 96.3:3.7

<Synthesis Example 12> (Preparation of Polyester Resin (12))

To a 500 mL four-neck reactor in which nitrogen substitution was performed, poly(1,4-butanediol adipate) (molecular weight: 2,000 in terms of OH group) (2.48 g), terephthaloyl chloride (6.24 g) and isophthaloyl chloride (6.24 g) were weighted and dissolved in dichloromethane (70 mL). Subsequently, a mixed solution of triethylamine (0.31 g) and dichloromethane (10 mL) was added dropwise to the reactor cooled to 5° C. to 15° C. over 5 minutes, and then stirring was continued for 1.5 hours while maintaining the internal temperature at 18° C. to 23° C.

Then, to the above reactor, 1,1-bis(4-hydroxy-3-methylphenyl) ethane (14.35 g) and 2,3,5-trimethylphenol (0.16 g) were added and diluted with dichloromethane (70 mL). Thereafter, a mixed solution of triethylamine (13.34 g) and dichloromethane (60 mL) was added dropwise to the reactor cooled to 5° C. to 15° C. over 20 minutes. After stirring for 30 minutes, the mixture was diluted with dichloromethane (100 mL) and the stirring was continued for another 3 hours while maintaining the reaction internal temperature at 18° C. to 23° C. Thereafter, washing was performed with demineralized water (240 mL), the mixture was allowed to stand for 30 minutes, and then the organic layer was separated. This organic layer was washed three times with 0.2 N hydrochloric acid (240 mL) and further washed twice with demineralized water (240 mL).

The washed organic layer was diluted with dichloromethane (200 ml), and poured into methanol (2500 ml), and the obtained precipitate was filtrated by filtration and dried to obtain the target polyester resin (12). The obtained polyester resin had a viscosity-average molecular weight (Mv) of 31,000. In addition, the residual amount of the poly(1,4-butanediol adipate) contained in the polyester resin (12) is 10% by mass. The structural formula of the polyester resin (12) is shown below.

continued for 4 hours. Thereafter, washing was performed with demineralized water (190 mL), the mixture was allowed to stand for 30 minutes, and then the organic layer was separated. This organic layer was washed three times with 0.2 N hydrochloric acid (190 mL) and further washed twice with demineralized water (190 mL).

The washed organic layer was diluted with dichloromethane (300 ml), and poured into methanol (2,000 ml), and the obtained precipitate was filtrated by filtration and dried to obtain the target polyester resin (13). The obtained polyester resin had a viscosity-average molecular weight (Mv) of 102,000. As a result of NMR measurement, polytetramethylene ether glycol was not copolymerized, and 2.5% by mass of unreacted polytetramethylene glycol was contained.

<Comparative Synthesis Example 2> (Preparation of Polyester Resin (14))

To a 500 mL four-neck reactor in which nitrogen substitution was performed, Byron 200 (manufactured by Toyobo Co., Ltd., an amorphous polyethylene terephthalate modified resin, molecular weight: 17,000 in terms of OH group) (3.00 g) and diphenyl ether-4,4'-dicarboxylic acid chloride (17.24 g) were weighted and dissolved in dichloromethane (70 mL). Subsequently, a mixed solution of triethylamine (0.07 g) and dichloromethane (10 mL) was added dropwise to the reactor cooled to 5° C. to 15° C. over 5 minutes, and then stirring was continued for 2 hours while maintaining the internal temperature at 18° C. to 23° C.

Then, to the above reactor, 1,1-bis(4-hydroxy-3-methylphenyl) ethane (13.94 g) and 2,3,5-trimethylphenol (0.08 g) were added and diluted with dichloromethane (150 mL). Thereafter, a mixed solution of triethylamine (12.69 g) and dichloromethane (100 mL) was added dropwise to the reactor cooled to 5° C. to 15° C. over 20 minutes. After stirring for 30 minutes, the mixture was diluted with dichloromethane (50 mL) and the stirring was continued for 4

POLYESTER RESIN (12)

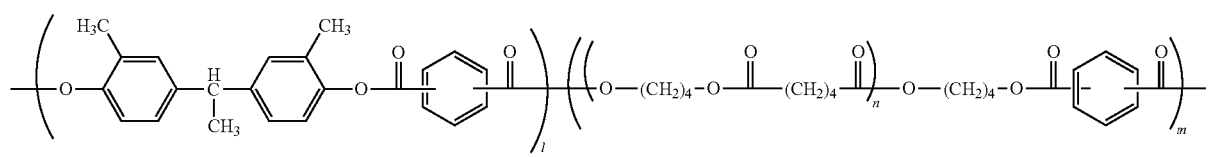

TEREPHTHALIC ACID RESIDUE: ISOPHTHALIC ACID RESIDUE = 50:50 (MOLAR RATIO)

l:m = 97.9:2.1

<Comparative Synthesis Example 1> (Preparation of Polyester Resin (13))

To a 500 mL four-neck reactor in which nitrogen substitution was performed, polytetramethylene ether glycol (molecular weight: 2,000 in terms of OH group) (2.00 g), 1,1-bis(4-hydroxy-3-methylphenyl) ethane (9.24 g), and diphenyl ether-4,4'-dicarboxylic acid chloride (11.65 g) were weighted and dissolved in dichloromethane (80 mL). Subsequently, a mixed solution of triethylamine (8.55 g) and dichloromethane (20 mL) was added dropwise to the reactor cooled to 5° C. to 15° C. over 30 minutes, and then stirring was continued for 1 hour while maintaining the internal temperature at 18° C. to 23° C. Then, the mixture was diluted with dichloromethane (150 mL), and the stirring was hours while maintaining the reaction internal temperature at 18° C. to 23° C. Thereafter, washing was performed with demineralized water (290 mL), the mixture was allowed to stand for 30 minutes, and then the organic layer was separated. This organic layer was washed three times with 0.2 N hydrochloric acid (290 mL) and further washed twice with demineralized water (290 mL).

The washed organic layer was diluted with dichloromethane (200 ml), and poured into methanol (2500 ml), and the obtained precipitate was filtrated by filtration and dried to obtain the target polyester resin (14). The obtained polyester resin had a viscosity-average molecular weight (Mv) of 53,000. In addition, the residual amount of Byron 200 contained in the polyester resin (14) is 10% by mass.

<Preparation of Photoreceptor Sheet (Electrophotographic Photoreceptor)>

Example 13

10 parts by mass of oxytitanium phthalocyanine and 150 parts by mass of 4-methoxy-4-methyl-2-pentanone were mixed, and subjected to a pulverization and dispersion treatment with a sand grinding mill, so as to prepare a pigment dispersion. The oxytitanium phthalocyanine exhibits an intense diffraction peak at a Bragg angle ($2\theta \pm 0.2$) of 9.3°, 10.6°, 13.2°, 15.1°, 15.7°, 16.1°, 20.8°, 23.3°, 26.3° and 27.1° in X-ray diffraction by CuK$\alpha$ ray.

To this pigment dispersion, 50 parts by mass of a 5% by mass of 1,2-dimethoxyethane solution of polyvinyl butyral (trade name Denka Butyral #6000C, manufactured by Denki Kagaku Kogyo K.K.), and 50 parts by mass of a 5% by mass of 1,2-dimethoxyethane solution of a phenoxy resin (trade name PKHH; manufactured by Union Carbide Corporation) were mixed, and further an appropriate amount of 1,2-dimethoxyethane was added, so as to prepare a charge generation layer forming coating fluid having a solid content concentration of 4.0%. This charge generation layer forming coating fluid was coated on a polyethylene terephthalate sheet, on which aluminum was vapor-deposited on the surface, and dried to form a charge generation layer, having a film thickness of 0.4 μm after drying.

Next, as a charge transport substance, 50 parts by mass of a mixture (HTM39) prepared by a method described in Example 1 of JP-A-2002-080432, including a compound group of a geometric isomer whose main component is the structure shown below, 100 parts by mass of the polyester resin (1) prepared in Synthesis Example 1, 8 parts by mass of an antioxidant (IRGANOX 1076), and 0.05 part by mass of silicone oil as a leveling agent were mixed in 640 parts by mass of a mixed solvent of tetrahydrofuran and toluene (80% by mass of tetrahydrofuran and 20% by mass of toluene), so as to prepare a charge transport layer forming coating fluid.

HTM39

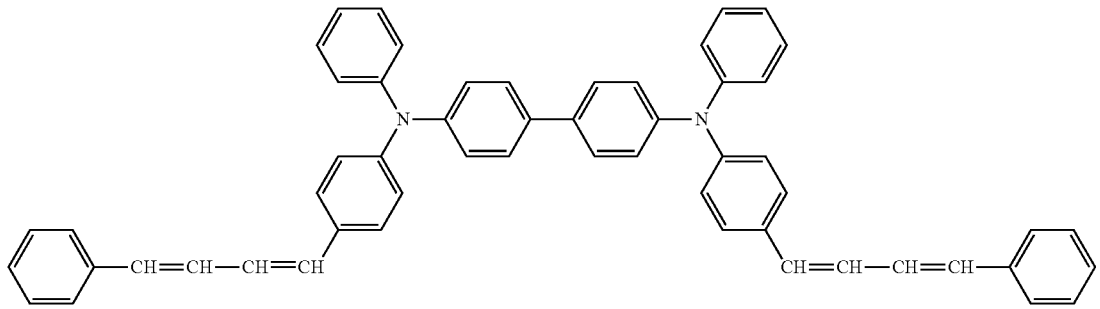

This charge transport layer forming coating fluid was coated onto the above charge generation layer using an applicator and dried at 125° C. for 20 minutes to form a charge transport layer, so as to have a film thickness of 25 μm after drying, and prepared a photoreceptor sheet (hereinafter, simply referred to as "photoreceptor").

Examples 14 to 24

Photoreceptor sheets were prepared in the same manner as in Example 13, except that the polyester resin (1) was replaced by the polyester resin (2) to (12) prepared in Synthesis Examples 2 to 12, as shown in Table 1.

Comparative Example 3

A photoreceptor sheet was prepared in the same manner as in Example 13, except that the polyester resin (1) was replaced by a polyester resin (15) (viscosity-average molecular weight 36,200) having a structure shown below which was prepared by a method described in Example 6 of JP-A-2006-53549.

POLYESTER RESIN (15)

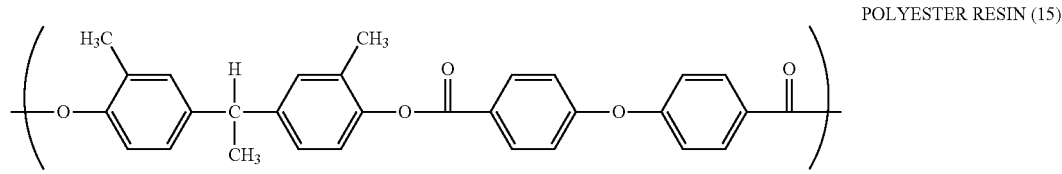

Comparative Example 4

A photoreceptors sheet was prepared in the same manner as in Example 13, except that the polyester resin (1) was replaced by the polyester resin (13) prepared in Comparative Synthesis Example 1.

Comparative Example 5

A photoreceptors sheet was prepared in the same manner as in Example 13, except that the polyester resin (1) was replaced by the polyester resin (14) prepared in Comparative Synthesis Example 2.

[Evaluation on Electrical Properties]

The photoreceptors were attached to an aluminum drum to be formed into a cylindrical shape, and after a conduction between the aluminum drum and the aluminum substrate of the photoreceptor, the drum was rotated at a constant number of revolutions, and an electric property evaluation test was performed by a cycle of charging, exposure, potential measurement, and charge elimination by using an electrophotography property evaluation apparatus manufactured in accordance with the measurement standards of The Society of Electrophotography of Japan (as described in Foundation and Application of Electrophotographic Technique (Continued), CORONA PUBLISHING CO., LTD., published on Nov. 15, 1996, Pages 404 to 405). At that time, the initial surface potential was set at −700 V, monochromatic light of 780 nm was used in the exposure, and monochromatic light of 660 nm was used in the static elimination, and the surface potential (VL) at the time when exposure light irradiated was 2.4 µJ/cm$^2$ was measured.

For the VL measurement, the time required for the potential measurement from the exposure was set to 139 ms. In addition, the irradiation energy (half reduction exposure energy: µJ/cm$^2$) when the surface potential was half the initial surface potential (−350 V) was measured as sensitivity ($E_{1/2}$). The smaller the absolute value of VL is, the more excellent the electrical properties are, while the smaller the value of $E_{1/2}$, the higher the sensitivity is. The measurement was performed in an environment of temperature of 25° C. and relative humidity of 50% (N/N). The results are shown in Table 1.

[Abrasion Test]

The photoreceptor film was cut into a circle having a diameter of 10 cm and the abrasion was evaluated by a Taber abrasion tester (manufactured by Toyo Seiki Seisaku-sho, Ltd.). The amount of abrasion after 1,000 revolutions at a load of 500 g was measured by comparing masses before and after the test using an abrasion wheel CS-10F under test conditions of an atmosphere of 25° C. and 50% RH. The smaller the value, the more excellent the abrasion resistance is. The results are shown in Table 1.

[Adhesion Test]

Similarly, a photosensitive layers where the charge generation layers and the charge transport layer according to Examples and Comparative Examples were coated on an aluminum plate, were prepared in the same manner as in the preparation of the photoreceptor films in Examples 13 to 24 and Comparative Examples 3 to 5, except that an aluminum plate having a thickness of 1 mm was used instead of an aluminum vapor-deposited polyethylene terephthalate sheet.

The photosensitive layer on the aluminum plate was cut horizontally and laterally each for six times at intervals of 2 mm using a NT cutter, to prepare masses of 25 with 5×5. The adhesion of the photosensitive layer (charge generation layer) and the undercoat layer was tested by attaching a cellophane tape (3M) in close contact with the photosensitive layer and lifting the same up to 90° with respect to the adhesion surface. This was performed in two places, and the proportion of the number of masses of the photosensitive layer remaining on the support based on a total of 50 masses was evaluated as a residual ratio. Evaluation results were indicated by ⊚ when the residual ratio was 90% or more, ○ when the residual ratio was 70 to 90% or more, Δ when the residual ratio was 20% to 70%, and x when the residual ratio was 20% or less. The results are shown in Table 1.

TABLE 1

| | | Polyester resin | | | | | | |
|---|---|---|---|---|---|---|---|---|
| | | At least one selected from group consisting of structure represented by Formula (1), structure represented by Formula (2), structure represented by Formula (3), and structure represented by Formula (4) | | | | Electrical properties (N/N) | | |
| | No. | Type | Molecular weight (in terms of OH group) | Content (% by mass) | $E_{1/2}$ (µJ/cm$^2$) | VL (-V) | Abrasion amount (-mg) | Adhesion |
| Example 13 | (1) | PBDC | 2000 | 10 | 0.390 | 59 | 1.09 | ⊚ |
| Example 14 | (2) | PBDC | 2000 | 5 | 0.375 | 52 | 1.26 | ○ |
| Example 15 | (3) | PDMPDC | 1000 | 5 | 0.388 | 58 | 1.71 | ○ |
| Example 16 | (4) | PDMPDC | 2000 | 10 | 0.390 | 60 | 1.13 | ⊚ |
| Example 17 | (5) | PDDC | 2000 | 10 | 0.388 | 61 | 1.10 | ⊚ |
| Example 18 | (6) | PDEGA | 2500 | 10 | 0.378 | 55 | 1.86 | ⊚ |
| Example 19 | (7) | PCLD | 2000 | 10 | 0.375 | 53 | 1.76 | ⊚ |
| Example 20 | (8) | PTMG | 2000 | 10 | 0.367 | 56 | 1.22 | Δ |
| Example 21 | (9) | PTMG | 2000 | 5 | 0.385 | 62 | 1.78 | Δ |
| Example 22 | (10) | PTMG | 3000 | 10 | 0.386 | 55 | 1.20 | X |
| Example 23 | (11) | PTMG | 650 | 5 | 0.379 | 58 | 1.79 | ○ |

TABLE 1-continued

Polyester resin

At least one selected from group consisting of structure represented by Formula (1), structure represented by Formula (2), structure represented by Formula (3), and structure represented by Formula (4)

| | No. | Type | Molecular weight (in terms of OH group) | Content (% by mass) | Electrical properties (N/N) $E_{1/2}$ (μJ/cm$^2$) | VL (-V) | Abrasion amount (-mg) | Adhesion |
|---|---|---|---|---|---|---|---|---|
| Example 24 | (12) | PBA | 2000 | 10 | 0.385 | 54 | 1.74 | ○ |
| Comparative Example 3 | (15) | — | — | — | 0.387 | 58 | 2.15 | Δ |
| Comparative Example 4 | (13) | PTMG | 2000 | * | 0.398 | 92 | 3.31 | X |
| Comparative Example 5 | (14) | Byron 200 | 17000 | 10 | 0.597 | 205 | 1.60 | X |

*: unreacted divalent alcohol remains, and covalent bonded divalent alcohol does not remain.
PBDC: poly(1,4-butanediol carbonate)
PDMPDC: poly(2,2-dimethyl-1,3-propanediol carbonate)
PDDC: poly(1,10-decanediol carbonate)
PDEGA: poly[di(ethylene glycol) adipate]
PCLD: polycaprolactone diol
PTMG: polytetramethylene ether glycol
PBA: poly(1,4-butanediol adipate)

As seen from above, by using a polyester resin having at least one structure selected from the group consisting of a structure represented by the Formula (1), a structure represented by the Formula (2), a structure represented by the Formula (3) and a structure represented by the Formula (4) and obtained by copolymerizing a divalent phenol and a divalent carboxylic acid, as a binder resin, the abrasion resistance of the electrophotographic photoreceptor can be improved while maintaining the electrical properties thereof (Examples 13 to 24). The adhesion of the photosensitive layer can also be improved particularly by using a polyester resin having at least one structure α selected from the group consisting of a structure represented by the Formula (1), a structure represented by the Formula (2) and a structure represented by the Formula (3) as a binder resin (Examples 13 to 19 and 24). On the other hand, in a case where the raw material, divalent alcohol was not copolymerized and remained unreacted, all of the electrical properties, abrasion resistance and adhesiveness were deteriorated (Comparative Example 3). In addition, in a case where the number average molecular weight was 17,000, the electrical properties were greatly deteriorated due to phase separation in the film (Comparative Example 5).

[Production of Polyester Resin for Photoreceptor Drum]

<Synthesis Example 25> (Preparation of Polyester Resin (16))

To a 1000 mL four-neck reactor in which nitrogen substitution was performed, poly(1,4-butanediol adipate) (molecular weight: 2,000 in terms of OH group) (1.50 g), 2,3,5-trimethylphenol (0.15 g) and diphenyl ether-4,4'-dicarboxylic acid chloride (16.00 g) were weighted and dissolved in dichloromethane (90 mL). Subsequently, a mixed solution of triethylamine (0.33 g) and dichloromethane (10 mL) was added to the reactor cooled to 5° C. to 15° C., and then stirring was continued for 2 hours while maintaining the internal temperature at 18° C. to 23° C.

Then, to the above reactor, diphenyl ether-4,4'-dicarboxylic acid chloride (16.00 g) and bis(4-hydroxy-3-methylphenyl) methane (21.80 g) were added. Thereafter, a mixed solution of triethylamine (17.56 g) and dichloromethane (160 mL) was added dropwise to the reactor cooled to 5° C. to 15° C. over 20 minutes.

After stirring for 5 minutes, 4-hydroxyphenyl 4-hydroxybenzoate (2.46 g) was added. Thereafter, a mixed solution of triethylamine (5.80 g) and dichloromethane (190 ml) was added dropwise over 10 minutes. Thereafter, while maintaining the internal temperature at 18° C. to 23° C., the mixture was stirred for 30 minutes and then diluted with dichloromethane (230 mL). Then, after stirring for 3 hours, the mixture was diluted again with dichloromethane (250 mL).

Thereafter, washing was performed with demineralized water (700 mL), the mixture was allowed to stand for 30 minutes, and then the organic layer was separated. This organic layer was washed three times with 0.2 N hydrochloric acid (700 mL) and further washed twice with demineralized water (700 mL).

The washed organic layer was diluted with dichloromethane (300 ml), and poured into methanol (5000 ml), and the obtained precipitate was filtrated by filtration and dried to obtain the target polyester resin (16). The obtained polyester resin had a viscosity-average molecular weight (Mv) of 65,000. In addition, the residual amount of the poly(1,4-butanediol adipate) contained in the polyester resin (16) is 3% by mass. The structural formula of the polyester resin (16) is shown below.

POLYESTER RESIN (16)

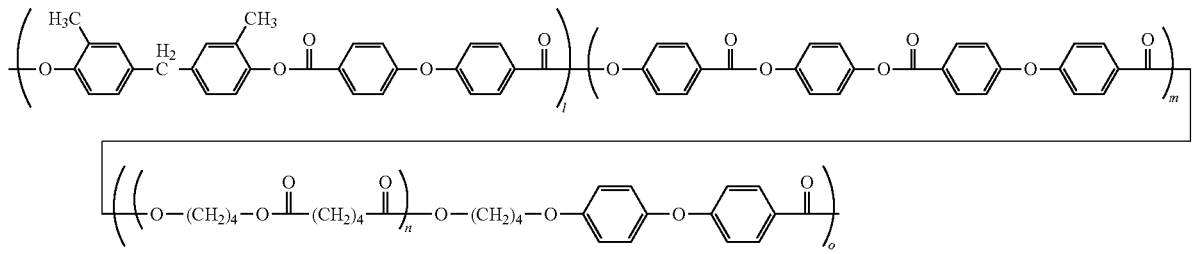

l:m:o = 3:10:0.7

<Comparative Synthesis Example 6> (Preparation of Polyester Resin (17))

A polyester resin (17) having a viscosity-average molecular weight (Mv) of 65,000 was prepared in the same manner as in Synthesis Example 25 except that poly(1,4-butanediol adipate) was not added. The structural formula of the polyester resin (17) is shown below.

POLYESTER RESIN (17)

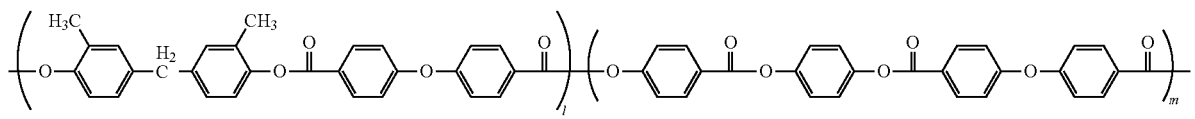

l:m = 90:10

<Synthesis Example 26> (Preparation of Polyester Resin (18))

To a 1000 mL four-neck reactor in which nitrogen substitution was performed, poly(1,2-ethanediol adipate) (molecular weight: 2,000 in terms of OH group) (1.75 g) and diphenyl ether-4,4'-dicarboxylic acid chloride (32.62 g) were weighted and dissolved in dichloromethane (115 mL). Subsequently, a mixed solution of triethylamine (0.27 g) and dichloromethane (10 mL) was added to the reactor cooled to 5° C. to 15° C., and then stirring was continued for 1.5 hours while maintaining the internal temperature at 18° C. to 23° C.

Then, to the above reactor, 2,3,5-trimethylphenol (0.18 g), 1,1-bis(4-hydroxy-3-methylphenyl) ethane (10.49 g) and bis(4-hydroxyphenyl) methane (13.00 g) were added and then diluted with dichloromethane (70 mL). Thereafter, a mixed solution of triethylamine (24.09 g) and dichloromethane (100 mL) was added dropwise to the reactor cooled to 5° C. to 15° C. over 20 minutes. Thereafter, while maintaining the internal temperature at 18° C. to 23° C., the mixture was stirred for 30 minutes and then diluted with dichloromethane (300 mL). Then, after stirring for 3 hours, the mixture was diluted again with dichloromethane (310 mL).

Thereafter, washing was performed with demineralized water (700 mL), the mixture was allowed to stand for 30 minutes, and then the organic layer was separated. This organic layer was washed three times with 0.2 N hydrochloric acid (700 mL) and further washed twice with demineralized water (700 mL).

The washed organic layer was diluted with dichloromethane (300 ml), and poured into methanol (5000 ml), and the obtained precipitate was filtrated by filtration and dried to obtain the target polyester resin (18). The obtained polyester resin had a viscosity-average molecular weight (Mv) of 65,000. In addition, the residual amount of the poly(1,2-ethanediol adipate) contained in the polyester resin (18) is 3.5% by mass. The structural formula of the polyester resin (18) is shown below.

POLYESTER RESIN (18)

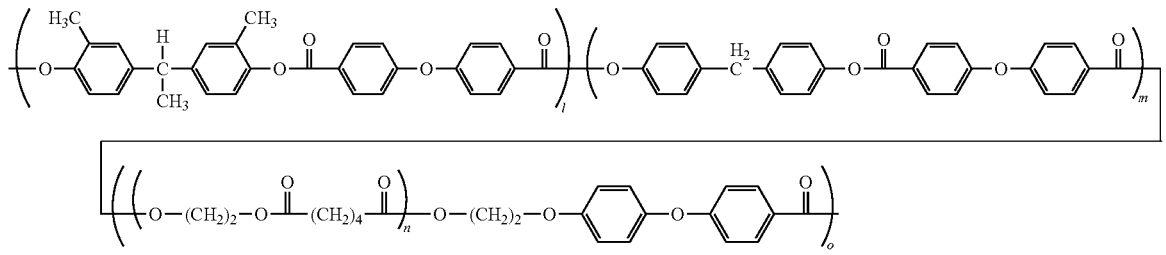

l:m:o = 39.7:59.5:0.8

<Preparation of Electrophotographic Photoreceptor Drum>

<Preparation of Undercoat Layer Forming Coating Fluid>

1 kg of a raw-material slurry obtained by mixing 120 parts of methanol with 50 parts of surface-treated titanium oxide obtained by mixing rutile titanium oxide having an average primary particle diameter of 40 nm ("TTO55N", manufactured by Ishihara Sangyo Co., Ltd.) with methyldimethoxysilane ("TSL8117", manufactured by Toshiba Silicone Co., Ltd.), in an amount of 3% by mass based on the titanium oxide, by means of a Henschel mixer, was subjected to a 1-hour dispersing treatment with Ultra Apex Mill (Type UAM-015) manufactured by Kotobuki Industries Co., Ltd., which had a mill capacity of about 0.15 L, using zirconia beads having a diameter of about 100 μm (YTZ, manufactured by Nikkato Corp.) as a dispersing medium, while circulating the liquid under the conditions of a rotor peripheral speed of 10 msec and a liquid flow rate of 10 kg/hr. Thus, a titanium oxide dispersion was prepared.

The titanium oxide dispersion, a mixed solvent of methanol/1-propanol/toluene, and pellets of a copolymerized polyamide containing ε-caprolactam [a compound represented by the following Formula (F)], bis(4-amino-3-methylcyclohexyl) methane [compound represented by the following Formula (G)], hexamethylenediamine [compound represented by the following Formula (H)], decamethylenedicarboxylic acid [compound represented by the following formula (I)] and octadecamethylene dicarboxylic acid [compound represented by the Following formula (J)] in a composition molar ratio of 60%, 15%, 5%, 15% and 5% were stirred and mixed with heating, so as to dissolve the polyamide pellets. Thereafter, the mixture was subjected to an ultrasonic dispersion treatment by using an ultrasonic transmitter with an output of 1200 W for one hour, and was further filtrated with PTFE membrane filter (Mitex LC, manufactured by Advantech Co., Ltd.) having a pore size of 5 μm. Thus, an undercoat layer forming coating fluid having surface-treated titanium oxide/copolymer polyamide in a mass ratio of 3/1, methanol/1-propanol/toluene in a mass ratio of 7/1/2, and a solid concentration of 18.0% by mass was prepared.

F
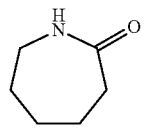

-continued

G
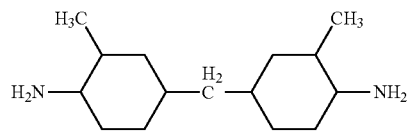

H
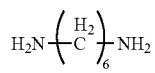

I
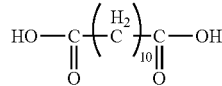

J
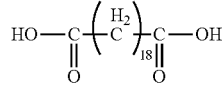

<Preparation of Charge Generation Layer Forming Coating Fluid>

Figure 2:
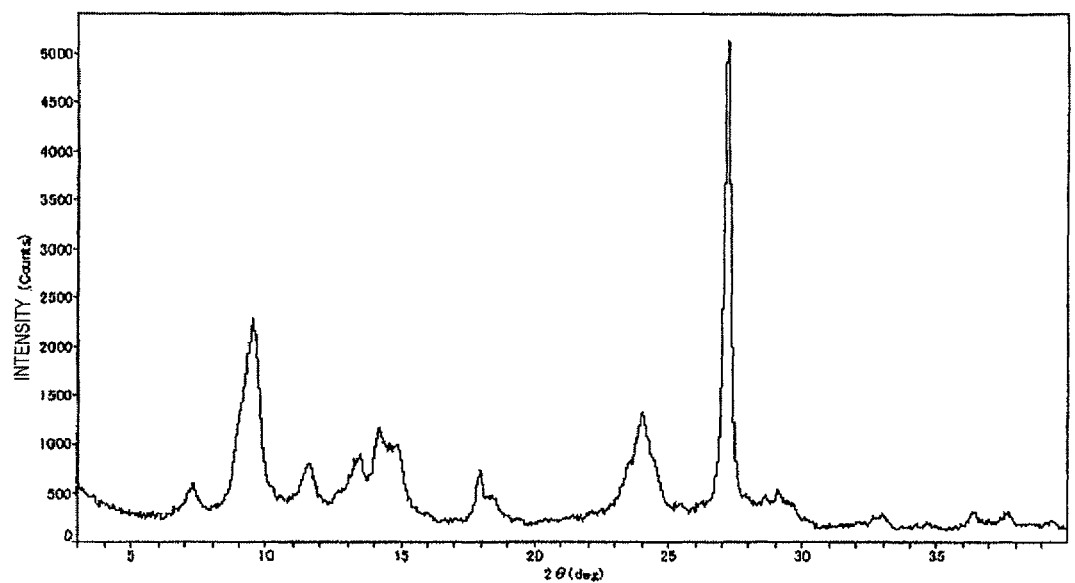
FIG. 2 is an X-ray diffraction spectrum by a CuKα characteristic X-ray of oxytitanium phthalocyanine used for preparing a coating fluid A for forming charge generation layer used in the example.

As the charge generation substance, 20 parts of oxytitanium phthalocyanine showing an X-ray diffraction spectrum by CuKα characteristic X-ray in FIG. 2 and 280 parts of 1,2-dimethoxyethane were mixed with each other, and the mixture was subjected to a pulverization/dispersion treatment for one hour by using a sand grinding mill. Subsequently, the resultant fine treatment liquid was mixed with a binder solution obtained by dissolving 10 parts of polyvinyl butyral (trade name "Denka Butyral" #6000C, manufactured by Denki Kagaku Kogyo K.K.) in a mixed solution containing 255 parts of 1,2-dimethoxyethane and 85 parts of 4-methoxy-4-methyl-2-pentanone, and with 230 parts by mass of 1,2-dimethoxyethane, so as to prepare a charge generation layer forming coating fluid A.

Figure 3:
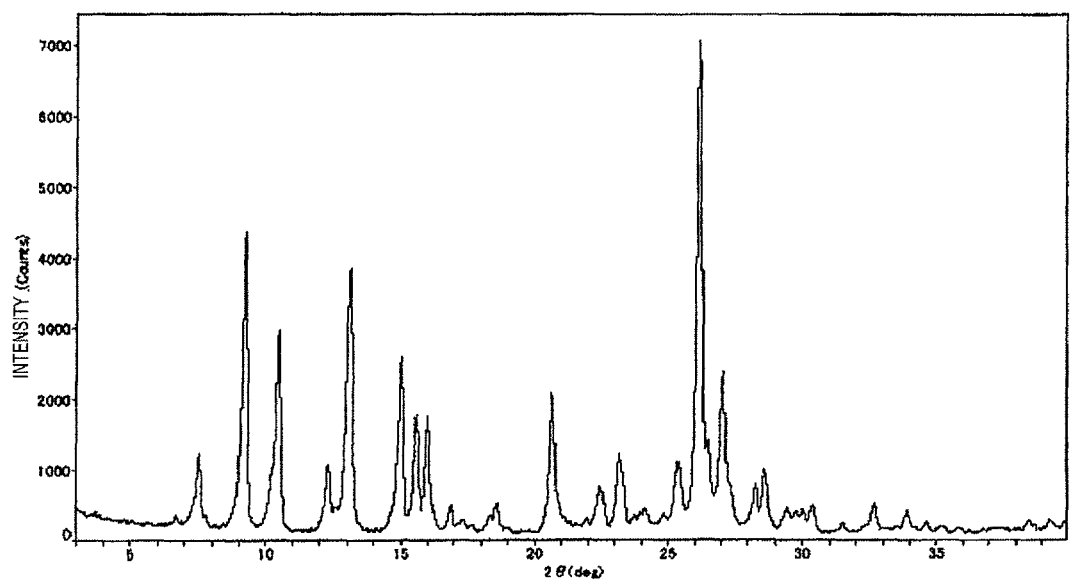
FIG. 3 is an X-ray diffraction spectrum by a CuKα characteristic X-ray of oxytitanium phthalocyanine used for preparing a coating fluid B for forming charge generation layer used in the example.

As the charge generation substance, 20 parts of oxytitanium phthalocyanine showing an X-ray diffraction spectrum by CuKα characteristic X-ray in FIG. 3 and 280 parts of 1,2-dimethoxyethane were mixed with each other, and the mixture was subjected to a pulverization/dispersion treatment for 4 hours by using a sand grinding mill. Subsequently, the resultant fine treatment liquid was mixed with a binder solution obtained by dissolving 10 parts of polyvinyl butyral (trade name "Denka Butyral" #6000C, manufactured by Denki Kagaku Kogyo K.K.) in a mixed solution containing 255 parts of 1,2-dimethoxyethane and 85 parts of 4-methoxy-4-methyl-2-pentanone, and with 230 parts by mass of 1,2-dimethoxyethane, so as to prepare a charge generation layer forming coating fluid B.

The charge generation layer forming coating fluid A and the charge generation layer forming coating fluid B were mixed with each other at a mass ratio of 55:45, so as to prepare the charge generation layer forming coating fluid used in the Examples.

<Preparation of Charge Transport Layer Forming Coating Fluid>

[Coating Fluid C1]

97.5 parts of the polyester resin (16) prepared in Synthesis Example 25, 2.5 parts of a polyarylate resin (19) having a repeating structure and an end structure shown below (viscosity-average molecular weight: 35,000; content of the polysiloxane structure in the polymer: 12.5% by mass), 40 parts of a charge transport substance represented by the following HTM 34, 10 parts of an additive AD-13, 2 parts of an antioxidant: 2,6-di-tert-butyl-4-methyl-phenol, 1 part of tribenzylamine, 0.05 part of dimethylpolysiloxane (KF 96-10CS manufactured by Shin-Etsu Chemical Co., Ltd.) were dissolved in 650 parts of a mixed solvent of tetrahydrofuran/toluene (8/2 (mass ratio)), so as to prepare a charge transport layer forming coating fluid C1.

POLYESTER RESIN (19)

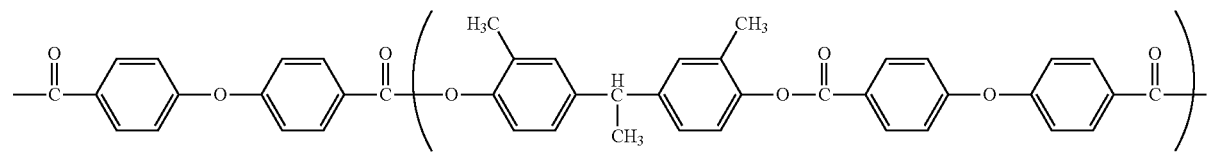

TERMINAL:

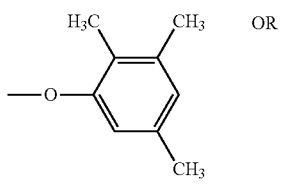 OR 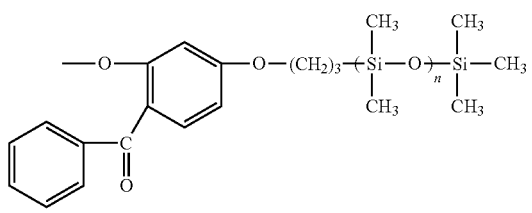

HTM34

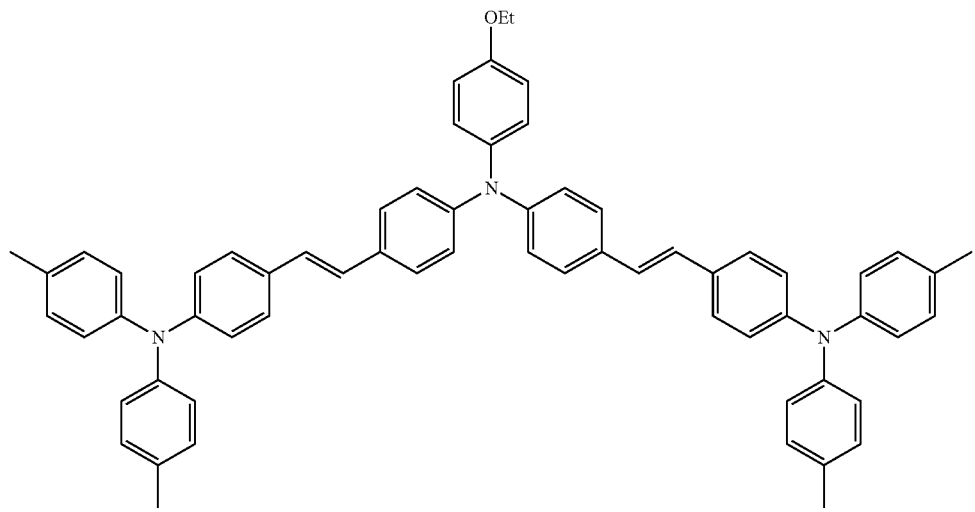

AD-13

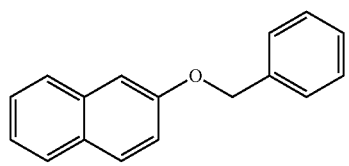

[Coating Fluid C2]

A coating fluid C2 was prepared in the same manner as the coating fluid C1 except that the polyester resin (16) in the coating fluid was changed to the polyester resin (17) prepared in Comparative Synthesis Example 6.

[Coating Fluid C3]

A coating fluid C3 was prepared in the same manner as the coating fluid C1 except that the polyester resin (16) in the coating fluid was changed to the polyester resin (18) prepared in Synthesis Example 26.

[Coating Fluid C4]

A coating liquid C4 was prepared in the same manner as the coating liquid C1 except that the polyester resin (16) in the coating fluid was changed to polyester resin (20) having a structure shown below.

POLYESTER RESIN (20)

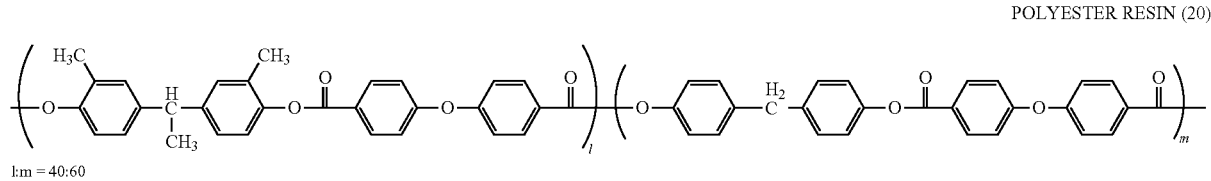

l:m = 40:60

<Preparation of Photoreceptor Drum>

An undercoat layer forming coating fluid, a charge generation layer forming coating fluid, and a charge transport layer forming coating fluid which were prepared in the preparation example of the coating fluid were sequentially applied to a cylinder made of an aluminum alloy, of which the surface was subjected to a cutting process, and having an external diameter of 24 mm, a length of 248 mm, and a film thickness of 0.75 mm, by using a dip coating method, and dried so as to form an undercoat layer, a charge generation layer, and a charge transport layer such that the film thicknesses thereof after drying respectively were 1.5 µM, 0.4 µm, and 36 µm, thereby an electrophotographic photoreceptor drum was prepared. Note that, the charge transport layer was dried at 125° C. for 24 minutes.

<Image Test>

The obtained photoreceptor was mounted on a photoreceptor cartridge of a monochrome printer M4580 (nonmagnetic single-component non-contact development) manufactured by Samsung Co., Ltd., and continuous printing of 400,000 sheets was performed at a coverage rate of 5% under a temperature of 25° C. and a relative humidity of 50%. The film thickness of the charge transport layer after the printing was measured, the reduction in film thickness of the charge transport layer before and after the printing was confirmed, and the printing durability was evaluated. The smaller the value, the more excellent the abrasion resistance is.

Examples 27 and 28, and Comparative Examples 7 and 8

Photoreceptor drums shown in Table 2 were prepared, and printing durability and electrophotographic photoreceptors were evaluated. The results are shown in Table 2.

TABLE 2

| | | Polyester resin | | | |
| | | At least one selected from group consisting of structure represented by Formula (1), structure represented by Formula (2), structure represented by Formula (3), and structure represented by Formula (4) | | | |
| | No. | Type | Molecular weight (in terms of OH group) | Content (% by mass) | Coating fluid | Reduction in film (µm) |
|---|---|---|---|---|---|---|
| Example 27 | (16) | PBA | 2000 | 3 | C1 | 1.55 |
| Comparative Example 7 | (17) | — | — | — | C2 | 1.86 |
| Example 28 | (18) | PEA | 2000 | 3.5 | C3 | 1.17 |
| Comparative Example 8 | (20) | — | — | — | C4 | 1.71 |

PBA: poly(1,4-butanediol adipate)
PEA: poly(1,2-ethanediol adipate)

As seen from the above, the electrophotographic photoreceptor according to the present invention was extremely excellent in abrasion resistance.

[Preparation of Polyester Resin (Increase in Content of Formulas (1) to (4))] Synthesis Example 29 (Preparation of Polyester Resin (21))

To a 500 mL four-neck reactor in which nitrogen substitution was performed, polytetramethylene ether glycol (molecular weight: 650 in terms of OH group) (8.87 g) and diphenyl ether-4,4'-dicarboxylic acid chloride (15.58 g) were weighted and dissolved in dichloromethane (90 mL). Subsequently, a mixed solution of triethylamine (2.90 g) and dichloromethane (10 mL) was added dropwise to the reactor cooled to 5° C. to 15° C. over 5 minutes, and then stirring was continued for 2 hours while maintaining the internal temperature at 18° C. to 23° C.

Then, to the above reactor, 1,1-bis(4-hydroxy-3-methylphenyl) ethane (9.40 g) was added and diluted with dichloromethane (50 mL). Thereafter, a mixed solution of triethylamine (8.80 g) and dichloromethane (70 mL) was added dropwise to the reactor cooled to 5° C. to 15° C. over 20 minutes. After stirring for 30 minutes, the mixture was diluted with dichloromethane (105 mL) and the stirring was continued for 4 hours while maintaining the reaction internal temperature at 18° C. to 23° C. Thereafter, washing was performed with demineralized water (240 mL), the mixture was allowed to stand for 30 minutes, and then the organic layer was separated. This organic layer was washed three times with 0.2 N hydrochloric acid (240 mL) and further washed twice with demineralized water (240 mL).

The washed organic layer was diluted with dichloromethane (100 ml), and poured into methanol (2500 ml), and the obtained precipitate was filtrated by filtration and dried to obtain the target polyester resin (21). The obtained polyester resin had a viscosity-average molecular weight (Mv) of 18,000. In addition, the residual amount of the polytetramethylene ether glycol contained in the polyester resin (21) is 30% by mass. The structural formula of the polyester resin (21) is shown below.

POLYESTER RESIN (21)

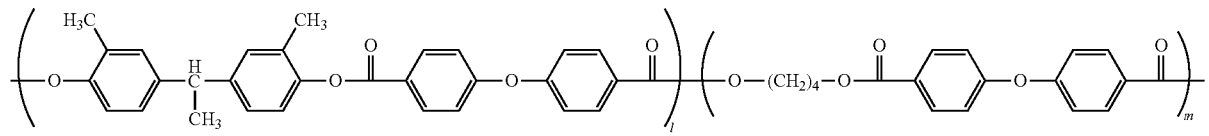

l:m = 74:26

<Synthesis Example 30> (Preparation of Polyester Resin (22))

To a 500 mL four-neck reactor in which nitrogen substitution was performed, poly(1,4-butanediol adipate) (molecular weight: 1,000 in terms of OH group) (8.97 g) and diphenyl ether-4,4'-dicarboxylic acid chloride (14.79 g) were weighted and dissolved in dichloromethane (90 mL). Subsequently, a mixed solution of triethylamine (1.95 g) and dichloromethane (10 mL) was added dropwise to the reactor cooled to 5° C. to 15° C. over 5 minutes, and then stirring was continued for 2 hours while maintaining the internal temperature at 18° C. to 23° C.

Then, to the above reactor, 1,1-bis(4-hydroxy-3-methylphenyl) ethane (9.89 g) was added and diluted with dichloromethane (50 mL). Thereafter, a mixed solution of triethylamine (9.09 g) and dichloromethane (70 mL) was added dropwise to the reactor cooled to 5° C. to 15° C. over 20 minutes. After stirring for 30 minutes, the mixture was diluted with dichloromethane (105 mL) and the stirring was continued for 4 hours while maintaining the reaction internal temperature at 18° C. to 23° C. Thereafter, washing was performed with demineralized water (240 mL), the mixture was allowed to stand for 30 minutes, and then the organic layer was separated. This organic layer was washed three times with 0.2 N hydrochloric acid (240 mL) and further washed twice with demineralized water (240 mL).

The washed organic layer was diluted with dichloromethane (100 ml), and poured into methanol (2500 ml), and the obtained precipitate was filtrated by filtration and dried to obtain the target polyester resin (22). The obtained polyester resin had a viscosity-average molecular weight (Mv) of 31,000. In addition, the residual amount of the poly(1,4-butanediol adipate) contained in the polyester resin (22) is 30% by mass. The structural formula of the polyester resin (22) is shown below.

POLYESTER RESIN (22)

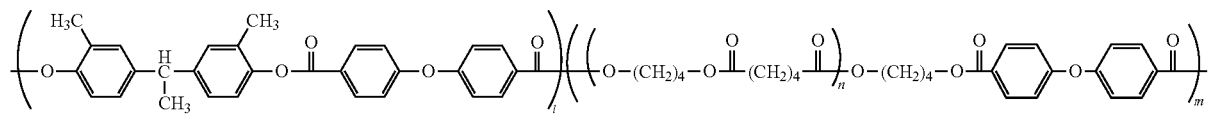

l:m = 82:18

<Synthesis Example 31> (Preparation of Polyester Resin (23))

To a 1000 mL four-neck reactor in which nitrogen substitution was performed, poly(1,6-hexanediol phthalate) (molecular weight: 2,000 in terms of OH group) (12.01 g) and diphenyl ether-4,4'-dicarboxylic acid chloride (18.73 g) were weighted and dissolved in dichloromethane (90 mL). Subsequently, a mixed solution of triethylamine (1.33 g) and dichloromethane (10 mL) was added dropwise to the reactor cooled to 5° C. to 15° C. over 5 minutes, and then stirring was continued for 1.5 hours while maintaining the internal temperature at 18° C. to 23° C.

Then, to the above reactor, 1,1-bis(4-hydroxy-3-methylphenyl) ethane (13.89 g) was added and diluted with dichloromethane (150 mL). Thereafter, a mixed solution of triethylamine (12.67 g) and dichloromethane (100 mL) was added dropwise to the reactor cooled to 5° C. to 15° C. over 20 minutes. After stirring for 30 minutes, the mixture was diluted with dichloromethane (80 mL) and the stirring was continued for 4 hours while maintaining the reaction internal temperature at 18° C. to 23° C. Thereafter, washing was performed with demineralized water (320 mL), the mixture was allowed to stand for 30 minutes, and then the organic layer was separated. This organic layer was washed three times with 0.2 N hydrochloric acid (320 mL) and further washed twice with demineralized water (320 mL).

The washed organic layer was diluted with dichloromethane (200 ml), and poured into methanol (400 ml), and the obtained precipitate was filtrated by filtration and dried to obtain the target polyester resin (23). The obtained polyester resin had a viscosity-average molecular weight (Mv) of 36,000. In addition, the residual amount of the poly(1,6-hexanediol phthalate) contained in the polyester resin (23) is 30% by mass. The structural formula of the polyester resin (23) is shown below.

POLYESTER RESIN (23)

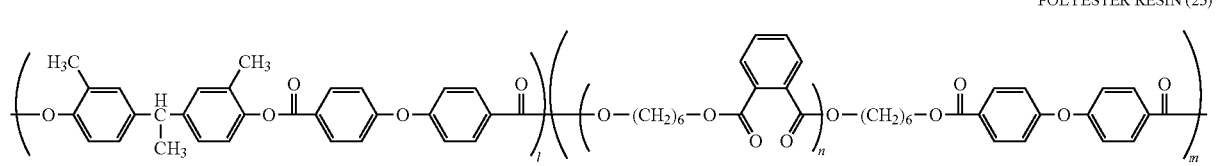

l:m = 90.6:9.4

<Synthesis Example 32> (Preparation of Polyester Resin (24))

A polyester resin (24) was obtained in the same manner as in Synthesis Example 31, except that the poly(1,6-hexanediol phthalate) (molecular weight: 2,000 in terms of OH group) and 1,1-bis(4-hydroxy-3-methylphenyl) ethane of Synthesis Example 31 were changed to poly(1,4-butanediol adipate) (molecular weight: 2,000 in terms of OH group) and 1,1-bis(4-hydroxyphenyl) cyclohexane. The obtained polyester resin had a viscosity-average molecular weight (Mv) of 47,000. In addition, the residual amount of the poly(1,4-butanediol adipate) contained in the polyester resin (24) is 30% by mass. The structural formula of the polyester resin (24) is shown below.

POLYESTER RESIN (24)

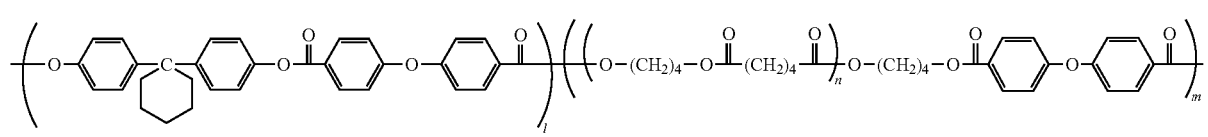

l:m = 90.1:9.9

<Synthesis Example 33> (Preparation of Polyester Resin (25))

A polyester resin (25) was obtained in the same manner as in Synthesis Example 31 except that the poly(1,6-hexanediol phthalate) (molecular weight: 2,000 in terms of OH group) of Synthesis Example 31 was changed to poly(3-methyl-1,5-pentanediol terephthalate) (molecular weight: 2,000 in terms of OH group). The obtained polyester resin had a viscosity-average molecular weight (Mv) of 44,300. In addition, the residual amount of the poly(3-methyl-1,5-pentanediol terephthalate) contained in the polyester resin (25) is 30% by mass. The structural formula of the polyester resin (25) is shown below.

POLYESTER RESIN (25)

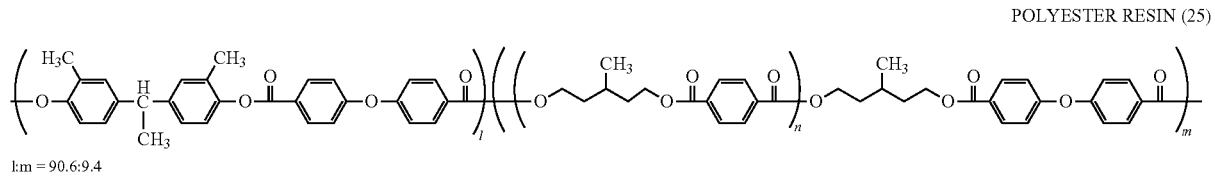

l:m = 90.6:9.4

<Comparative Synthesis Example 9> (Preparation of Polyester Resin (26))

To a 500 mL four-neck reactor in which nitrogen substitution was performed, Byron 200 (manufactured by Toyobo Co., Ltd., an amorphous polyethylene terephthalate modified resin, molecular weight: 17,000 in terms of OH group) (9.00 g) and diphenyl ether-4,4'-dicarboxylic acid chloride (13.47 g) were weighted and dissolved in dichloromethane (70 mL). Subsequently, a mixed solution of triethylamine (0.16 g) and dichloromethane (10 mL) was added dropwise to the reactor cooled to 5° C. to 15° C. over 5 minutes, and then stirring was continued for 2 hours while maintaining the internal temperature at 18° C. to 23° C.

Then, to the above reactor, 1,1-bis(4-hydroxy-3-methylphenyl) ethane (10.85 g) was added and diluted with dichloromethane (150 mL). Thereafter, a mixed solution of triethylamine (9.89 g) and dichloromethane (100 mL) was added dropwise to the reactor cooled to 5° C. to 15° C. over 20 minutes. After stirring for 30 minutes, the mixture was diluted with dichloromethane (50 mL) and the stirring was continued for 4 hours while maintaining the reaction internal temperature at 18° C. to 23° C. Thereafter, washing was performed with demineralized water (290 mL), the mixture was allowed to stand for 30 minutes, and then the organic layer was separated. This organic layer was washed three times with 0.2 N hydrochloric acid (290 mL) and further washed twice with demineralized water (290 mL).

The washed organic layer was diluted with dichloromethane (200 ml), and poured into methanol (2500 ml), and the obtained precipitate was filtrated by filtration and dried to obtain the target polyester resin (26). The obtained polyester resin had a viscosity-average molecular weight (Mv) of 31,000. In addition, the residual amount of Byron 200 contained in the polyester resin (26) is 30% by mass.

TABLE 3

| | | Polyester resin | | |
|---|---|---|---|---|
| | | At least one selected from group consisting of structure represented by Formula (1), structure represented by Formula (2), structure represented by Formula (3), and structure represented by Formula (4) | | |
| No. | Type | Molecular weight (in terms of OH group) | Content (% by mass) | Divalent phenol residue |
| Synthesis Example 29 (21) | PTMG | 650 | 30 | Bis(1) |
| Synthesis Example 30 (22) | PBA | 1000 | 30 | Bis(1) |
| Synthesis Example 31 (23) | PHP | 2000 | 30 | Bis(1) |
| Synthesis Example 32 (24) | PBA | 2000 | 30 | Bis(2) |
| Synthesis Example 33 (25) | PMPTP | 2000 | 30 | Bis(1) |
| Comparative Synthesis Example 9 (26) | Byron 200 | 17000 | 30 | Bis(1) |

PTMG: polytetramethylene ether glycol
PBA: poly(1,4-butanediol adipate)
PHP: poly(1,6-hexanediol phthalate)
PMPTP: poly(3-methyl-1,5-pentanediol terephthalate)

<Preparation of Photoreceptor Sheet>

Example 34

Rutile type titanium oxide ("TTO55N" manufactured by Ishihara Sangyo Kaisha, Ltd.) having an average primary particle diameter of 40 nm and methyl dimethoxysilane ("TSL8117" manufactured by Toshiba Silicone Co., Ltd.) in an amount of 3% by mass based on the titanium oxide were charged into a high-speed fluidized mixing and kneading machine ("SMG 300", manufactured by KAWATA MFG Co., Ltd.), and the surface treated titanium oxide obtained by high speed mixing at a circumferential rotation speed of 34.5 msec was dispersed by a ball mill of methanol/1-propanol so as to prepare a dispersion slurry of hydrophobized titanium oxide. The dispersion slurry, the mixed solvent of methanol/1-propanol/toluene, and the pellets of polyamide resin same as those used in preparing the undercoat layer forming coating fluid in preparing the photoreceptor drum were stirred and mixed with heating, so as to dissolve the polyamide pellets. Thereafter, the mixture was subjected to an ultrasonic dispersion treatment, so as to prepare an undercoat layer dispersion having methanol/1-propanol/toluene in a mass ratio of 7/1/2, hydrophobically treated titanium oxide/copolymerized polyamide in a mass ratio of 3/1, and a solid content concentration of 18.0%. This undercoat layer dispersion was coated on a polyethylene terephthalate sheet, on which aluminum was vapor-deposited on the surface, and dried to form a undercoat layer, having a film thickness of 1.5 μm after drying.

10 parts of oxytitanium phthalocyanine exhibiting intense diffraction peak at a Bragg angle (2θ±0.2) of 27.3° in the X-ray diffraction spectrum obtained with CuKα characteristic X-ray, and having an X-ray powder diffraction spectrum as illustrated in FIG. 2 was added to 150 parts of 1,2-dimethoxyethane, and the mixture was subjected to a pulverization and dispersion treatment with a sand grinding mill, so as to prepare a pigment dispersion. 160 parts by mass of the pigment dispersion thus obtained, 100 parts by mass of 5% 1,2-dimethoxyethane solution of polyvinyl butyral (trade name #6000 C, manufactured by Denki Kagaku Kogyo K.K.), an appropriate amount of 1,2-dimethoxyethane were mixed, so as to finally prepare a charge generation layer forming coating fluid having a solid content concentration of 4.0%. This charge generation layer forming coating fluid was coated on the above undercoat layer and dried to form a charge generation layer, having a film thickness of 0.4 μM after drying.

Next, 40 parts by mass of the charge transport substance (HTM 34) having a structure shown below, 100 parts by mass of the polyester resin (21) prepared in Synthesis Example 29, 2 parts of an antioxidant: 2,6-di-tcrt-butyl-4-methyl-phenol, 1 part of tribenzylamine, and 0.05 part by mass of silicone oil as a leveling agent were mixed in 640 parts by mass of a mixed solvent of tetrahydrofuran and toluene (80% by mass of tetrahydrofuran and 20% by mass of toluene), so as to prepare the charge transport layer forming coating fluid.

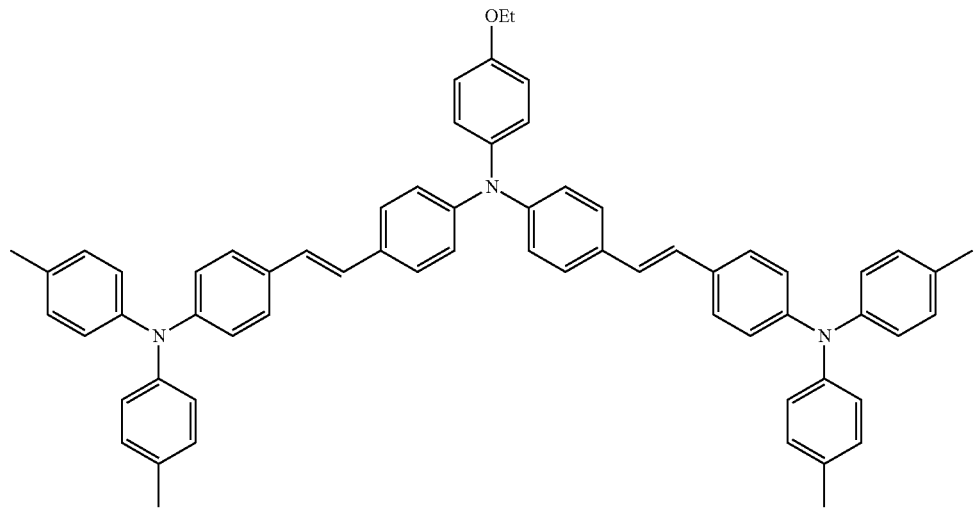

HTM34

This charge transport layer forming coating fluid was coated onto the above charge generation layer using an applicator and dried at 125° C. for 20 minutes to form a charge transport layer, so as to have a film thickness of 20 μm after drying, and a photoreceptor sheet was prepared.

Examples 35 to 38

Photoreceptor sheets were prepared in the same manner as in Example 34, except that the polyester resin (21) was replaced by the polyester resin (22) to (25) prepared in Synthesis Examples 30 to 33, as shown in Table 4.

Example 39

A photoreceptor sheet was prepared in the same manner as in Example 34, except that 100 parts by mass of the polyester resin (21) was replaced with a mixture (30:70 (mass ratio)) of 30 parts by mass of the polyester resin (21) and 70 parts by mass of the polyester resin (15).

Examples 40 to 47

Photoreceptor sheets were prepared in the same manner as in Example 39, except that a mixture of the polyester resins (21) to (25) and polyester resin (15) or a polycarbonate resin (PC-1) having a structure shown below (mixing ratio was shown in Table 4) was used, as shown in Table 4.

POLYCARBONATE RESIN (PC-1)

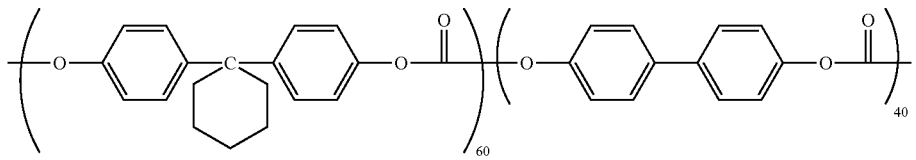

Comparative Examples 10 to 11

Photoreceptor sheets were prepared in the same manner as in Example 34, except that the polyester resin (21) was replaced by the polyester resins (26), (15), and the polycarbonate resin (PC-1), as shown in Table 4.

[Evaluation on Electrical Properties]

The photoreceptors were attached to an aluminum drum to be formed into a cylindrical shape, and after a conduction between the aluminum drum and the aluminum substrate of the photoreceptor, the drum was rotated at a constant number of revolutions, and an electric property evaluation test was performed by a cycle of charging, exposure, potential measurement, and charge elimination by using an electrophotography property evaluation apparatus manufactured in accordance with the measurement standards of The Society of Electrophotography of Japan (as described in Foundation and Application of Electrophotographic Technique (Continued), CORONA PUBLISHING CO., LTD., published on Nov. 15, 1996, Pages 404 to 405). At that time, the initial surface potential was set at −700 V, monochromatic light of 780 nm was used in the exposure and monochromatic light of 660 nm was used in the static elimination, and the surface potential (VL) at the time when exposure light irradiated was 1.0 μJ/cm² was measured.

For the VL measurement, the time required for the potential measurement from the exposure was set to 139 ms. In addition, the irradiation energy (half reduction exposure energy: μJ/cm²) when the surface potential was half the initial surface potential (−350 V) was measured as sensitivity ($E_{1/2}$). The smaller the absolute value of VL is, the more excellent the electrical properties are, while the smaller the value of $E_{1/2}$, the higher the sensitivity is. When the value of VL has not reached half of the initial surface potential (−350 V), it is described with (−) since $E_{1/2}$ cannot be measured. The measurement was performed in an environment of temperature of 25° C. and relative humidity of 50% (N/N). The results are shown in Table 4.

[Abrasion Test]

The photoreceptor film was cut into a circle having a diameter of 10 cm and the abrasion was evaluated by a Taber abrasion tester (manufactured by Toyo Seiki Seisaku-sho, Ltd.). The amount of abrasion after 700 revolutions at a load of 1,000 g was measured by comparing masses before and after the test using an abrasion wheel CS-10F under test conditions of an atmosphere of 25° C. and 50% RH. The smaller the value, the more excellent the abrasion resistance is. The results are shown in Tables 4 to 6.

TABLE 4

| | Binder resin in charge transport layer | | | Electrical properties (N/N) | | Abrasion |
|---|---|---|---|---|---|---|
| | Polyester resin No. | Mixed resin No. | Mixing ratio (polyester resin:mixed resin) (mass ratio) | $E_{1/2}$ (μJ/cm²) | VL (-V) | amount (-mg) |
| Example 34 | (21) | — | 100:0 | 0.125 | 14 | 4.8 |
| Example 35 | (22) | — | 100:0 | 0.127 | 13 | 3.5 |
| Example 36 | (23) | — | 100:0 | 0.120 | 31 | 3.1 |
| Example 37 | (24) | — | 100:0 | 0.131 | 18 | 3.5 |
| Example 38 | (25) | — | 100:0 | 0.114 | 27 | 2.3 |
| Comparative Example 10 | (26) | — | 100:0 | — | 530 | 4.2 |

TABLE 5

| | Binder resin in charge transport layer | | | Electrical properties (N/N) | | Abrasion |
|---|---|---|---|---|---|---|
| | Polyester resin No. | Mixed resin No. | Mixing ratio (polyester resin:mixed resin) (mass ratio) | $E_{1/2}$ (μJ/cm²) | VL (-V) | amount (-mg) |
| Example 39 | (21) | (15) | 30:70 | 0.117 | 27 | 2.0 |
| Example 40 | (22) | (15) | 30:70 | 0.116 | 24 | 2.8 |
| Example 41 | (23) | (15) | 30:70 | 0.112 | 33 | 3.1 |

TABLE 5-continued

| | Binder resin in charge transport layer | | | Electrical properties (N/N) | | Abrasion |
|---|---|---|---|---|---|---|
| | Polyester resin No. | Mixed resin No. | Mixing ratio (polyester resin:mixed resin) (mass ratio) | $E_{1/2}$ (μJ/cm$^2$) | VL (-V) | amount (-mg) |
| Example 42 | (24) | (15) | 30:70 | 0.117 | 32 | 2.9 |
| Example 43 | (24) | (15) | 15:85 | 0.113 | 30 | 3.1 |
| Example 44 | (25) | (15) | 30:70 | 0.113 | 32 | 2.9 |
| Example 45 | (25) | (15) | 15:85 | 0.112 | 32 | 2.7 |
| Comparative Example 11 | — | (15) | 0:100 | 0.110 | 29 | 4.3 |

TABLE 6

| | Binder resin in charge transport layer | | | Electrical properties (N/N) | | Abrasion |
|---|---|---|---|---|---|---|
| | Polyester resin No. | Mixed resin No. | Mixing ratio (polyester resin:mixed resin) (mass ratio) | $E_{1/2}$ (μJ/cm$^2$) | VL (-V) | amount (-mg) |
| Example 46 | (21) | (PC-1) | 20:80 | 0.110 | 29 | 4.8 |
| Example 47 | (22) | (PC-1) | 20:80 | 0.110 | 28 | 4.7 |
| Comparative Example 12 | — | (PC-1) | 0:100 | 0.101 | 26 | 6.1 |

As described above, the electrophotographic photoreceptor containing the polyester resin having a structure represented by at least one of the Formulas (1) to (4) in the present invention is excellent in electrical properties and abrasion resistance (Examples 34 to 38). On the other hand, the electrophotographic photoreceptor containing a polyester resin containing a diol residue having a molecular weight of more than 15,000 has poor electrical properties (Comparative Example 10). Further, by mixing the polyester resin of the present invention with the other polyester resin, excellent abrasion resistance is obtained while maintaining good electrical properties (Examples 39 to 45, and Comparative Example 11). In addition, even when the polyester resin of the present invention is mixed with the other polycarbonate resin, the abrasion resistance is further improved while maintaining good electrical properties (Examples 46 to 47, and Comparative Example 12).

As seen from above, the electrophotographic photoreceptor according to the present invention is extremely excellent in abrasion resistance and is also excellent in initial electrical properties. Further, the adhesion between layers can also be improved.

While the present invention has been described in detail and with reference to specific embodiments, it will be apparent to those skilled in the art that various changes and modifications can be made without departing from the spirit and scope of the present invention. This application is based on Japanese Patent Application (Japanese Patent Application No. 2016-184371) filed on Sep. 21, 2016, the contents of which are incorporated herein by reference.

DESCRIPTION OF REFERENCE NUMERALS

1 Photoreceptor
2 Charging device (charging roller)
3 Exposure device
4 Developing device
5 Transfer device
6 Cleaning device
7 Fixing device
41 Developing tank
42 Agitator
43 Supply roller
44 Developing roller
45 Regulating member
71 Upper fixing member (pressurizing roller)
72 Lower fixing member (fixing roller)
73 Heating device
T Toner
P Recording paper

The invention claimed is:

1. An electrophotographic photoreceptor comprising: a conductive support; and at least a photosensitive layer on the conductive support,
wherein the photosensitive layer contains a polyester resin,
the polyester resin contains at least one structure α selected from the group consisting of a structure represented by the following Formula (1), a structure represented by the following Formula (2), and a structure represented by the following Formula (3), the structure α having a number average molecular weight of 15,000 or less, and the polyester resin contains a divalent phenol residue and a divalent carboxylic acid residue:

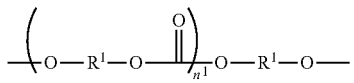     (1)

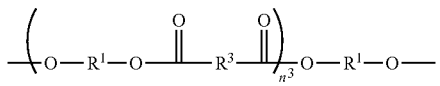     (2)

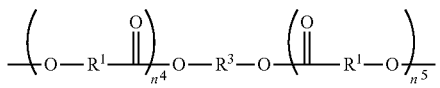     (3)

wherein in the Formula (1), $R^1$ represents an alkylene group which may have a substituent or a divalent group represented by the following Formula (5), and $n^1$ represents an integer of 1 to 100, wherein in the Formula (2), $R^1$ represents an alkylene group which may have a substituent or a divalent group represented by the following Formula (5), $R^3$ represents a divalent group, and $n^3$ represents an integer of 1 to 100, wherein in the Formula (3), $R^1$ represents an alkylene group which may have a substituent or a divalent group represented by the following Formula (5), $R^3$ represents a divalent group, and $n^4$ and $n^5$ each independently represents an integer of 1 to 100, and

     (5)

wherein in the Formula (5), $R^2$ represents an alkylene group which may have a substituent, and $n^2$ represents an integer of 1 to 10.

2. The electrophotographic photoreceptor according to claim 1, wherein the polyester resin contains the structure α in a proportion of 0.01% by mass to 50% by mass.

3. The electrophotographic photoreceptor according to claim 1, wherein the divalent phenol residue contains a structure represented by the following Formula (6):

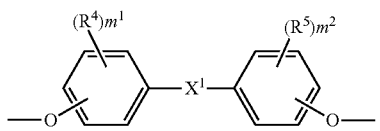     (6)

wherein in the Formula (6), $R^4$ and $R^5$ each independently represent a hydrogen atom, a halogen atom, a hydrocarbon group or an alkoxy group, and part or all of hydrogen atoms in the hydrocarbon group and the alkoxy group may be substituted with a halogen atom;

$X^1$ represents a single bond, —$CR^6R^7$—, —O—, —CO— or —S—; $R^6$ and $R^7$ each independently represent a hydrogen atom, a halogen atom, a hydrocarbon group or an alkoxy group, and part or all of hydrogen atoms in the hydrocarbon group and the alkoxy group may be substituted with a halogen atom; the $R^6$ and $R^7$ may be bonded to each other to form a ring; and $m^1$ and $m^2$ each independently represent an integer of 0 to 4.

4. The electrophotographic photoreceptor according to claim 1, wherein the divalent carboxylic acid residue contains a structure represented by the following Formula (7):

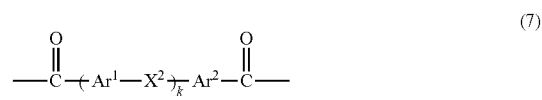     (7)

wherein in the Formula (7), $Ar^1$ to $Ar^2$ each independently represent an arylene group which may have a substituent; $X^2$ represents a single bond, —O—, —S—, a divalent group having a structure represented by the following Formula (8) or a divalent group having a structure represented by the following Formula (9); and k represents an integer of 0 to 5,

     (8)

     (9)

     (10)

wherein in the Formula (8), $R^8$ and $R^9$ each independently represent a hydrogen atom, a halogen atom, a hydrocarbon group or an alkoxy group, and part or all of hydrogen atoms in the hydrocarbon group and the alkoxy group may be substituted with a halogen atom; and the $R^8$ and $R^9$ may be bonded to each other to form a ring, wherein in the Formula (9), $R^{10}$ represents an alkylene group, an arylene group or a group represented by the above Formula (10), and wherein in the Formula (10), $R^{11}$ and $R^{12}$ each independently represent an alkylene group, and $Ar^3$ represents an arylene group.

5. An electrophotographic cartridge comprising: the electrophotographic photoreceptor according to claim 1.

6. An image forming apparatus comprising: the electrophotographic photoreceptor according to claim 1.

* * * * *